(12) United States Patent
Seger, Jr. et al.

(10) Patent No.: US 11,194,408 B2
(45) Date of Patent: *Dec. 7, 2021

(54) USER INPUT PASSIVE DEVICE AND INTERACTIVE DISPLAY DEVICE TOUCHSCREEN SYSTEM

(71) Applicant: SIGMASENSE, LLC., Wilmington, DE (US)

(72) Inventors: Richard Stuart Seger, Jr., Belton, TX (US); Daniel Keith Van Ostrand, Leander, TX (US); Gerald Dale Morrison, Redmond, WA (US); Timothy W. Markison, Mesa, AZ (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,376

(22) Filed: Mar. 17, 2021

(65) Prior Publication Data

US 2021/0223872 A1 Jul. 22, 2021

Related U.S. Application Data

(63) Continuation of application No. 16/545,365, filed on Aug. 20, 2019, now Pat. No. 10,976,837.

(51) Int. Cl.
*G06F 3/045* (2006.01)
*G06F 3/0354* (2013.01)
*G06F 3/044* (2006.01)

(52) U.S. Cl.
CPC .......... *G06F 3/0354* (2013.01); *G06F 3/0446* (2019.05)

(58) Field of Classification Search
None
See application file for complete search history.

(56) References Cited

U.S. PATENT DOCUMENTS 6,160,539 A 12/2000 Fleck
6,208,134 B1 3/2001 Demma
(Continued)

FOREIGN PATENT DOCUMENTS

KR 1020140144772 A 12/2014
KR 1020170043775 A 4/2017
WO 2019116003 A1 6/2019

OTHER PUBLICATIONS

Baker; How delta-sigma ADCs work, Part 1; Analog Applications Journal; Oct. 1, 2011; 6 pgs.

(Continued)

*Primary Examiner* — Kirk W Hermann
(74) *Attorney, Agent, or Firm* — Garlick & Markison; Patricia M. Healy

(57) ABSTRACT

A touchscreen system includes a user input passive device including a shell, a non-conductive supporting surface, an impedance circuit, a first conductive, and a second conductive plate. A first terminal of the impedance circuit is coupled to the first conductive plate and a second terminal of the impedance circuit is coupled to the second conductive plate. The touchscreen system further includes an interactive display device including a touchscreen, a plurality of electrodes, and a plurality of drive-sense circuits. When the user input passive device is used in close proximity with the touchscreen one or more of the shell and the first and second conductive plates cause changes in electrical characteristics of a set of electrodes of the plurality of electrodes. A set of drive sense circuits coupled to the set of electrodes is operable to generate a set of signals representative of the changes in electrical characteristics.

19 Claims, 54 Drawing Sheets

(56) References Cited

U.S. PATENT DOCUMENTS

| | | |
|---|---|---|
| 6,218,972 B1 | 4/2001 | Groshong |
| 6,665,013 B1 | 12/2003 | Fossum et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,625,726 B2 | 1/2014 | Kuan |
| 9,201,547 B2 | 12/2015 | Elias |
| 2005/0156876 A1 | 7/2005 | Kong |
| 2013/0278447 A1 | 10/2013 | Kremin |
| 2014/0062957 A1 | 3/2014 | Perski |
| 2014/0176447 A1 | 6/2014 | Alameh |
| 2014/0253520 A1 | 9/2014 | Cueto |
| 2015/0091859 A1* | 4/2015 | Rosenberg .............. G06F 3/046 345/174 |
| 2015/0220178 A1 | 8/2015 | Zeliff et al. |
| 2016/0054813 A1 | 2/2016 | Schediwy et al. |
| 2016/0188049 A1 | 6/2016 | Yang et al. |
| 2016/0341572 A1 | 11/2016 | Fusare |
| 2019/0302910 A1* | 10/2019 | Kim ................... G06F 3/03545 |
| 2020/0012358 A1 | 1/2020 | Marshall |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

International Searching Authority; International Search Report and Written Opinion; Int'l Application No. PCT/US2020/046728; dated Nov. 30, 2020; 10 pgs.

* cited by examiner

FIG. 1  interactive display device 10 interactive display device 10 touch screen system 86 touch screen system 86

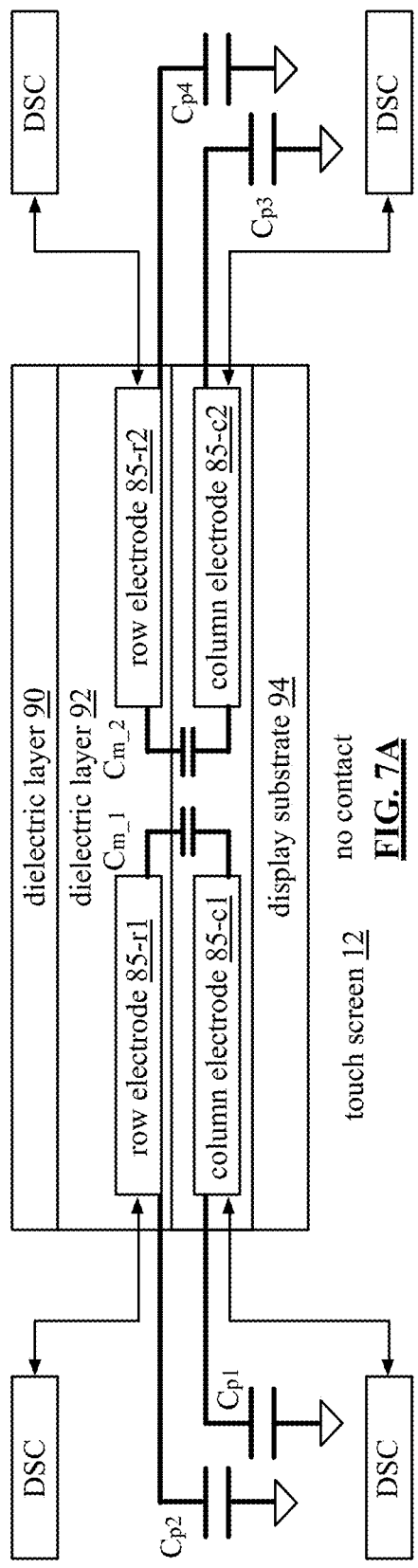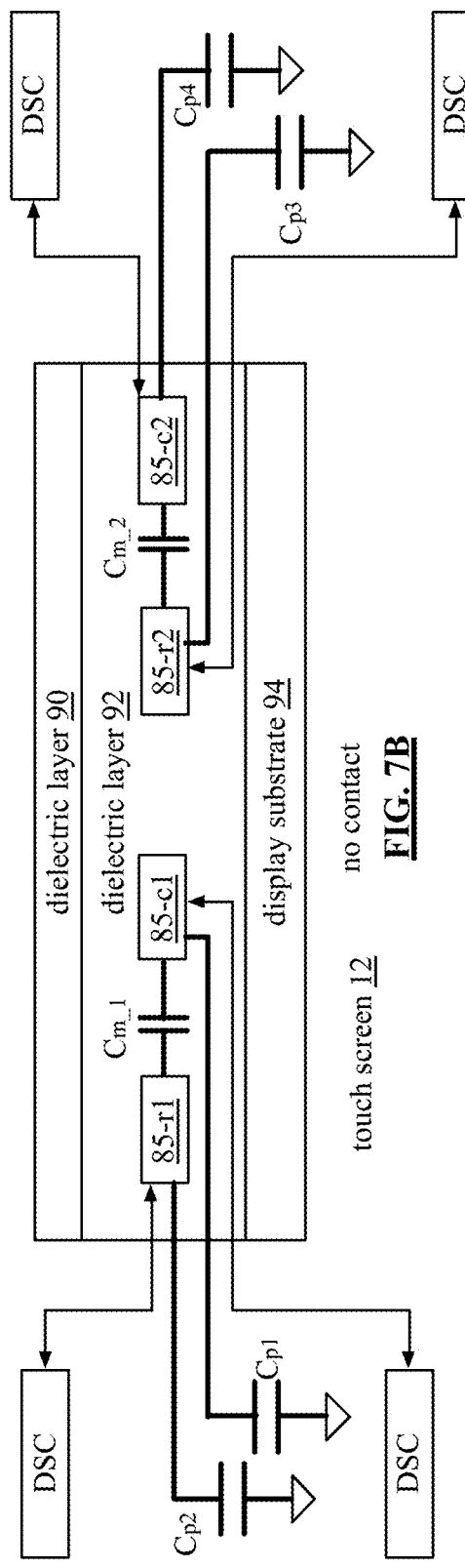

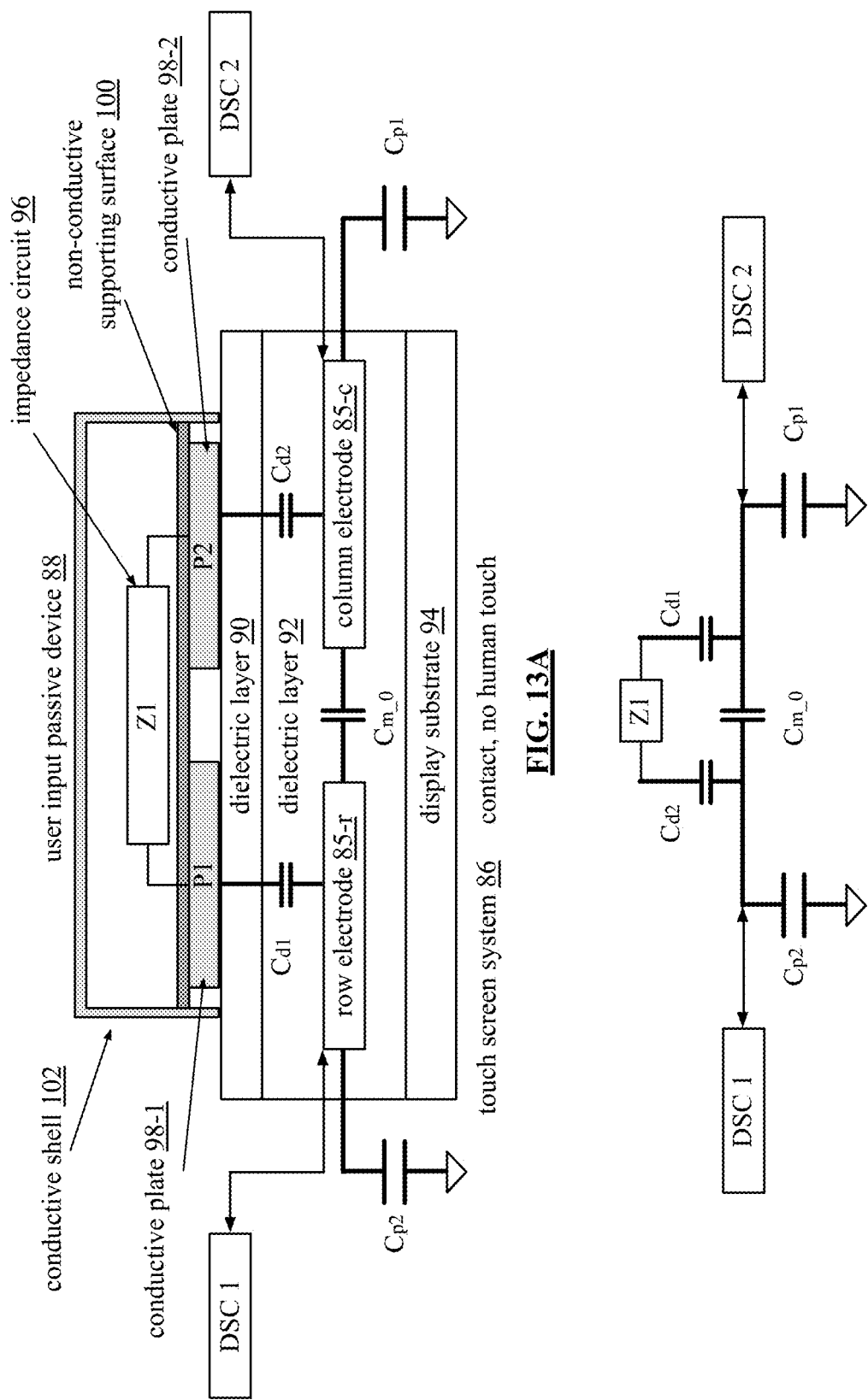

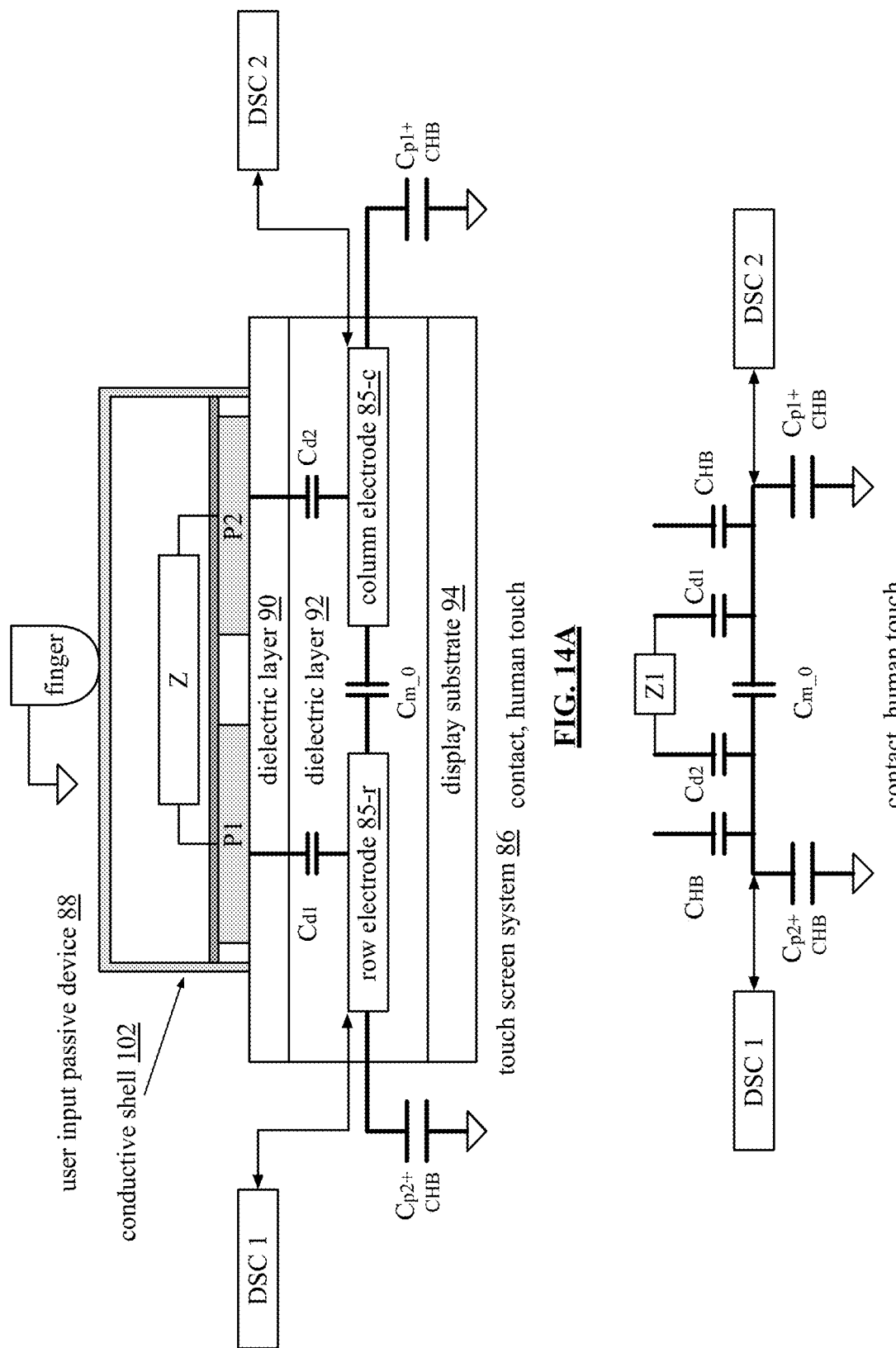

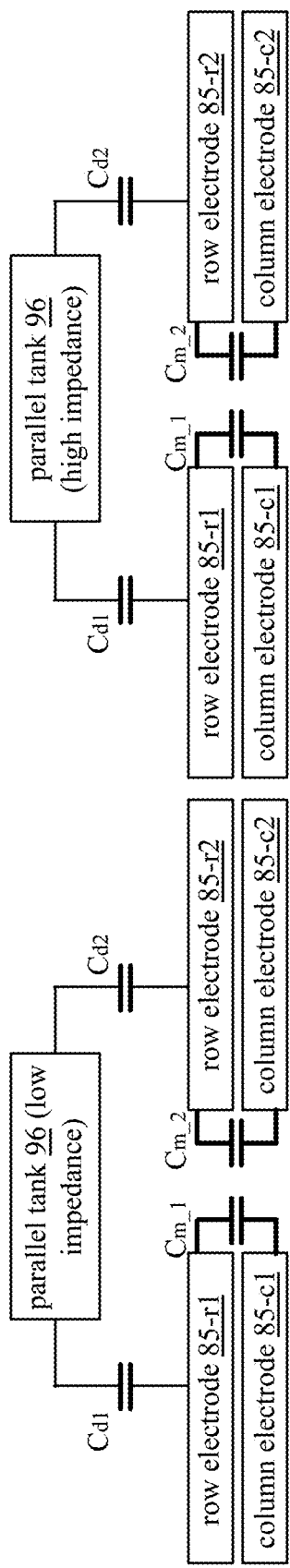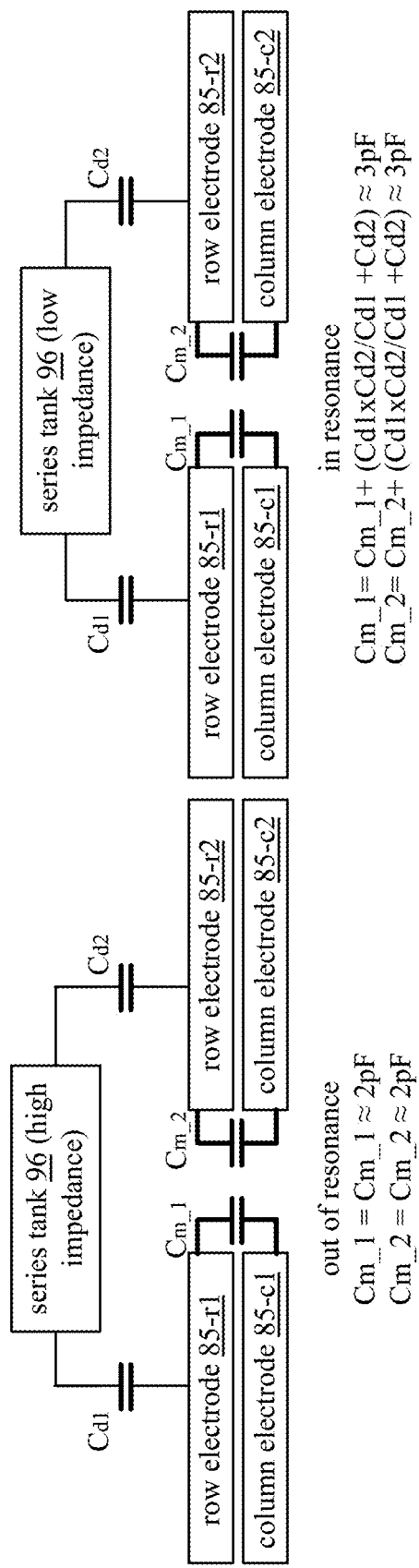
FIG. 16A  FIG. 16B  FIG. 17A  FIG. 17B

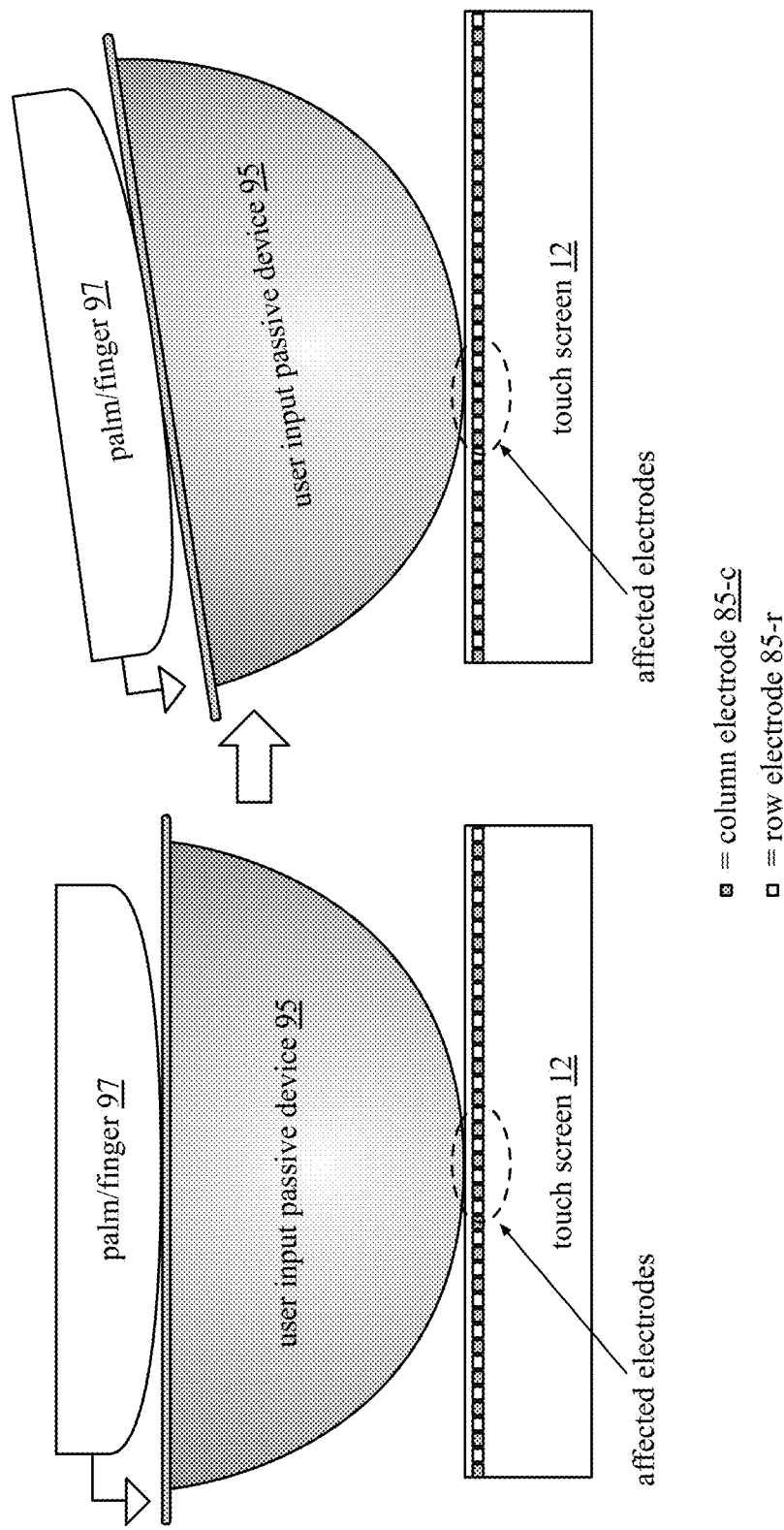

interactive display device 10

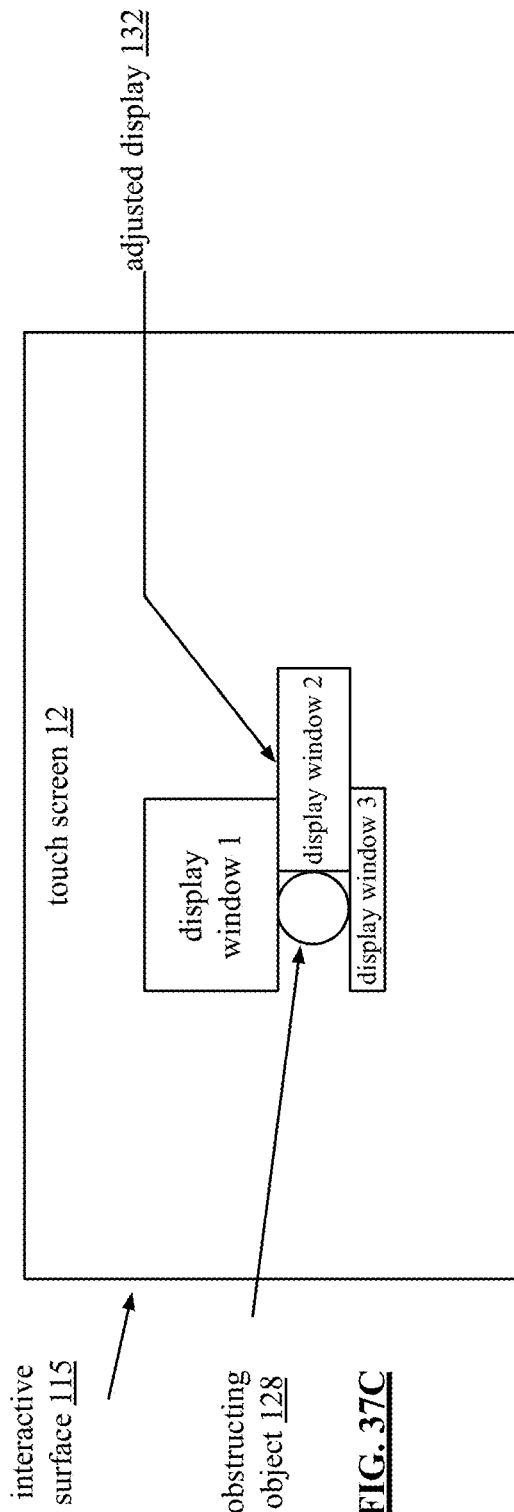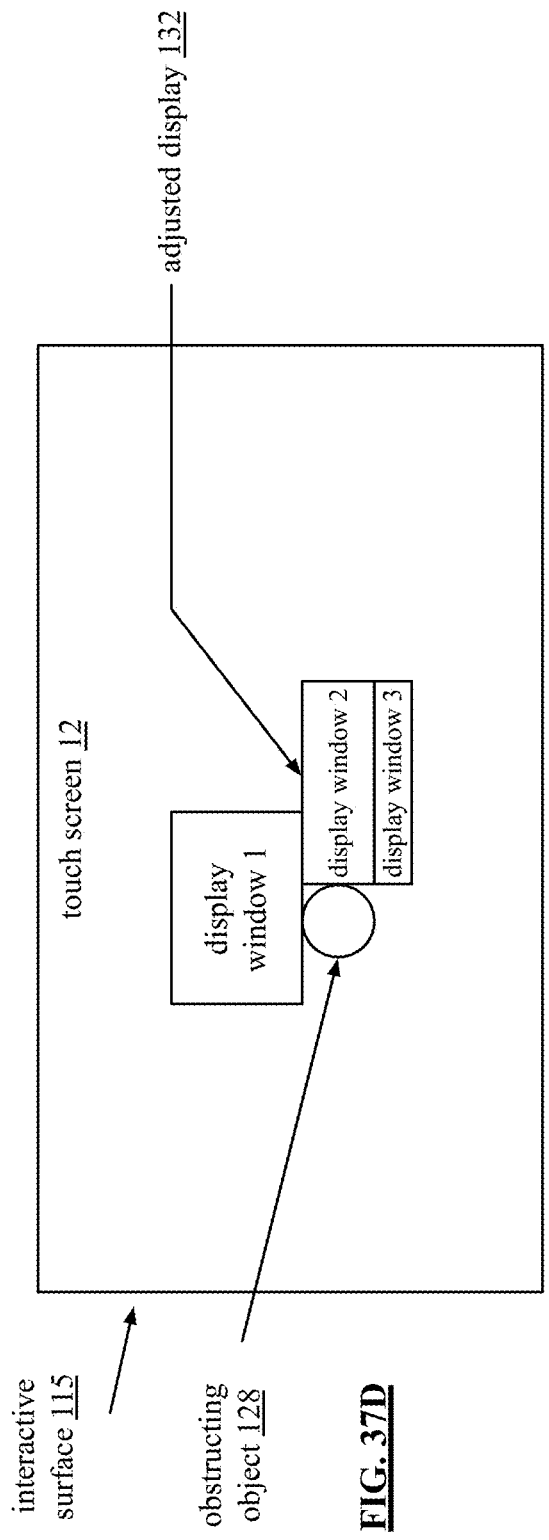

interactive display device 10 interactive display device 10 interactive display device 10

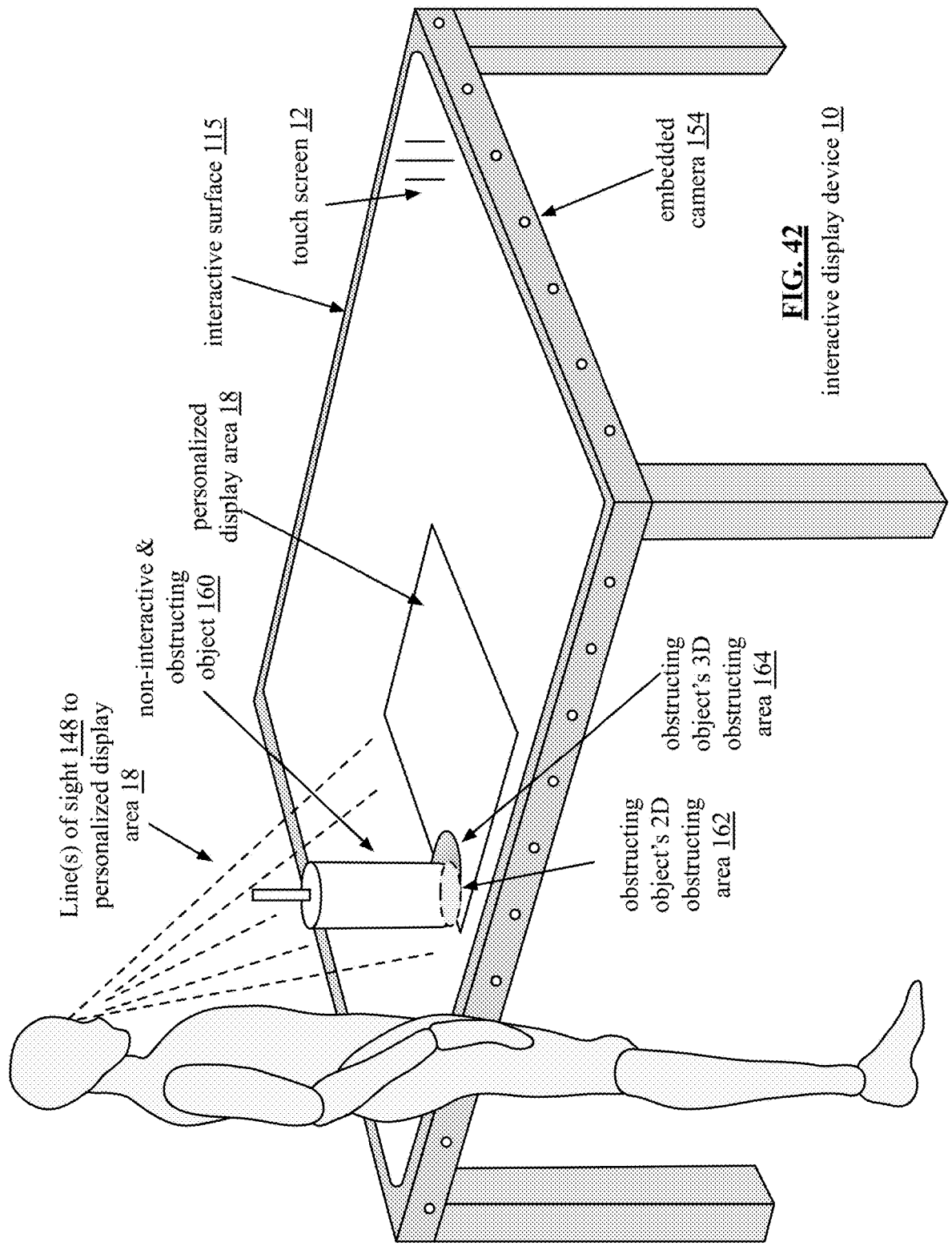

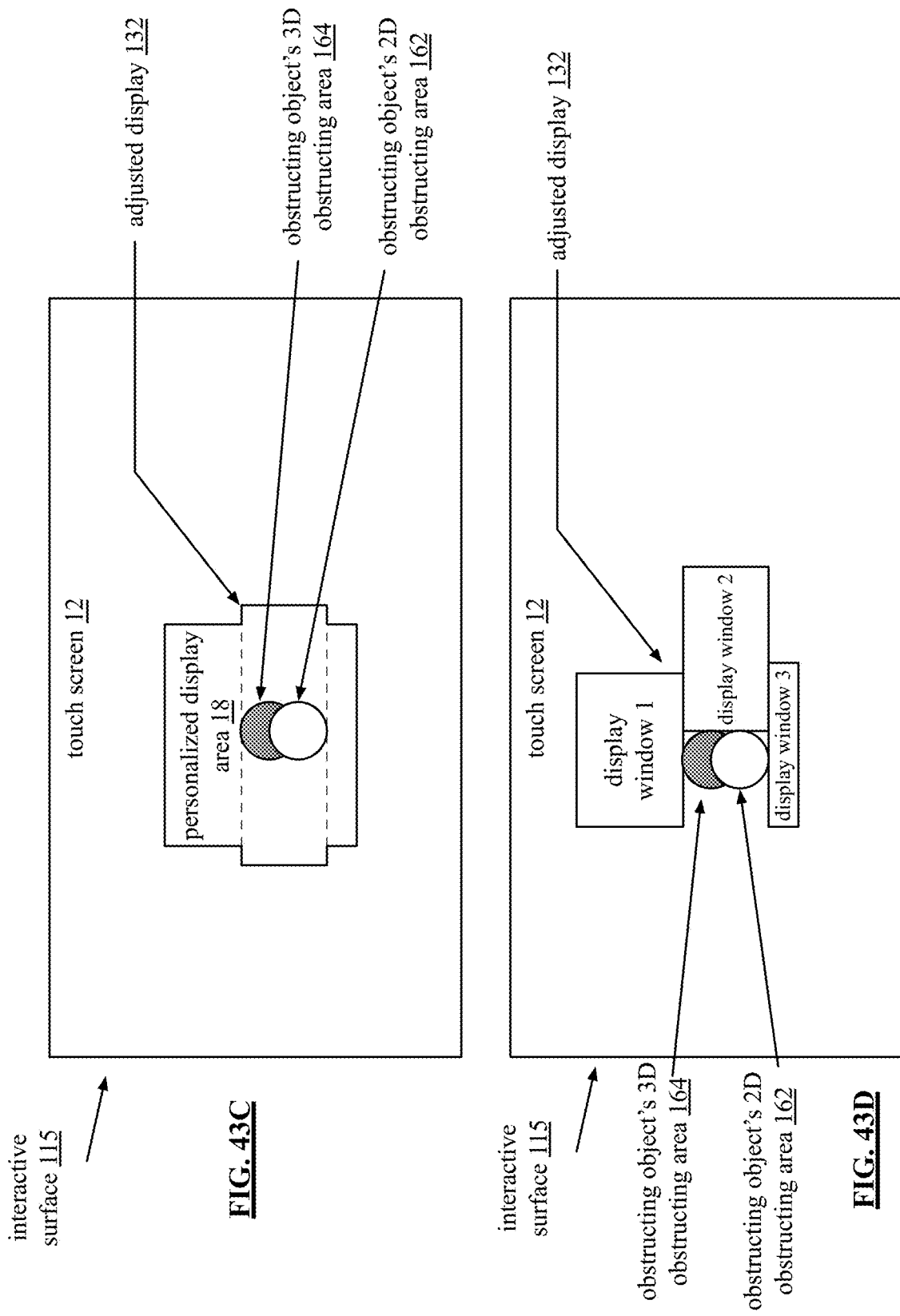

interactive display device 10

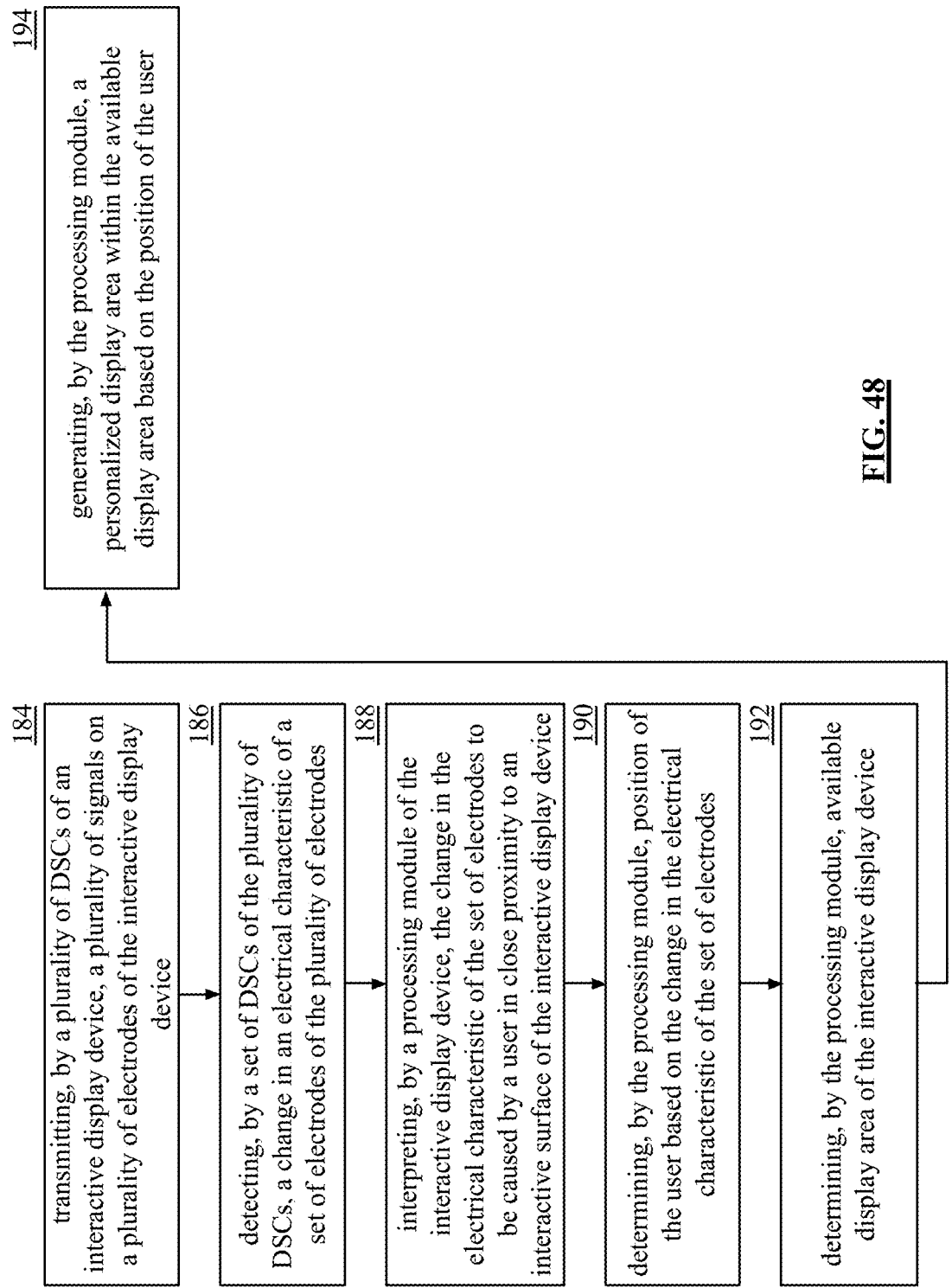

USER INPUT PASSIVE DEVICE AND INTERACTIVE DISPLAY DEVICE TOUCHSCREEN SYSTEM

STATEMENT REGARDING FEDERALLY SPONSORED RESEARCH OR DEVELOPMENT

The present U.S. Utility Patent Application claims priority pursuant to 35 U.S.C. § 120 as a continuation of U.S. Utility Application Ser. No. 16/545,365, entitled "USER INPUT PASSIVE DEVICE FOR USE WITH AN INTERACTIVE DISPLAY DEVICE," filed Aug. 20, 2019 which is hereby incorporated herein by reference in its entirety and made part of the present U.S. Utility Patent Application for all purposes.

INCORPORATION-BY-REFERENCE OF MATERIAL SUBMITTED ON A COMPACT DISC

Not Applicable.

BACKGROUND OF THE INVENTION

Technical Field of the Invention

This invention relates to computer systems and more particularly to interaction with a touch screen of a computing device.

Description of Related Art

Computers include user interfaces to receive data from a user and to output data to a user. A common user interface is a graphical user interface (GUI) that provides images, or icons, for various types of data input (e.g., select a file, edit a word, type a character, draw a picture, look at a photo, format a document, etc.). In an example, the user selects an icon by manipulating a mouse to align a cursor with an icon and then "selects" the icon. In another example, the user selects an icon by touching a touch screen interface with the user's finger or with a user input device. User input devices may be passive or active. Active devices provide power gain to a circuit whereas passive devices do not provide power gain to a circuit and do not transmit stimulus signals. For example, a traditional capacitive pen is a user input passive device made of conductive material, contains no battery, and interacts with a touch screen in the same manner as a user's finger.

BRIEF DESCRIPTION OF THE SEVERAL VIEWS OF THE DRAWING(S)

FIGS. 7A-7B are schematic block diagrams of examples of capacitance of a touch screen with no contact with a user passive device in accordance with the present invention;

FIGS. 13A-13B are schematic block diagrams of examples of capacitance of a touch screen system in accordance with the present invention;

FIGS. 14A-14B are schematic block diagrams of examples of capacitance of a touch screen system in accordance with the present invention;

FIGS. 16A-16B are schematic block diagrams of examples of mutual capacitance changes to electrodes with a parallel tank circuit as the impedance circuit in accordance with the present invention;

FIGS. 17A-17B are schematic block diagrams of examples of mutual capacitance changes to electrodes with a series tank circuit as the impedance circuit in accordance with the present invention;

FIG. 27 is a schematic block diagram of an embodiment of the user input passive device interacting with the touch screen in accordance with the present invention;

FIGS. 37A-37D are schematic block diagrams of examples of adjusting a personalized display area in accordance with the present invention;

FIG. 42 is a schematic block diagram of another embodiment of the interactive display device in accordance with the present invention;

FIGS. 43A-43E are schematic block diagrams of examples of adjusting a personalized display area in accordance with the present invention;

FIG. 48 is a logic diagram of an example of a method of generating a personalized display area in accordance with the present invention.

DETAILED DESCRIPTION OF THE INVENTION

Figure 1:
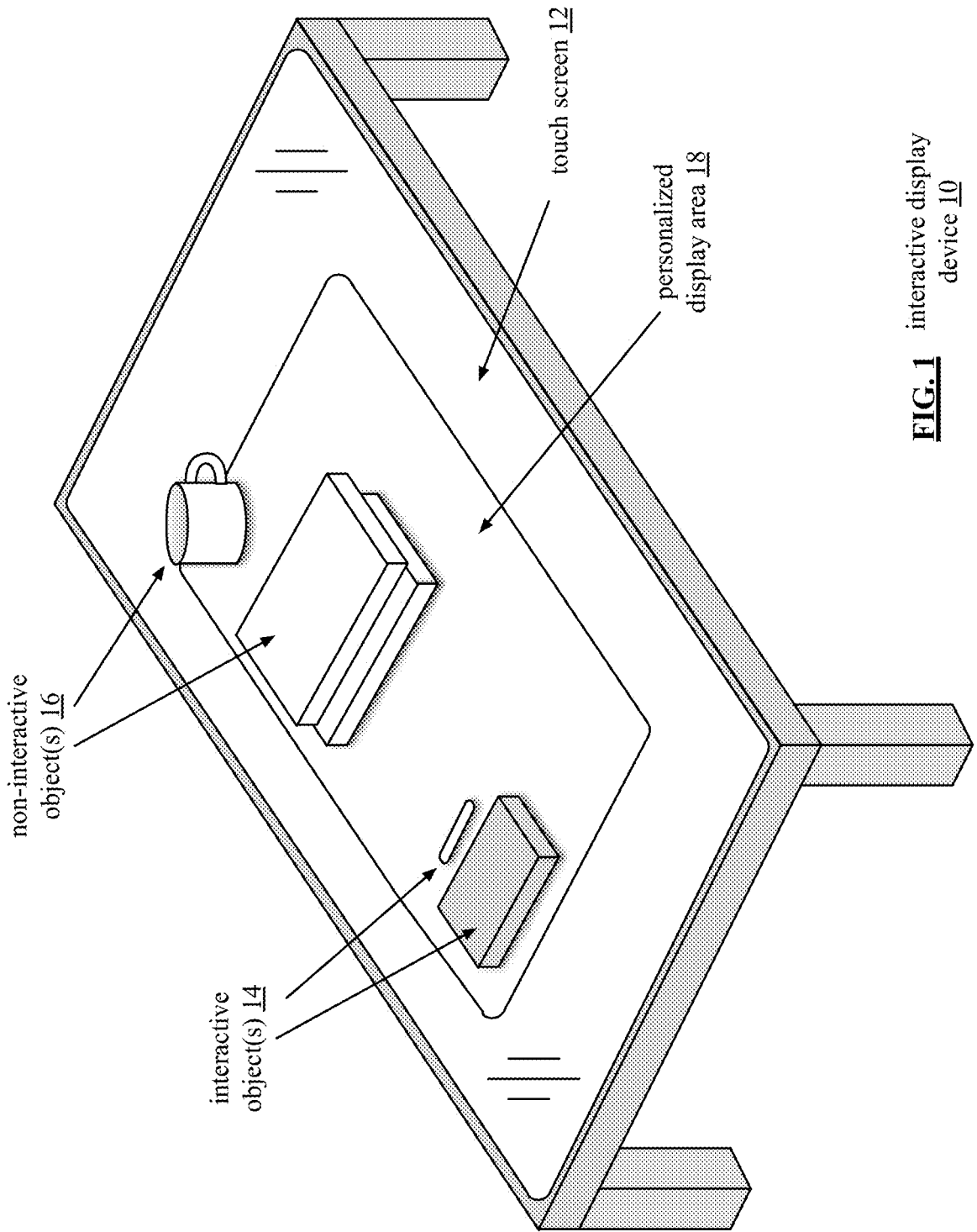
FIG. 1 is a schematic block diagram of an embodiment of an interactive display device in accordance with the present invention.

FIG. 1 is a schematic block diagram of an embodiment of an interactive display device 10 having a touch screen 12, which may further include a personalized display area 18 to form an interactive touch screen display (also referred to herein as an interactive surface). Personalized display area 18 may extend to all of touch screen 12 or a portion as shown. Further, touch screen 12 may include multiple personalized display areas 18 (e.g., for multiple users, functions, etc.). The interactive display device 10, which will be discussed in greater detail with reference to one or more of FIGS. 2-3, may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core.

A fixed computing device may be a computer (PC), an interactive white board, an interactive table top, an interactive desktop, an interactive display, a computer server, a cable set-top box, vending machine, an Automated Teller Machine (ATM), an automobile, a satellite receiver, a television set, a printer, a fax machine, home entertainment equipment, a video game console, and/or any type of home or office computing equipment. An interactive display functions to provide users with an interactive experience (e.g., touch the screen to obtain information, be entertained, etc.). For example, a store provides interactive displays for customers to find certain products, to obtain coupons, to enter contests, etc.

Here, the interactive display device 10 is implemented as an interactive table top. An interactive table top is an interactive display device 10 that has a touch screen display for interaction with users but also functions as a usable table top surface. For example, the interactive display device 10 may include one or more of a coffee table, a dining table, a bar, a desk, a conference table, an end table, a night stand, a cocktail table, a podium, and a product display table.

As an interactive table top, the interactive display device 10 has interactive functionality and well as non-interactive functionality. For example, interactive objects 14 (e.g., a finger, a user input passive device, a user input active device, a pen, tagged objects, etc.) interact with the touch screen 12 to communicate data with interactive display device 10. A user input passive device for interaction with the interactive display device 10 will be discussed in greater detail with reference to one or more of FIGS. 5-32.

Additionally, non-interactive objects 16 (e.g., a coffee mug, books, magazines, a briefcase, an elbow, etc.) may also be placed on the interactive display device 10 that are not intended to communicate data with the interactive display device 10. The interactive display device 10 is able to recognize objects, distinguish between interactive and non-interactive objects, and adjust the personalized display area 18 accordingly. For example, if a coffee mug is placed in the center of the personalized display area 18, the interactive display device 10 recognizes the object, recognizes that it is a non-interactive object 16 and shifts the personalized display over such that the coffee mug is no longer obstructed the user's view of the personalized display area 18. Detecting objects on the interactive display device 10 and adjusting personalized displays accordingly will be discussed in greater detail with reference to one or more of FIGS. 36-44.

Further, the interactive display device 10 supports interactions from multiple users having differing orientations around the table top. For example, the interactive display device 10 is a dining table where each user's presence around the table triggers personalized display areas 18 with correct orientation (e.g., a sinusoidal signal is generated when a user sits in a chair at the table and the signal is communicated to the interactive display device 10, the user is using/wearing a unique device having a particular frequency detected by the interactive display device 10, etc.). As another example, the use of a game piece triggers initiation of a game and the correct personalized display areas 18 are generated in accordance with the game (e.g., detection of an air hockey puck and/or striker segments the display area into a player 1 display zone and a player 2 display zone). Generation of personalized display areas 18 will be discussed in greater detail with reference to one or more of FIGS. 45-48.

Figure 2:
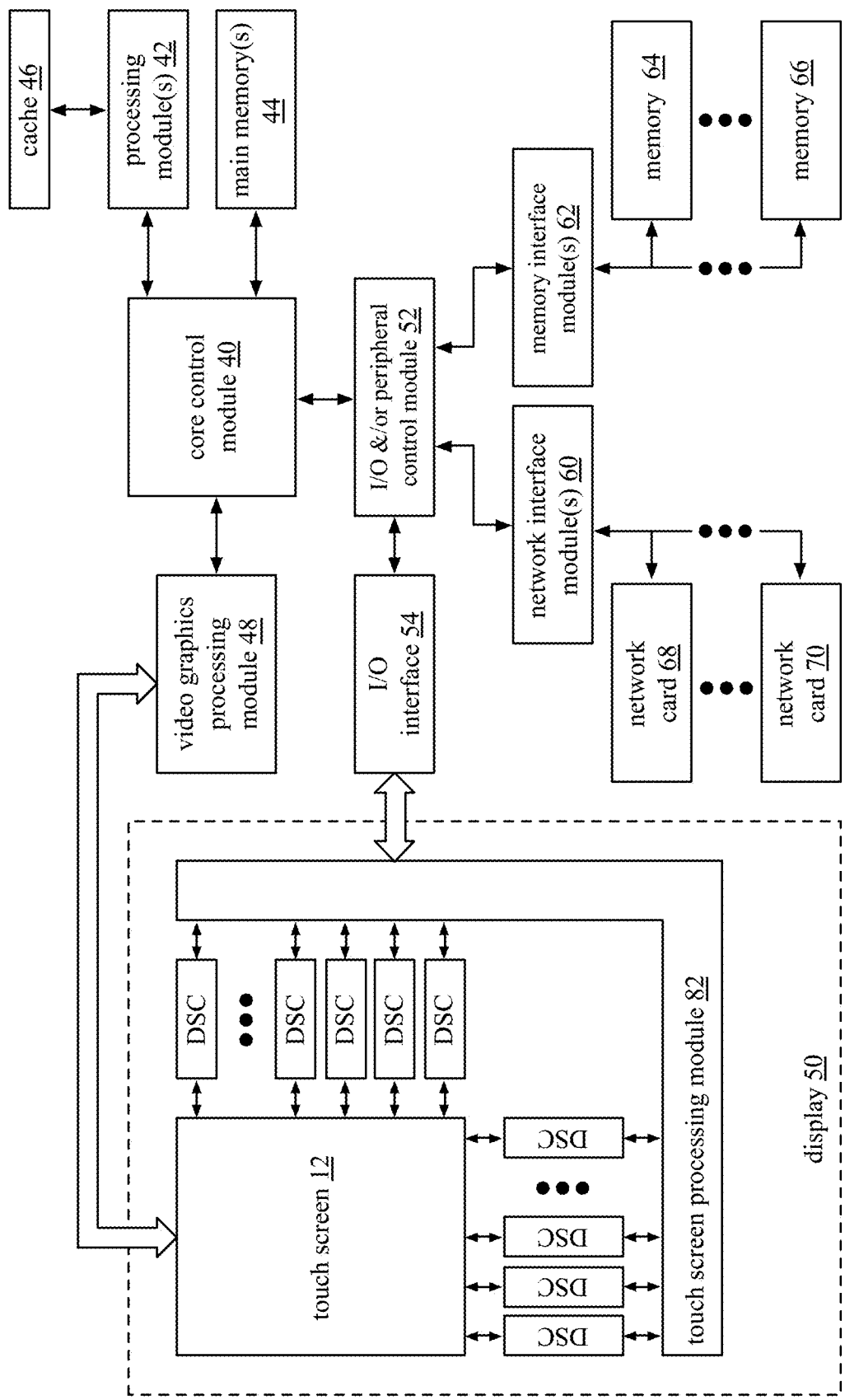
FIG. 2 is a schematic block diagram of an embodiment of the interactive display device in accordance with the present invention.

FIG. 2 is a schematic block diagram of an embodiment of an interactive display device 10 that includes a core control module 40, one or more processing modules 42, one or more main memories 44, cache memory 46, a video graphics processing module 48, a display 50, an Input-Output (I/O) peripheral control module 52, one or more input interface modules, one or more output interface modules, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and a network, or networks, via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) via the input interface module(s) and the I/O and/or peripheral control module 52. An input device includes a keypad, a keyboard, control switches, a touchpad, a microphone, a camera, etc. An input interface module includes a software driver and a hardware connector for coupling an input device to the I/O and/or peripheral control module 52. In an embodiment, an input interface module is in accordance with one or more Universal Serial Bus (USB) protocols.

The core control module 40 coordinates data communications between the processing module(s) 42 and output device(s) via the output interface module(s) and the I/O and/or peripheral control module 52. An output device includes a speaker, etc. An output interface module includes a software driver and a hardware connector for coupling an output device to the I/O and/or peripheral control module 52. In an embodiment, an output interface module is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

The display 50 includes the touch screen 12 (e.g., and personalized display area 18), a plurality of drive-sense circuits (DSC), and a touch screen processing module 82. The touch screen 12 includes a plurality of sensors (e.g., electrodes, capacitor sensing cells, capacitor sensors, inductive sensor, etc.) to detect a proximal touch of the screen. For example, when a finger or pen touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 3:
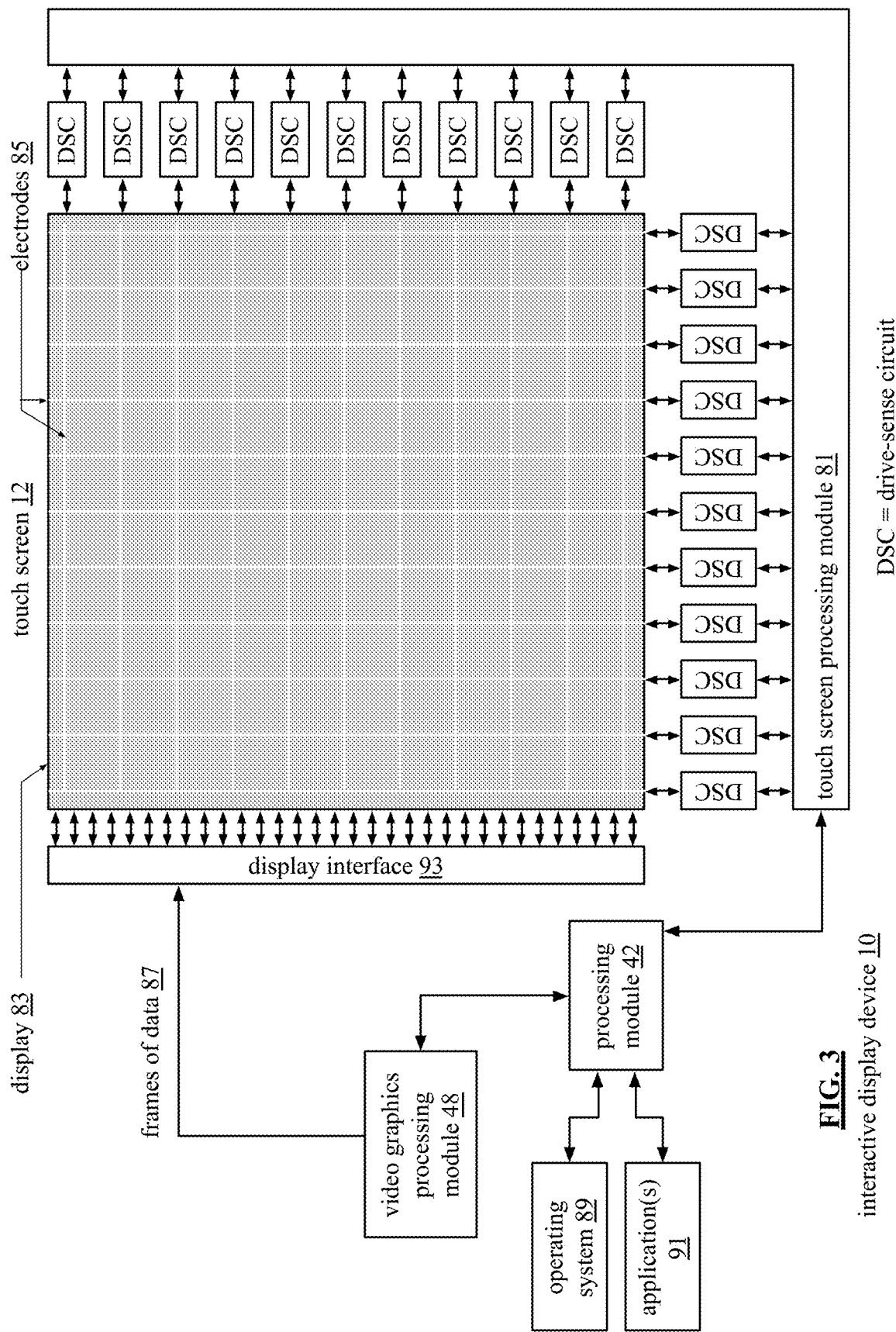
FIG. 3 is a schematic block diagram of another embodiment of the interactive display device in accordance with the present invention.

FIG. 3 is a schematic block diagram of another embodiment of an interactive display device 10 that includes the touch screen 12, the drive-sense circuits (DSC), the touch screen processing module 81, a display 83, electrodes 85, the processing module 42, the video graphics processing module 48, and a display interface 93. The display 83 may be a small screen display (e.g., for portable computing devices) or a large screen display (e.g., for fixed computing devices). In general, a large screen display has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it is not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->= 7680 | 720->= 4320 | 1:1, 2:3, etc. | 2:3 | 50, 55, 60, 65, 70, 75, &/or >80 |

The display 83 is one of a variety of types of displays that is operable to render frames of data 87 into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The touch screen 12 includes integrated electrodes 85 that provide the sensors the touch sense part of the touch screen display. The electrodes 85 are distributed throughout the display area or where touch screen functionality is desired. For example, a first group of the electrodes are arranged in rows and a second group of electrodes are arranged in columns.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, a gaming application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of data 87 to the display 83, which renders the frames of data 87 into visible images.

While the display 83 is rendering the frames of data 87 into visible images, the drive-sense circuits (DSC) provide sensor signals to the electrodes 85. When the screen is touched by a pen or device, signals on the electrodes 85 proximal to the touch (i.e., directly or close by) are changed. The DSCs detect the change for effected electrodes and provide the detected change to the touch screen processing module 81.

The touch screen processing module 81 processes the change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

If the signals received from a device include embedded data, the touch screen processing module 81 interprets the embedded data and provides the resulting information to the processing module 42. If, interactive display device 10 is not equipped to process embedded data, the device still communicates with the interactive display device 10 using the change to the signals on the effected electrodes (e.g., increase magnitude, decrease magnitude, phase shift, etc.).

Figure 4A:
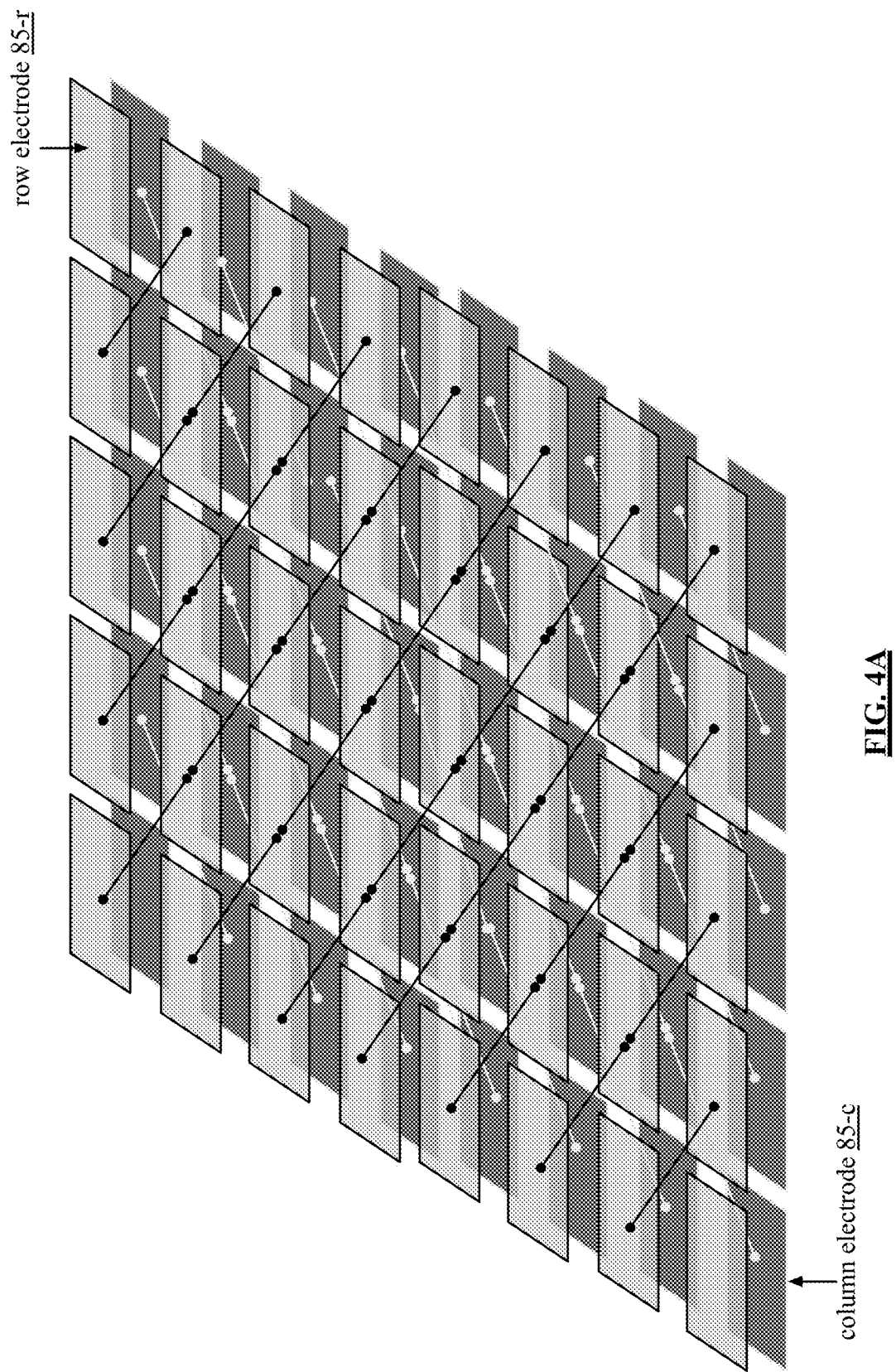
FIGS. 4A-4B are schematic block diagrams of embodiments of a touch screen electrode pattern in accordance with the present invention.
Figure 4B:
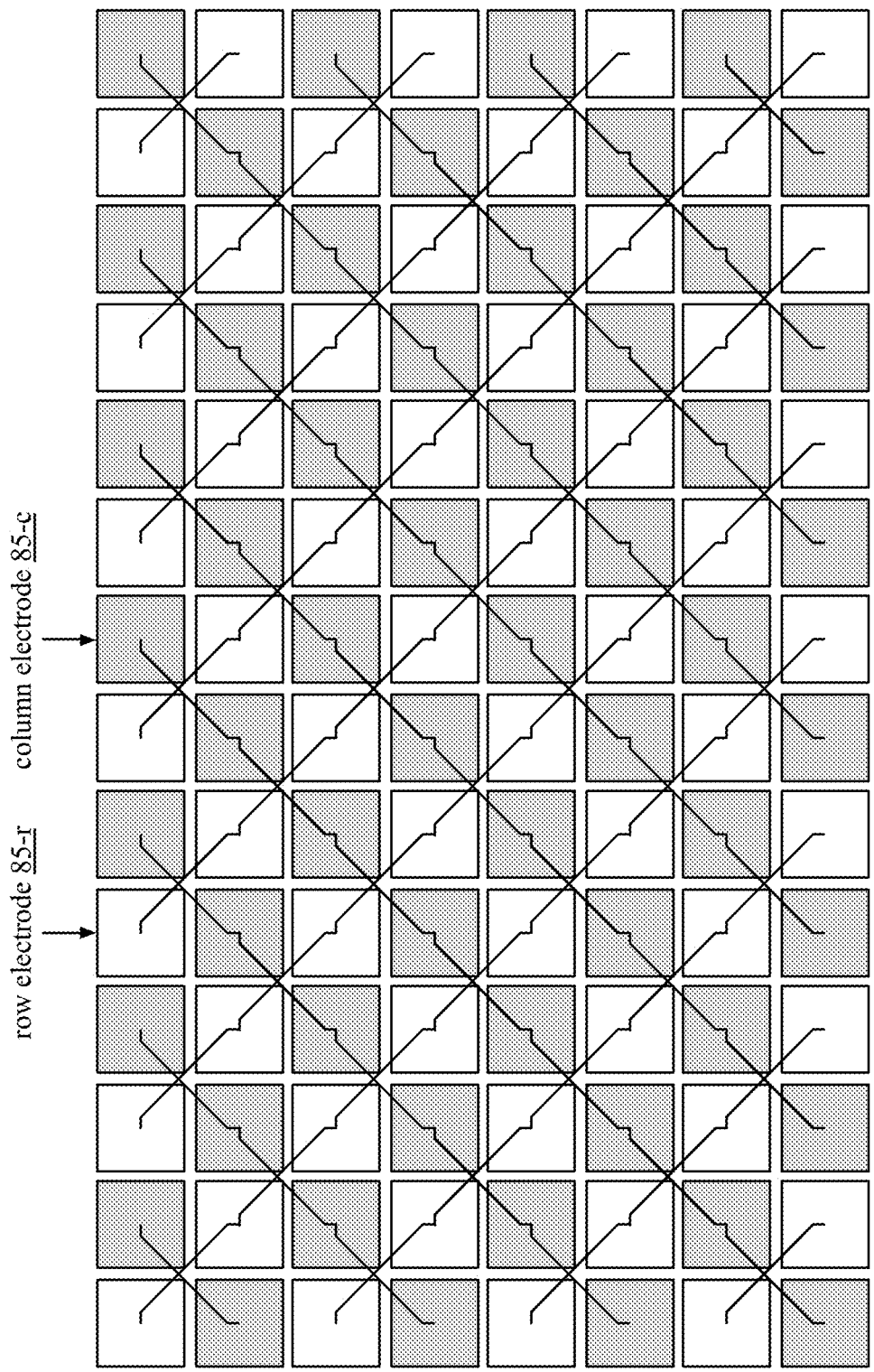

FIGS. 4A-4B are schematic block diagrams of embodiments of a touch screen electrode pattern that includes rows of electrodes 85-r and columns of electrodes 85-c. Each row of electrodes 85-r and each column of electrodes 85-c includes a plurality of individual conductive cells (e.g., capacitive sense plates) (e.g., light gray squares for rows, dark gray squares for columns) that are electrically coupled together. The size of a cell depends on the desired resolution of touch sensing. For example, a cell size may be 1 millimeter by 1 millimeter to 5 millimeters by 5 millimeters to provide adequate touch sensing for cell phones and tablets. Making the cells smaller improves touch resolution and will typically reduce touch sensor errors (e.g., touching a "w" by an "e" is displayed). While the cells are shown to be square, they may be of any polygonal shape, diamond, or circular shape.

The cells for the rows and columns may be on the same layer or on different layers. In FIG. 4A, the cells for the rows and columns are shown on different layers. In FIG. 4B, the cells for the rows and columns are shown on the same layer. The electric coupling between the cells is done using vias and running traces (e.g., wire traces) on another layer. Note that the cells are on one or more ITO layers of a touch screen, which includes a touch screen display.

Figure 5:
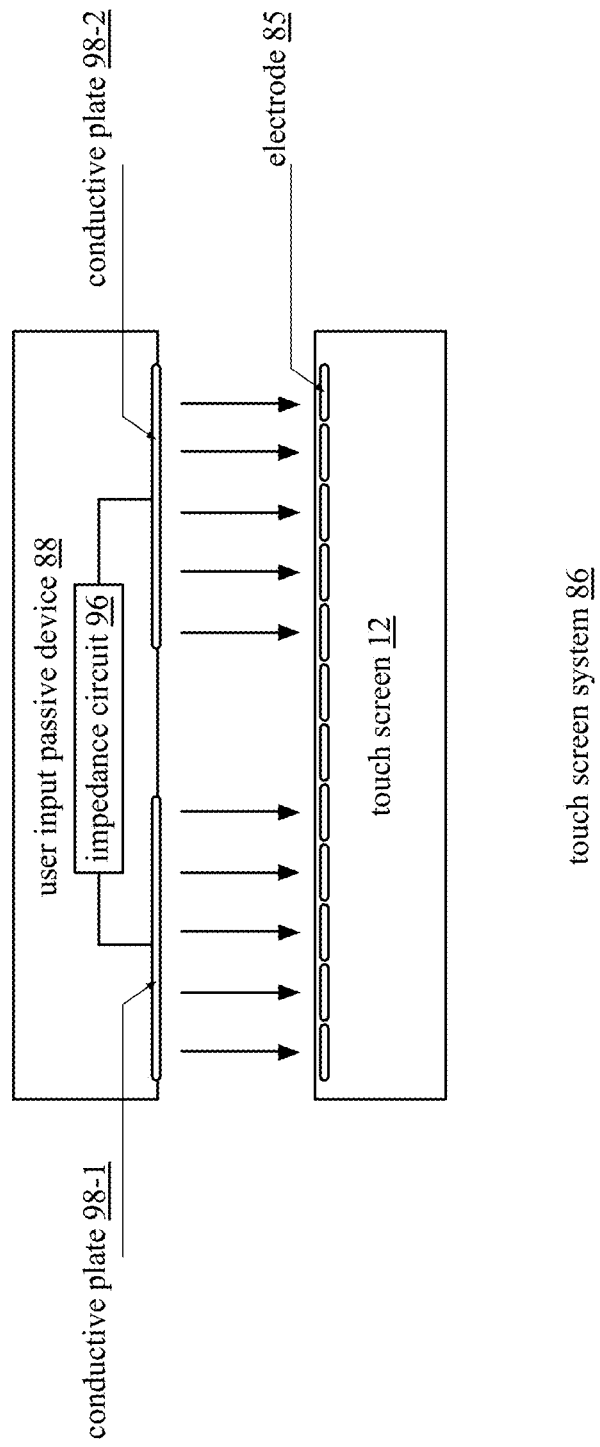
FIG. 5 is a schematic block diagram of an embodiment of a touch screen system in accordance with the present invention.

FIG. 5 is a schematic block diagram of an embodiment of a touch screen system 86 that includes a user input passive device 88 in close proximity to a touch screen 12 (e.g., interactive surface of the interactive display device 10). FIG. 5 depicts a front, cross sectional view of the user input passive device 88 (also referred to herein as the passive device 88) that includes conductive plates 98-1 and 98-2 coupled to an impedance circuit 96. The user input passive device 88 may include a plurality of conductive (i.e., electrically conductive) plates and impedance circuits.

The impedance circuit 96 and the conductive plates 98-1 and 98-2 cause an impedance and/or frequency effect on electrodes 85 when in close proximity to an interactive surface of the touch screen 12 (e.g., the passive device 88 is close to or in direct contact with the touch screen 12) that is detectable by the touch screen 12. As an alternative, conductive plates 98-1 and 98-2 may be a dielectric material. Dielectric materials generally increase mutual capacitance whereas conductive materials typically decrease mutual capacitance. The touch screen is operable to detect either or both effect. The user input passive device 88 will be discussed in greater detail with reference to one or more of FIGS. 6-25.

Figure 6A:
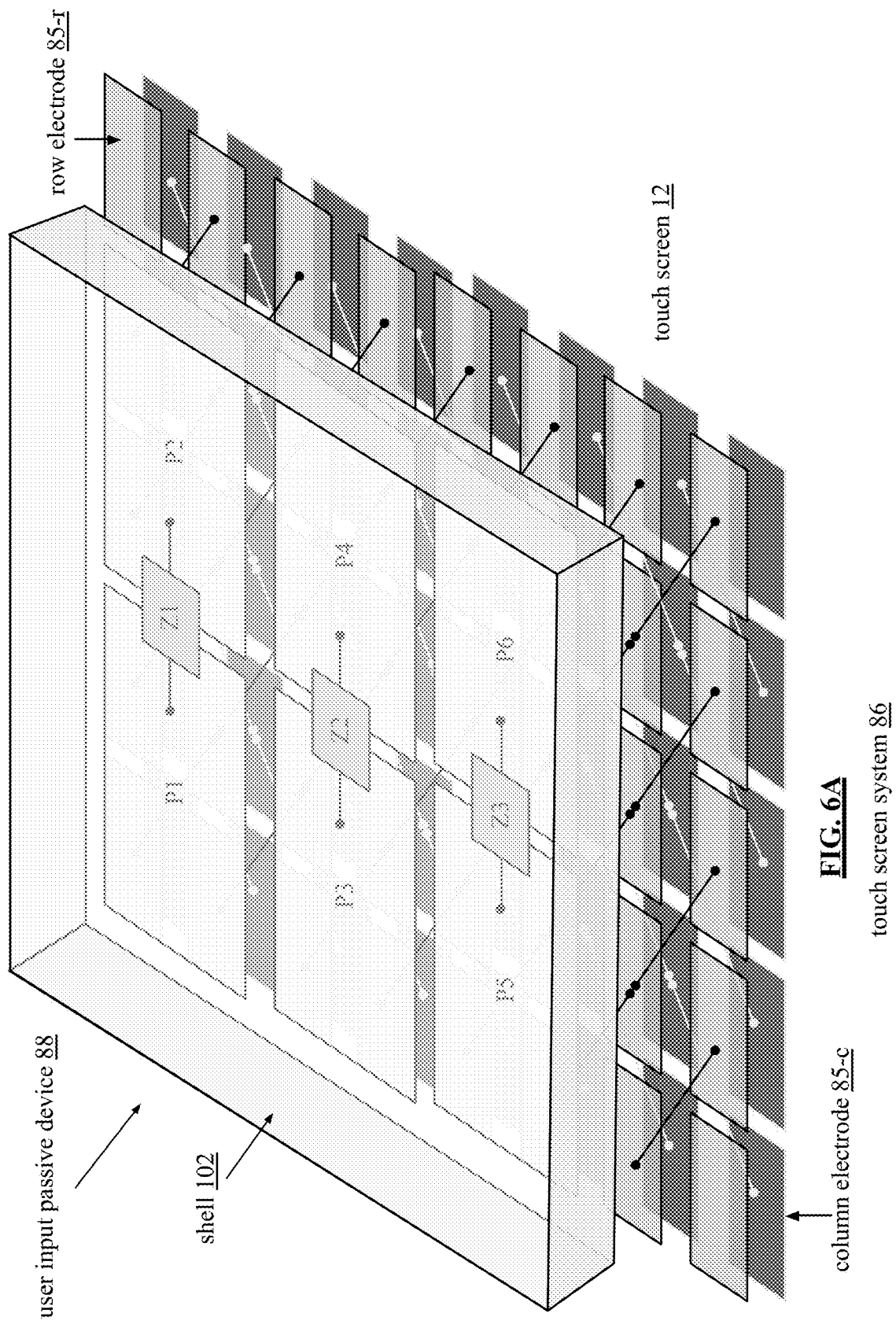
FIGS. 6A-6B are schematic block diagrams of embodiments of a touch screen system in accordance with the present invention.
Figure 6B:
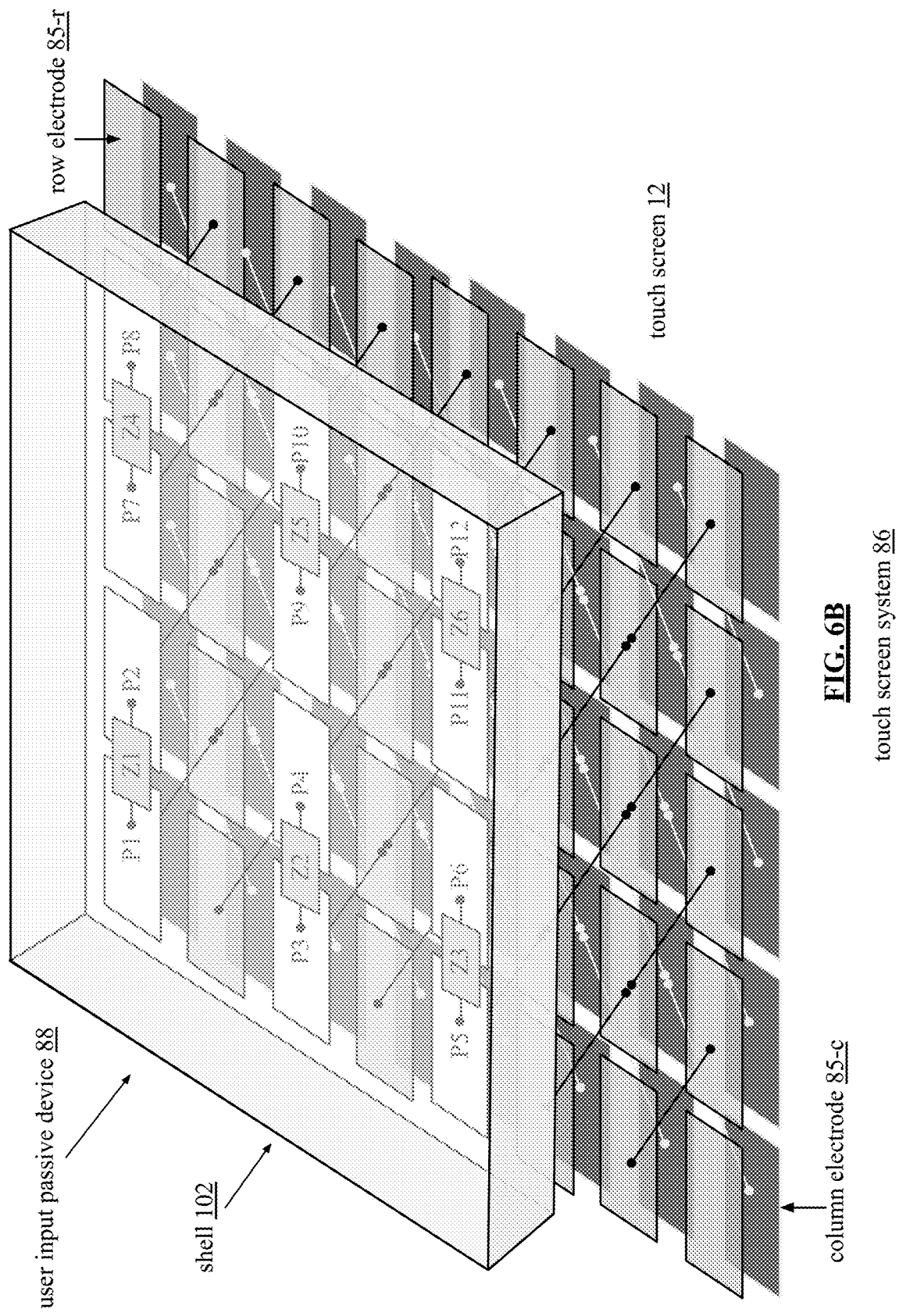

FIGS. 6A-6B are schematic block diagrams of embodiments of a touch screen system 86 that include a simplified depiction of the touch screen 12 as a touch screen electrode pattern that includes rows of electrodes 85-$r$ and columns of electrodes 85-$c$ and a simplified depiction of the user input passive device 88 with a transparent housing for ease of viewing the bottom surface.

The row electrodes 85-$r$ (light gray squares) and the column electrodes 85-$c$ (dark gray squares) of the touch screen 12 are on different layers (e.g., the rows are layered above the columns). A mutual capacitance is created between a row electrode and a column electrode.

The user input passive device 88 includes a housing that includes a shell 102 (e.g., conductive, non-conductive, dielectric, etc.), a non-conductive supporting surface (not shown), a plurality of impedance circuits, and a plurality of conductive plates. The plurality of conductive plates are mounted on the non-conductive supporting surface such that the shell 102 and the plurality of conductive plates are electrically isolated from each other and able to affect the touch screen 12 surface. The impedance circuits and the conductive plates that may be arranged in a variety of patterns (e.g., equally spaced, staggered, diagonal, etc.). The size of the conductive plates varies depending on the size of the electrode cells and the desired impedance and/or frequency change to be detected.

One or more of the plurality of impedance circuits and plurality of conductive plates cause an impedance and/or frequency effect when the user input passive device 88 is in close proximity to an interactive surface of the touch screen 12 (e.g., the passive device 88 is resting on or near the touch screen 12). The impedance and/or frequency effects detected by the touch screen 12 are interpreted as device identification, orientation, one or more user functions, one or more user instructions, etc.

In FIG. 6A, the user input passive device 88 includes impedance circuits Z1-Z3 and conductive plates P1-P6. Each of the conductive plates P1-P6 are larger than each electrode of the touch screen 12 in order to affect multiple touch screen electrodes per plate. For example, a conductive plate may be 2-10 times larger than an electrode. In this example, the conductive plates are shown having approximately four times the area of an electrode (e.g., an electrode is approximately 5 millimeters by 5 millimeters and a conductive plate is approximately 10 millimeters by 10 millimeters). With multiple electrodes affected per plate, the impedance and/or frequency effect caused by a particular plate can be better identified by the touch screen 12.

In FIG. 6B, the user input passive device 88 includes impedance circuits Z1-Z6 and conductive plates P1-P12. In the example of FIG. 6B, each conductive plate is approximately the same size as an electrode. Each conductive plate may be the same size as an electrode or smaller than an electrode. While less electrodes are affected per plate than in the example of FIG. 6A, multiple electrodes are affected (e.g., relative impedance changes and/or direct impedance changes) in a particular pattern recognizable to the touch screen 12. The user input passive device 88 will be discussed in greater detail with reference to one or more of FIGS. 7A-25.

FIGS. 7A-7B are cross section schematic block diagrams of examples of capacitance of a touch screen 12 with no contact with a user input passive device 88. The electrode 85$s$ are positioned proximal to dielectric layer 92, which is between a cover dielectric layer 90 and the display substrate 94. In FIG. 7A, the row electrodes 85-$r$1 and 85-$r$2 are on a layer above the column electrodes 85-$c$1 and 85-$c$2. In FIG. 7B, the row electrodes 85-$r$ and the column electrodes 85-$c$ are on the same layer. Each electrode 85 has a self-capacitance, which corresponds to a parasitic capacitance created by the electrode with respect to other conductors in the display (e.g., ground, conductive layer(s), and/or one or more other electrodes).

For example, row electrode 85-$r$1 has a parasitic capacitance $C_{p2}$, column electrode 85-$c$1 has a parasitic capacitance $C_{p1}$, row electrode 85-$r$2 has a parasitic capacitance $C_{p4}$, and column electrode 85-$c$2 has a parasitic capacitance $C_{p3}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic self-capacitance.

As shown, the touch screen 12 includes a plurality of layers 90-94. Each illustrated layer may itself include one or more layers. For example, dielectric layer 90 includes a surface protective film, a glass protective film, and/or one or more pressure sensitive adhesive (PSA) layers. As another example, the second dielectric layer 92 includes a glass cover, a polyester (PET) film, a support plate (glass or plastic) to support, or embed, one or more of the electrodes 85-$c$1, 85-$c$2, 85-$r$1, and 85-$r$2 (e.g., where the column and row electrodes are on different layers), a base plate (glass, plastic, or PET), an ITO layer, and one or more PSA layers. As yet another example, the display substrate 94 includes one or more LCD layers, a back-light layer, one or more reflector layers, one or more polarizing layers, and/or one or more PSA layers.

A mutual capacitance (Cm_1 and Cm_2) exists between a row electrode and a column electrode. When no touch and/or device is present, the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

Touch screen 12 includes a plurality of drive sense circuits (DSCs). The DSCs are coupled to the electrodes and detect changes for affected electrodes. The DSC functions as described in co-pending patent application entitled, "DRIVE SENSE CIRCUIT WITH DRIVE-SENSE LINE", having a serial number of Ser. No. 16/113,379, and a filing date of Aug. 27, 2018.

Figure 8:
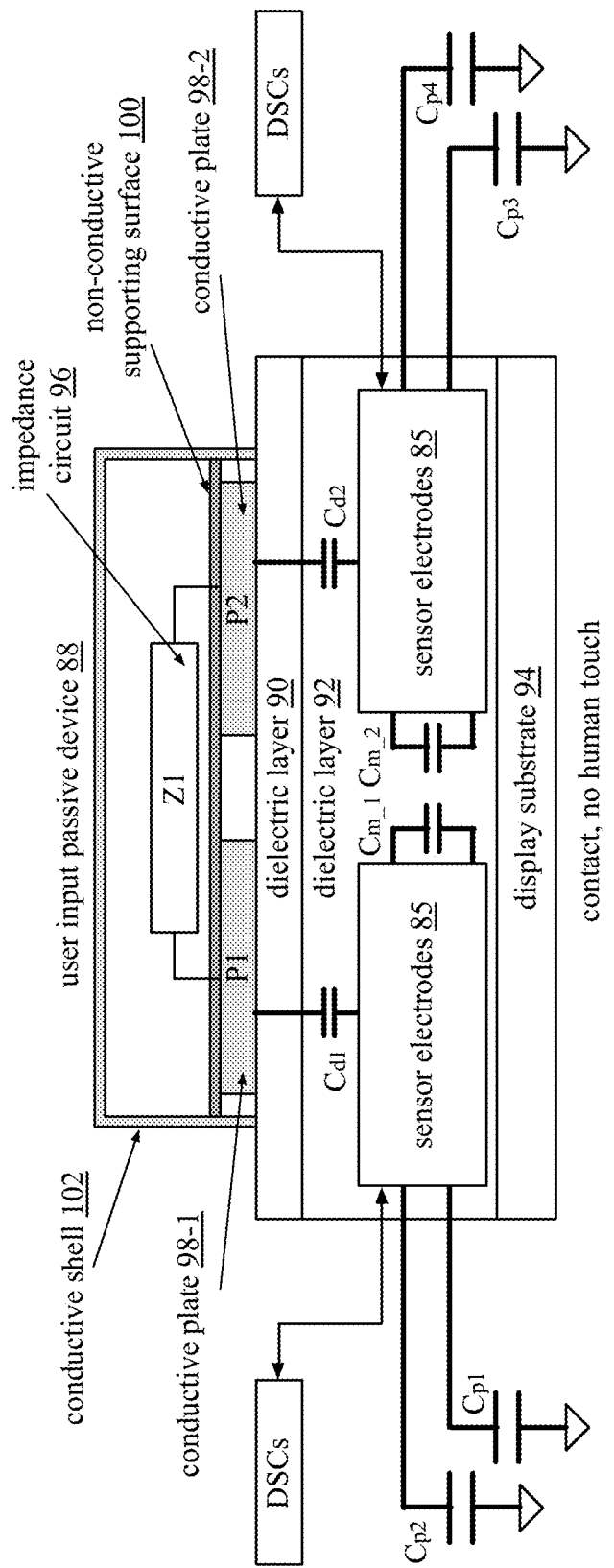
FIG. 8 is a schematic block diagram of an example of capacitance of a touch screen system in accordance with the present invention.

FIG. 8 is a schematic block diagram of an example of capacitance of a touch screen system 86 that includes the touch screen 12 and a user input passive device 88 in contact with the touch screen 12. In this example, the user input passive device 88 is in contact (or within a close proximity) with an interactive surface of the touch screen 12 but there is no human touch on the user input passive device 88.

The user input passive device 88 includes impedance circuit 96, conductive plates 98-1 and 98-2, a non-conductive supporting surface 100, and a conductive shell 102. The conductive shell 102 and non-conductive supporting surface shell 100 together form a housing for the user input passive device 88. The housing has an outer shape corresponding to at least one of: a computing mouse, a game piece, a cup, a utensil, a plate, and a coaster. The conductive shell 102 may alternatively be a non-conductive or dielectric shell. When the shell 102 is non-conductive, a human touch does not provide a path to ground and does not affect both self-capacitance and mutual capacitance of the sensor electrodes 85. In that example, only mutual capacitance changes from the conductive plates are detected by touch screen 12 when the user input passive device 88 is in close proximity to the touch screen 12 surface. Because additional functionality exists when the shell is conductive, the shell 102 is referred to as conductive shell 102 in the remainder of the examples.

The conductive plates 98-1 and 98-2 and the conductive shell 102 are in contact with the touch screen 12's interactive surface. The non-conductive supporting surface 100 electrically isolates the conductive shell 102, the conductive plate 98-1, and the conductive plate 98-2. The impedance circuit 96 connects the conductive plate 98-1 and the conductive plate 98-2 and has a desired impedance at a desired frequency. The impedance circuit 96 is discussed with more detail with reference to FIGS. 15A-15F.

The user input passive device 88 is capacitively coupled to one or more sensor electrodes 85 proximal to the contact. The sensor electrodes 85 may be on the same or different layers as discussed with reference to FIGS. 7A-7B. Because the conductive plates 98-1 and 98-2 and the conductive shell 102 are electrically isolated, when a person touches the conductive shell 102 of the passive device 88, the person provides a path to ground such that the conductive shell 102 affects both the mutual capacitance and the self-capacitance.

When the passive device 88 is not touched by a person (as shown here), there is no path to ground and the conductive shell 102 only affects the mutual capacitance. The conductive plates 98-1 and 98-2 do not have a path to ground regardless of a touch and thus only affect mutual capacitance when the passive device is touched or untouched. Because the contact area of the conductive plates 98-1 and 98-2 is much larger than the conductive shell 102, the mutual capacitance change(s) detected is primarily due to the conductive plates 98-1 and 98-2 and the effect of the impedance circuit 96 not the conductive shell 102.

As an example, when the user input passive device 88 is resting on the touch screen 12 with no human touch, the user input passive device 88 is capacitively coupled to the touch screen 12 of the touch screen system 86 via capacitance Cd1 and Cd2 (e.g., where Cd1 and Cd2 are with respect to a row and/or a column electrode). Depending on the area of the conductive plates 98-1 and 98-2, the effect of the impedance circuit 96, and the dielectric layers 90-92, the capacitance of Cd1 or Cd2 is in the range of 1 to 2 pico-Farads. The values of Cd1 and Cd2 affect mutual capacitances Cm_1 and Cm_2. For example, Cd1 and Cd2 may raise or lower the value of Cm_1 and Cm_2 by approximately 1 pico-Farad. Examples of the mutual capacitance changes caused by the passive device 88 will be discussed in more detail with reference to FIGS. 16A-25.

In this cross-sectional view, two conductive plates and one impedance circuit are shown. However, the passive device 88 may include multiple sets of conductive plates where each set is connected by an impedance circuit. The various sets of conductive plates can have different impedance effects on the electrodes of the touch screen which can correspond to different information and/or passive device functions.

Drive-sense circuits (DSC) are operable to detect the changes in mutual capacitance and/or other changes to the electrodes and interpret their meaning. For example, by detecting changes in mutual capacitance and/or by detecting characteristics of the impedance circuit 96 (e.g., a sweep for resonant frequency of an impedance circuit 96), the DSCs of the touch screen 12 determines the presence, identification (e.g., of a particular user), and/or orientation of the user input passive device 88.

Figure 9:
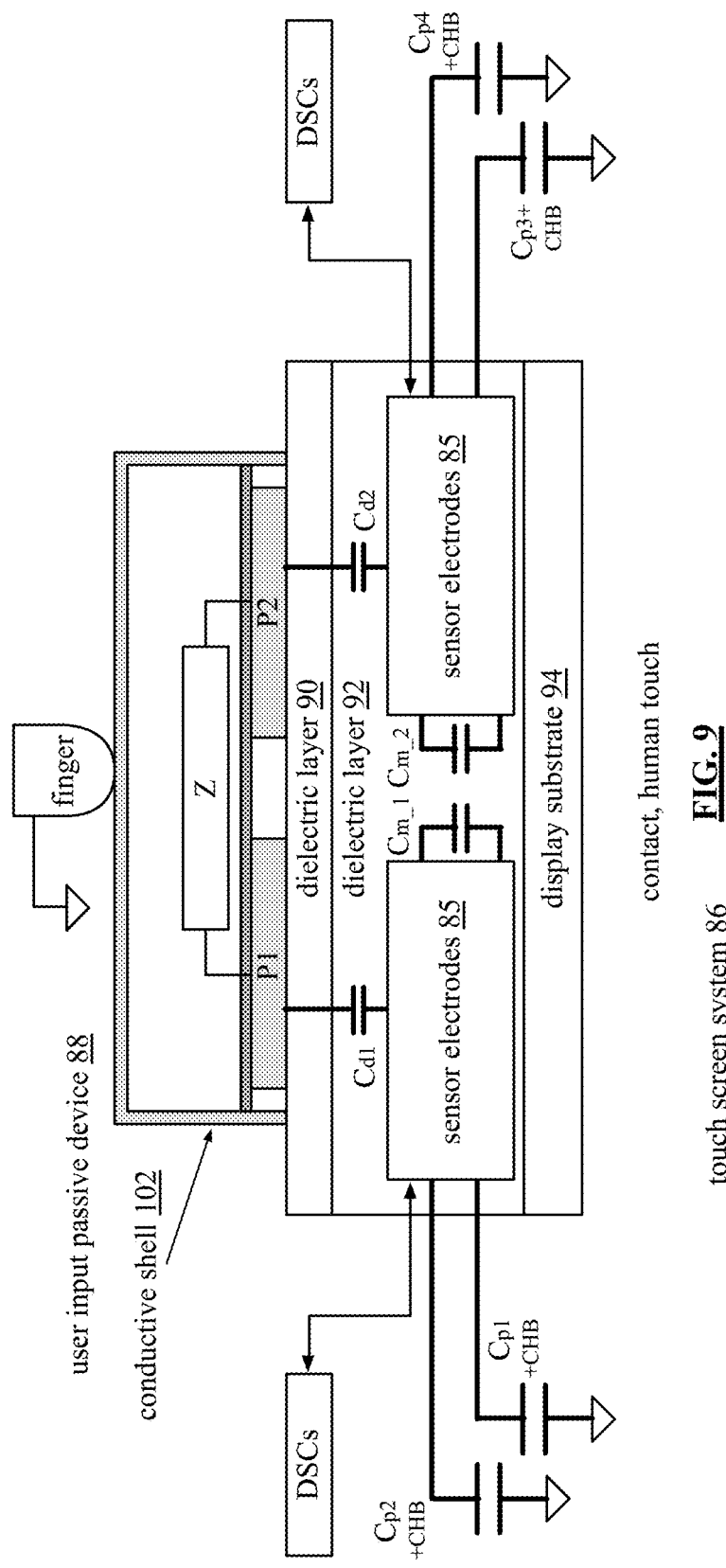
FIG. 9 is a schematic block diagram of another example of capacitance of the touch screen system in accordance with the present invention.

FIG. 9 is a schematic block diagram of another example of capacitance of a touch screen system 86 that includes the touch screen 12 and a user input passive device 88 in contact with the touch screen 12. In this example, the user input passive device 88 is in contact (or within a close proximity) with the touch screen 12 and there is a human touch on the conductive shell 102 of the user input passive device 88. When a person touches the conductive shell 102 of the passive device 88, the person provides a path to ground such that the conductive shell 102 affects both the mutual capacitance and the self-capacitance. Here, parasitic capacitances Cp1, Cp2, Cp3, and Cp4 are shown as affected by CHB (the self-capacitance change caused by the human body).

Drive-sense circuits (DSC) are operable to detect the changes in self capacitance and/or other changes to the electrodes and interpret their meaning. For example, by detecting changes in self capacitance along with mutual capacitance changes, the DSCs of the touch screen 12 determines that the user input passive device 88 is on the touch screen 12 and that it is in use by a user. While the user input passive device 88 continues to be touched (e.g., the self-capacitance change is detected), mutual capacitance changes may indicate different functions. For example, without a touch, a mutual capacitance changes caused by the conductive plates ID the passive device. With a touch, the mutual capacitance change caused by the conductive plates can indicate a selection, an orientation, and/or any user initiated touch screen function.

In an embodiment where the conductive shell 102 is not conductive, a person touching the passive device does not provide a path to ground and a touch only minimally affects mutual capacitance.

Figure 10:
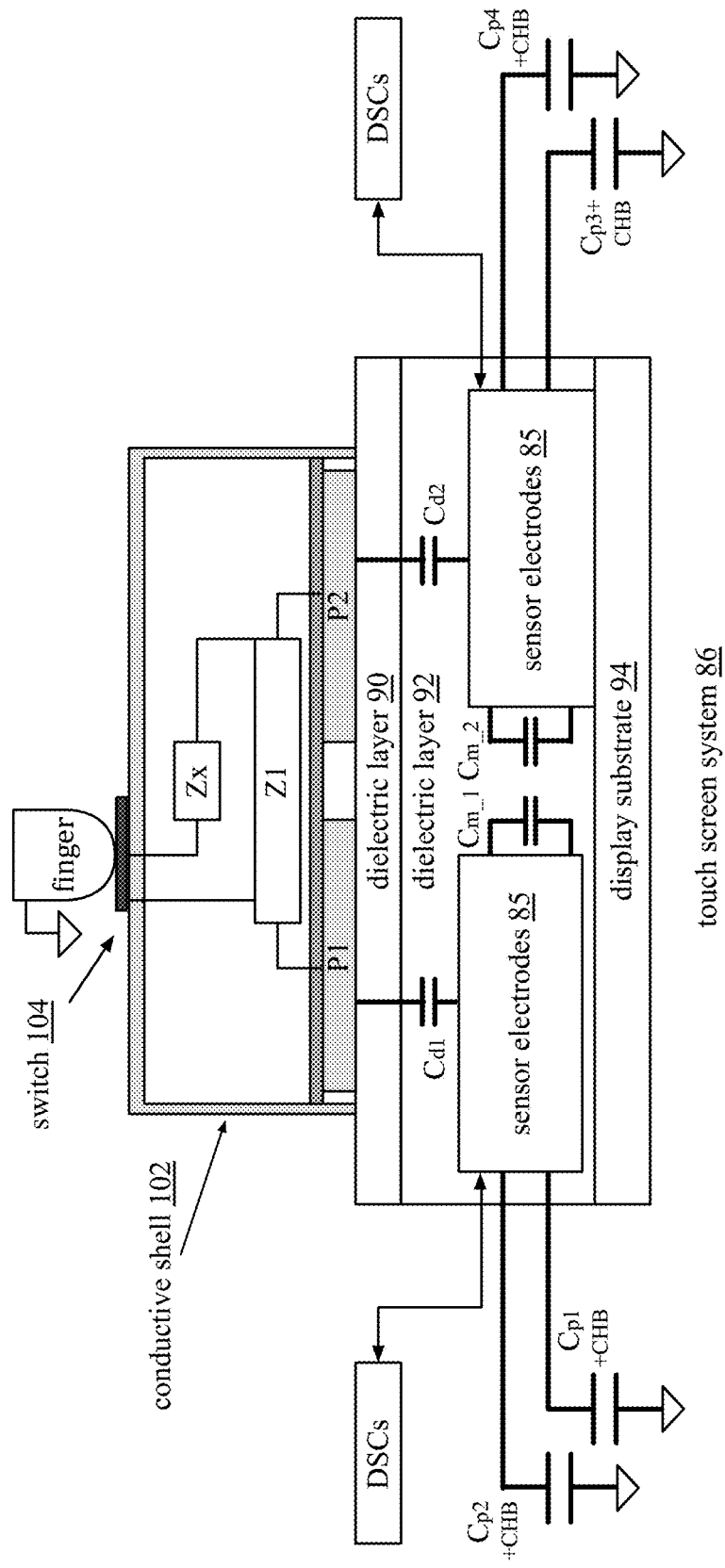
FIG. 10 is a schematic block diagram of another example of capacitance of the touch screen system in accordance with the present invention.

FIG. 10 is a schematic block diagram of another example of capacitance of a touch screen system 86 that includes the touch screen 12 and a user input passive device 88 in contact with the touch screen 12. In this example, the user input passive device 88 is in contact (or in close proximity) with the touch screen 12 and there is a human touch on the conductive shell 102 of the user input passive device 88.

When a person touches the conductive shell 102 of the passive device 88, the person provides a path to ground such that the conductive shell 102 affects both the mutual capacitance and the self-capacitance. Here, parasitic capacitances Cp1, Cp2, Cp3, and Cp4 are shown as affected by CHB (the self-capacitance change caused by the human body).

Further, in this example, the conductive shell includes a switch mechanism (e.g., switch 104) on the conductive shell 102 of the passive device 88 housing. When a user presses (or otherwise engages/closes) the switch 104, the impedance circuit is adjusted (e.g., the impedance circuit Zx is connected to Z1 in parallel). Adjusting the impedance circuit causes a change to Cd1 and Cd2 thus affecting the mutual capacitances Cm_1 and Cm_2. The change in impedance can indicate any number of functions such as a selection, a right click, erase, highlight, select, etc.

While one switch is shown here, multiple switches can be included where each impedance caused by an open and closed switch represents a different user function. Further, gestures or motion patterns can be detected via the impedance changes that corresponding to different functions. For example, a switch can be touched twice quickly to indicate a double-click. As another example, the switch can be pressed and held down for a period of time to indicate another function (e.g., a zoom). A pattern of moving from one switch to another can indicate a function such as a scroll.

Figure 11:
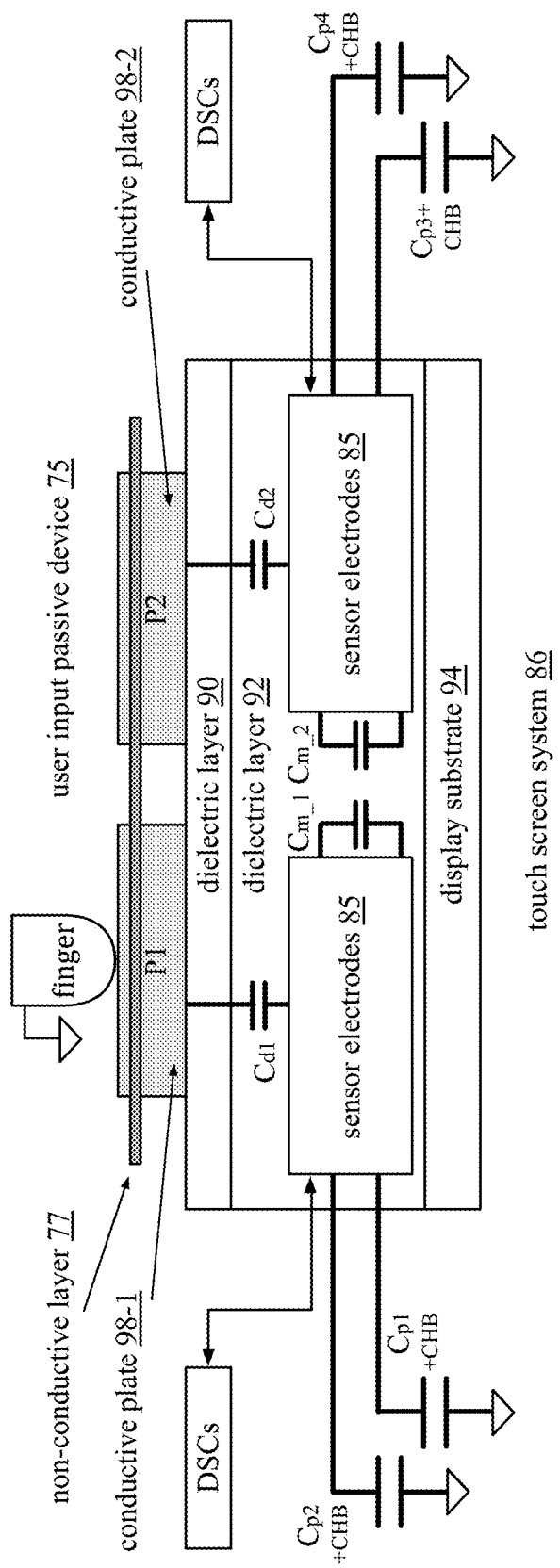
FIG. 11 is a schematic block diagram of another example of capacitance of the touch screen system in accordance with the present invention.

FIG. 11 is a schematic block diagram of another example of capacitance of a touch screen system 86 that includes the touch screen 12 and a user input passive device 75 in contact with the touch screen 12. The user input passive device 75 includes conductive plates 98-1 and 98-2, and a non-conductive layer 77. The non-conductive layer 77 electrically isolates conductive plates 98-1 and 98-2 from each other.

In this example, the user input passive device 75 is in contact (or within a close proximity) with the touch screen 12 and there is a human touch directly on the conductive plate 98-1 of the user input passive device 75. When a person touches a conductive plate of the passive device 75, the person provides a path to ground such that the conductive plates affect both the mutual capacitance and the self-capacitance of the sensor electrodes 85. With conductive plates 98-1 and 98-2 capacitively coupled (e.g., Cd1 and Cd2) to sensor electrodes 85, mutual capacitances Cm_1 and Cm_2 are affected and parasitic capacitances Cp1, Cp2, Cp3, and Cp4 are affected by CHB (the self-capacitance change caused by the human body).

Drive-sense circuits (DSC) are operable to detect the changes in self and mutual capacitance and/or other changes to the electrodes and interpret their meaning. For example, by detecting changes in self capacitance along with mutual capacitance changes, the DSCs of the touch screen 12 determines that the user input passive device 75 is on the touch screen 12 and that it is in use by a user. While the user input passive device 75 continues to be touched (e.g., the self-capacitance change is detected), mutual capacitance changes may indicate different functions. For example, without a touch, a mutual capacitance changes caused by the conductive plates ID the passive device. With a touch, the mutual capacitance change caused by the conductive plates can indicate a selection, an orientation, and/or any user initiated touch screen function.

While two conductive plates are shown here, the user input passive device 75 may include one or more conductive plates, where touches to the one or more conductive plates can indicate a plurality of functions. For example, a touch to both conductive plates 98-1 and 98-2 may indicate a selection, a touch to conductive plate 98-1 may indicate a right click, touching conductive plates in a particular pattern and/or sequence may indicate a scroll, etc. The user input passive device 75 may further include a scroll wheel in contact with one or more conductive plates, conductive pads on one or more surfaces of the device, conductive zones for indicating various functions, etc. As such, any number of user functions including traditional functions of a mouse and/or trackpad can be achieved passively.

Figure 12:
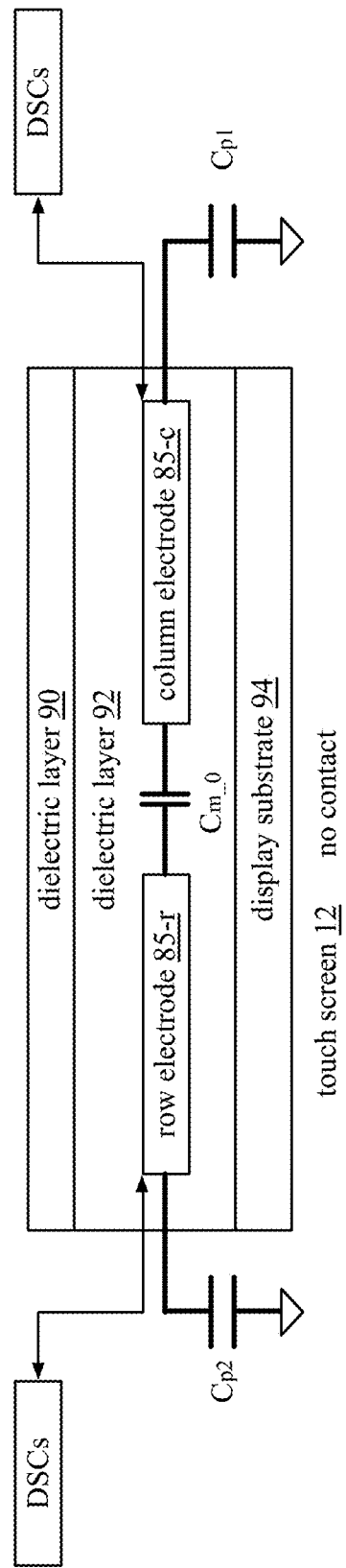
FIG. 12 is a schematic block diagram of an example of capacitance of a touch screen with no contact with a user passive device in accordance with the present invention.

FIG. 12 is a cross section schematic block diagram of an example of capacitance of a touch screen 12 with no contact with a user input passive device 88. FIG. 12 is similar to the example of FIG. 7B except one row electrode 85-$r$ and one column electrode 85-$c$ of the touch screen 12 are shown on the same layer. The electrode 85$s$ are positioned proximal to dielectric layer 92, which is between a cover dielectric layer 90 and the display substrate 94.

Each electrode 85 has a self-capacitance, which corresponds to a parasitic capacitance created by the electrode with respect to other conductors in the display (e.g., ground, conductive layer(s), and/or one or more other electrodes).

For example, row electrode 85-$r$ has a parasitic capacitance $C_{p2}$ and column electrode 85-$c$ has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic self-capacitance.

As shown, the touch screen 12 includes a plurality of layers 90-94. Each illustrated layer may itself include one or more layers. For example, dielectric layer 90 includes a surface protective film, a glass protective film, and/or one or more pressure sensitive adhesive (PSA) layers. As another example, the second dielectric layer 92 includes a glass cover, a polyester (PET) film, a support plate (glass or plastic) to support, or embed, one or more of the electrodes 85-$c$ and 85-$r$ (e.g., where the column and row electrodes are on different layers), a base plate (glass, plastic, or PET), an ITO layer, and one or more PSA layers. As yet another example, the display substrate 94 includes one or more LCD layers, a back-light layer, one or more reflector layers, one or more polarizing layers, and/or one or more PSA layers.

A mutual capacitance (Cm_0) exists between a row electrode and a column electrode. When no touch and/or device is present, the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

Touch screen 12 includes a plurality of drive sense circuits (DSCs). The DSCs are coupled to the electrodes and detect changes for affected electrodes.

FIGS. 13A-13B are schematic block diagrams of examples of capacitance of a touch screen system 86 that includes the touch screen 12 and a user input passive device 88 in contact with the touch screen 12. In this example, the user input passive device 88 is in contact (or within a close proximity) with an interactive surface of the touch screen 12 but there is no human touch on the user input passive device 88. FIGS. 13A-13B operate similarly to the example of FIG. 8 except that only one row electrode 85-$r$ and one column electrodes 85-$c$ are shown on a same layer of the touch screen 12.

As shown in FIG. 13A, the user input passive device 88 includes impedance circuit 96 (Z1), conductive plates 98-1 and 98-2 (P1 and P2), a non-conductive supporting surface 100, and a conductive shell 102. The conductive shell 102 and non-conductive supporting surface shell 100 together form a housing for the user input passive device 88. The housing has an outer shape corresponding to at least one of: a computing mouse, a game piece, a cup, a utensil, a plate, and a coaster.

The conductive plates 98-1 and 98-2 and the conductive shell 102 are in contact with the touch screen 12's interactive surface. The non-conductive supporting surface 100 electrically isolates the conductive shell 102, the conductive plate 98-1, and the conductive plate 98-2. The impedance circuit 96 connects the conductive plate 98-1 and the conductive plate 98-2 and has a desired impedance at a desired frequency. The impedance circuit 96 is discussed with more detail with reference to FIGS. 15A-15F.

The user input passive device 88 is capacitively coupled to one or more rows and/or column electrodes proximal to the contact. Because the conductive plates 98-1 and 98-2 and the conductive shell 102 are electrically isolated, when a person touches the conductive shell 102 of the passive device 88, the person provides a path to ground such that the conductive shell 102 affects both the mutual capacitance and the self-capacitance.

When the passive device 88 is not touched by a person (as shown here), there is no path to ground and the conductive shell 102 only affects the mutual capacitance. The conductive plates 98-1 and 98-2 do not have a path to ground regardless of a touch and thus only affect mutual capacitance when the passive device is touched or untouched. Because the contact area of the conductive plates 98-1 and 98-2 is much larger than the conductive shell 102, the mutual capacitance change detected is primarily due to the conductive plates 98-1 and 98-2 and the effect of the impedance circuit 96 not the conductive shell 102.

As an example, when the user input passive device 88 is resting on the touch screen 12 with no human touch, the user input passive device 88 is capacitively coupled to the touch screen 12 of the touch screen system 86 via capacitance Cd1 and Cd2 (e.g., where Cd1 and Cd2 are with respect to a row and/or a column electrode). Depending on the area of the conductive plates 98-1 and 98-2, the effect of the impedance circuit 96, and the dielectric layers 90-92, the capacitance of Cd1 or Cd2 is in the range of 1 to 2 pico-Farads. The values of Cd1 and Cd2 affect mutual capacitance Cm_0 (created between the column and row electrode on the same layer). For example, Cd1 and Cd2 may raise or lower the value of Cm_0 by approximately 1 pico-Farad.

In this cross-sectional view, two conductive plates and one impedance circuit are shown. However, the passive device 88 may include multiple sets of conductive plates where each set is connected by an impedance circuit. The various sets of conductive plates can have different impedance effects on the electrodes of the touch screen which can correspond to different information and/or passive device functions.

Drive-sense circuits (DSCs 1-2) are operable to detect the changes in mutual capacitance and/or other changes to the electrodes and interpret their meaning. One DSC per row and one DSC per column are affected in this example. For example, by detecting changes in mutual capacitance and/or by detecting characteristics of the impedance circuit 96 (e.g., a sweep for resonant frequency of an impedance circuit 96), the DSCs of the touch screen 12 determines the presence, identification (e.g., of a particular user), and/or orientation of the user input passive device 88.

FIG. 13B shows a simplified circuit diagram representation of FIG. 13A. The capacitances Cd1 and Cd2 of the user input passive device 88 are coupled to the touch screen 12 such that the mutual capacitance Cm_0 between column and row electrodes 85 is affected. However, with no human touch, there is no path to ground. Therefore, the collective parasitic capacitances Cp2 and Cp1 remain substantially unchanged. DSC 1 may detect changes to one row and DSC 2 may detect changes to one column. Thus, DSC 1 and DSC 2 are operable to sense a mutual capacitance change to Cm_0.

FIGS. 14A-14B are schematic block diagrams of another example of capacitance of a touch screen system 86 that includes the touch screen 12 and a user input passive device 88 in contact with the touch screen 12. In this example, the user input passive device 88 is in contact (or within a close proximity) with the touch screen 12 and there is a human touch on the conductive shell 102 of the user input passive device 88. FIGS. 14A and 14B operate similarly to FIG. 9 except electrodes 85-$r$ and 85-$c$ are shown on the same layer of the touch screen 12.

When a person touches the conductive shell 102 of the passive device 88, the person provides a path to ground such that the conductive shell 102 affects both the mutual capacitance and the self-capacitance. Here, parasitic capacitances Cp1 and Cp2 are shown as affected by CHB (the self-capacitance change caused by the human body).

Drive-sense circuits (DSCs 1-2) are operable to detect the changes in self capacitance and/or other changes to the electrodes and interpret their meaning. For example, by detecting changes in self capacitance along with mutual capacitance changes, the DSCs of the touch screen 12 determines that the user input passive device 88 is on the touch screen 12 and that it is in use by a user. While the user input passive device 88 continues to be touched (e.g., the self-capacitance change is detected), mutual capacitance changes may indicate different functions. For example, without a touch, a mutual capacitance change IDs the passive device. With a touch, the mutual capacitance change can indicate a selection, an orientation, and/or any user initiated touch screen function.

FIG. 14B shows a simplified circuit diagram representation of FIG. 14A. The capacitances Cd1 and Cd2 of the user input passive device 88 are coupled to the touch screen 12 such that the mutual capacitance Cm_0 between column and row electrodes 85 is affected. With a human touch there is path to ground. Therefore, the collective parasitic capacitances Cp2 and Cp1 are affected by CHB (the self-capacitance change caused by the human body). DSC 1 may detect changes to one row and DSC 2 may detect changes to one column. Thus, DSC 1 and DSC 2 are operable to sense a mutual capacitance change to Cm_0 as well as the effect of CHB on Cp2 and Cp1.

Figure 15A:
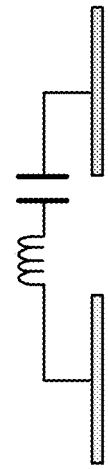
FIGS. 15A-15F are schematic block diagrams of examples of an impedance circuit in accordance with the present invention.

FIGS. 15A-15F are schematic block diagrams of examples of the impedance circuit 96. In FIG. 15A the impedance circuit 96 is a parallel tank (LC) circuit (e.g., an inductor and a capacitor connected in parallel). In resonance, (i.e., operating at resonant frequency) a parallel tank circuit experiences high impedance and behaves like an open circuit allowing minimal current flow.

Figure 15C:
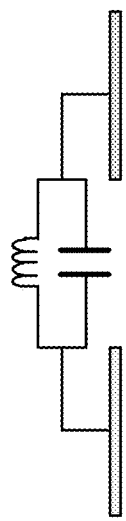
Figure 15B:

In FIG. 15B, the impedance circuit 96 is a series tank (LC) circuit (e.g., an inductor and a capacitor connected in series). In resonance, a series tank circuit experiences low impedance and behaves like a short circuit allowing maximum current flow.

Figure 15D:
Figure 15E:
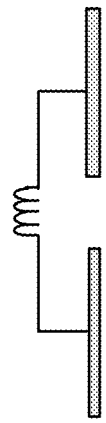
Figure 15F:
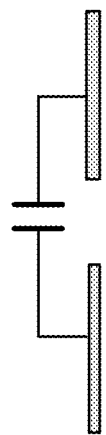

In FIG. 15C, the impedance circuit 96 is a wire (i.e., a short circuit). In FIG. 15D the impedance circuit 96 is a resister. In FIG. 15E, the impedance circuit 96 is a capacitor. In FIG. 15F, the impedance circuit 96 is an inductor. Impedance circuit 96 may include any combination and/or number of resistors, capacitors, and/or inductors connected in series and/or parallel (e.g., any RLC circuit).

FIGS. 16A-16B are schematic block diagrams of examples of mutual capacitance changes to electrodes 85 with a parallel tank circuit as the impedance circuit 96. The parallel tank circuit 96 includes an inductor and a capacitor connected in parallel. The user input passive device is capacitively coupled to the touch screen 12 of the touch screen system 86 via capacitance Cd1 and Cd2. In this example, row and column electrodes are on different layers and the capacitance of each of Cd1 is Cd2 is 2 pico-Farads. The values of Cd1 and Cd2 affect mutual capacitances Cm_1 and Cm_2. Without any contact, the capacitance of each of Cm_1 and Cm_2 are 2 pico-Farad in this example.

As shown in FIG. 16A, when the parallel tank circuit 96 is out of resonance (i.e., operating at any frequency besides resonant frequency), the parallel tank circuit 96 has low impedance allowing current to flow. Thus, out of resonance, Cm_1 is connected in parallel to a series combination of Cd1 and Cd2 and Cm_2 is connected in parallel to a series combination of Cd1 and Cd2. Therefore, out of resonance, Cm_1 and Cm_2 go from 2 pico-Farads to 3 pico-Farads.

As shown in FIG. 16B, when the parallel tank circuit 96 is in resonance (i.e., operating at resonant frequency), parallel tank circuit 96 has high impedance restricting current flow. Thus, at resonance, Cm_1 and Cm_2 experience minimal change from Cd1 and Cd2. Therefore, at resonance, Cm_1 and Cm_2 remain 2 pico-Farads.

FIGS. 17A-17B are schematic block diagrams of examples of mutual capacitance changes to electrodes 85 with a series tank circuit as the impedance circuit 96. The series tank circuit 96 includes an inductor and a capacitor connected in series. The user input passive device is capacitively coupled to the touch screen 12 of the touch screen system 86 via capacitance Cd1 and Cd2. In this example, row and column electrodes are on different layers and the capacitance of each of Cd1 is Cd2 is 2 pico-Farads. The values of Cd1 and Cd2 affect mutual capacitances Cm_1 and Cm_2. Without any contact, the capacitance of each of Cm_1 and Cm_2 are 2 pico-Farad in this example.

As shown in FIG. 17A, when the series tank circuit 96 is out of resonance (i.e., operating at any frequency besides resonant frequency) the series tank circuit 96 has high impedance restricting current flow. Thus, out of resonance, Cm_1 and Cm_2 experience minimal change from Cd1 and Cd2. Therefore, out of resonance, Cm_1 and Cm_2 stay at 2 pico-Farads.

As shown in FIG. 17B, when the series tank circuit 96 is in resonance (i.e., operating at resonant frequency), the series tank circuit 96 has low impedance allowing current to flow. Thus, Cm_1 is connected in parallel to a series combination of Cd1 and Cd2 and Cm_2 is connected in parallel to a series combination of Cd1 and Cd2. Therefore, in resonance, Cm_1 and Cm_2 go from 2 pico-Farads to 3 pico-Farads.

Figure 18A:
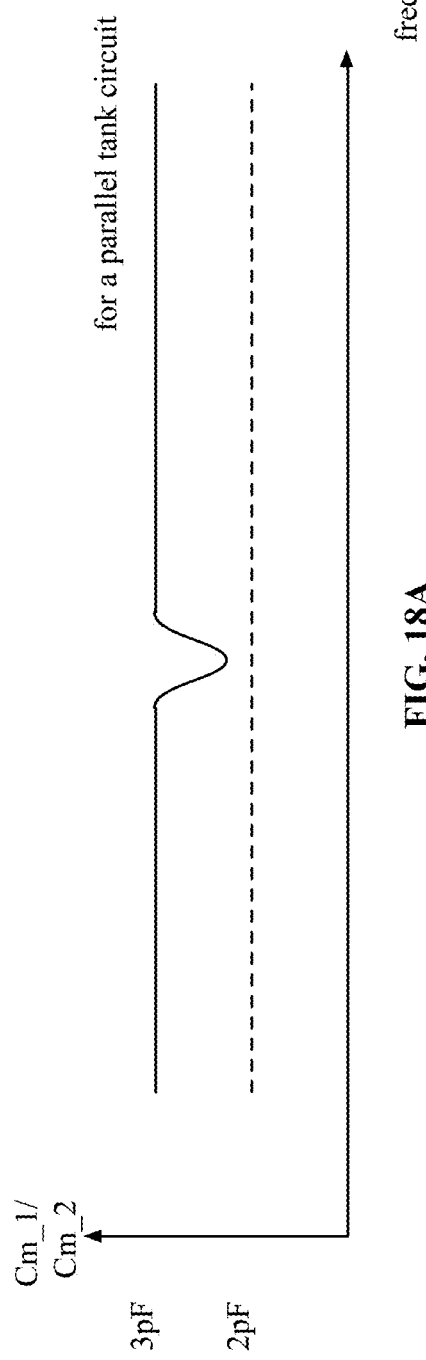
FIGS. 18A-18B are examples of detecting mutual capacitance change in accordance with the present invention.
Figure 18B:
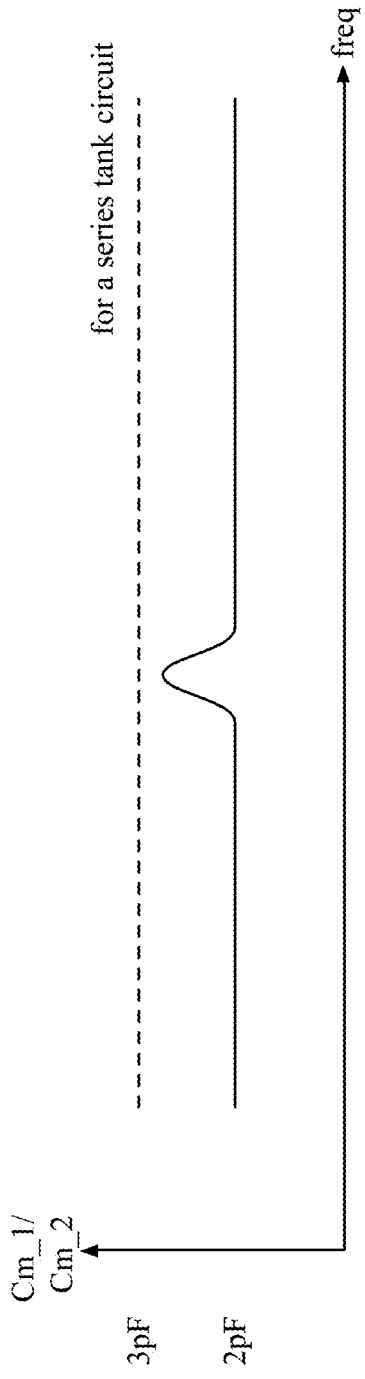

FIGS. 18A-18B are examples of detecting mutual capacitance change. FIG. 18A depicts a graph of frequency versus mutual capacitances Cm_1 and Cm_2 from the example of FIGS. 16A-16B where the impedance circuit is a parallel tank circuit. In this example, the touch screen 12 does a frequency sweep. At all frequencies besides the resonant frequency of the parallel tank circuit, Cm_1 and Cm_2 will be 3 pico-Farads when the passive device is in contact. At the resonant frequency (e.g., 1 MHz), a shift from 3 pico-Farads to 2 pico-Farads can be detected.

FIG. 18B depicts a graph of frequency versus mutual capacitances Cm_1 and Cm_2 from the example of FIGS. 17A-17B where the impedance circuit is a series tank circuit. In this example, the touch screen 12 does a frequency sweep. At all frequencies besides the resonant frequency of the series tank circuit, Cm_1 and Cm_2 will be 2 pico-Farads when the passive device is in contact. At the resonant frequency (e.g., 1 MHz), a shift from 2 pico-Farads to 3 pico-Farads can be detected.

Figure 19A:
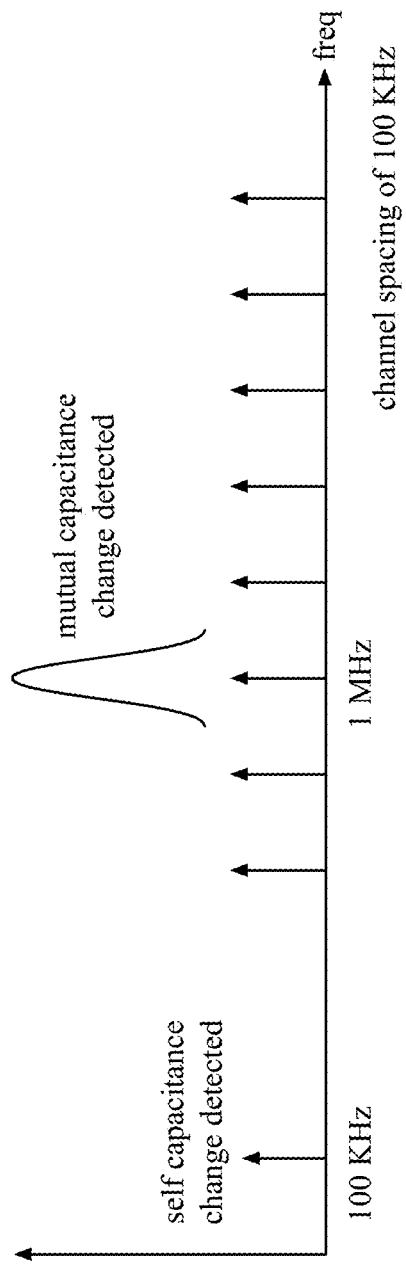
FIGS. 19A-19B are examples of detecting capacitance change in accordance with the present invention.
Figure 19B:
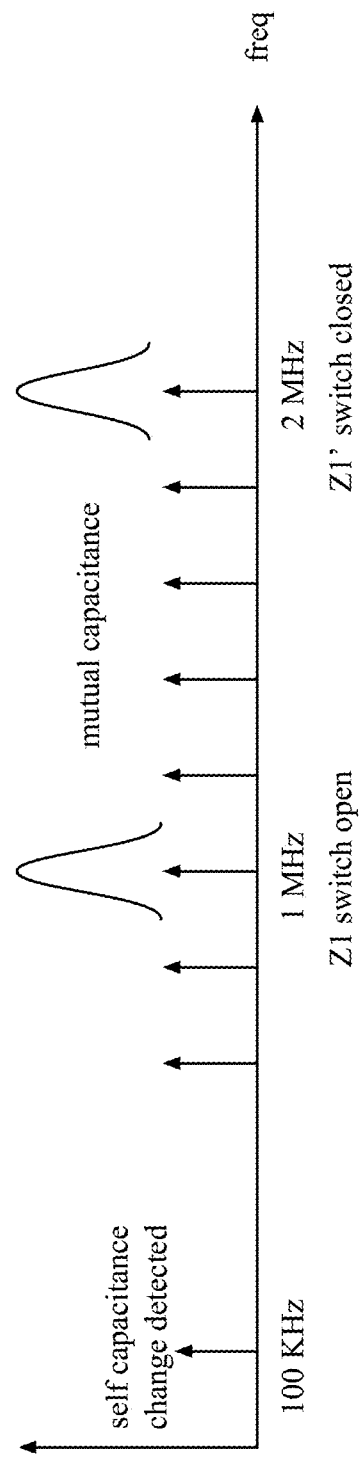

FIGS. 19A-19B are examples of detecting capacitance change. FIG. 19A depicts a graph of frequency versus capacitance with a channel spacing of 100 KHz. In this example, the passive device is in contact with the touch screen and is also being touched by a user. Using a frequency sweep, the self-capacitance change from the user touching the conductive shell is detectable at 100 Khz in this example. In accordance with the tank circuit impedance circuit examples discussed previously, the mutual capacitance change from the impedance circuit and conductive plates is detectable at a resonant frequency of the tank circuit (e.g., 1 MHz). Therefore, when the frequency of detectable impedance changes is known, the touch screen is able to sweep those frequencies to determine the presence and various functions of the passive device.

FIG. 19B depicts a graph of frequency versus capacitance with a channel spacing of 100 KHz. In this example, the passive device is in contact with the touch screen and is also being touched by a user. Further, the passive device includes a switching mechanism which affects the impedance of the impedance circuit. For example, the resonant frequency of the impedance circuit when the switch mechanism is closed increases. Using a frequency sweep, the self-capacitance change from the user touching the conductive shell is detectable at 100 Khz.

In accordance with the tank circuit impedance circuit examples discussed previously, the mutual capacitance change from the impedance circuit and conductive plates when the switch is open is detectable at a first resonant frequency (e.g., 1 MHz). The mutual-capacitance change from the impedance circuit and conductive plates when the switch is closed is detectable at a second resonant frequency (e.g., 2 MHz). As such, detecting the self-capacitance change from the user touching the device as well as detecting the second frequency (2 MHz) indicates a particular user function (e.g., select, zoom, highlight, erase, scroll, etc.).

A drive sense circuit of the touch screen is operable to transmit a self and a mutual frequency per channel for sensing but also has the ability to transmit multiple other frequencies per channel. As an additional example of performing a frequency sweep, one or more frequencies in addition to the standard self and mutual frequency can be transmitted per channel. The one or more additional frequencies change every refresh cycle and can aid in detecting devices/objects and/or user functions. For example, a set of known frequencies can be transmitted every refresh cycle and detected frequency responses can indicate various functions. For example, an object responds to a particular frequency and the touch screen interprets the object as an eraser for interaction with the touch screen.

Figure 20:
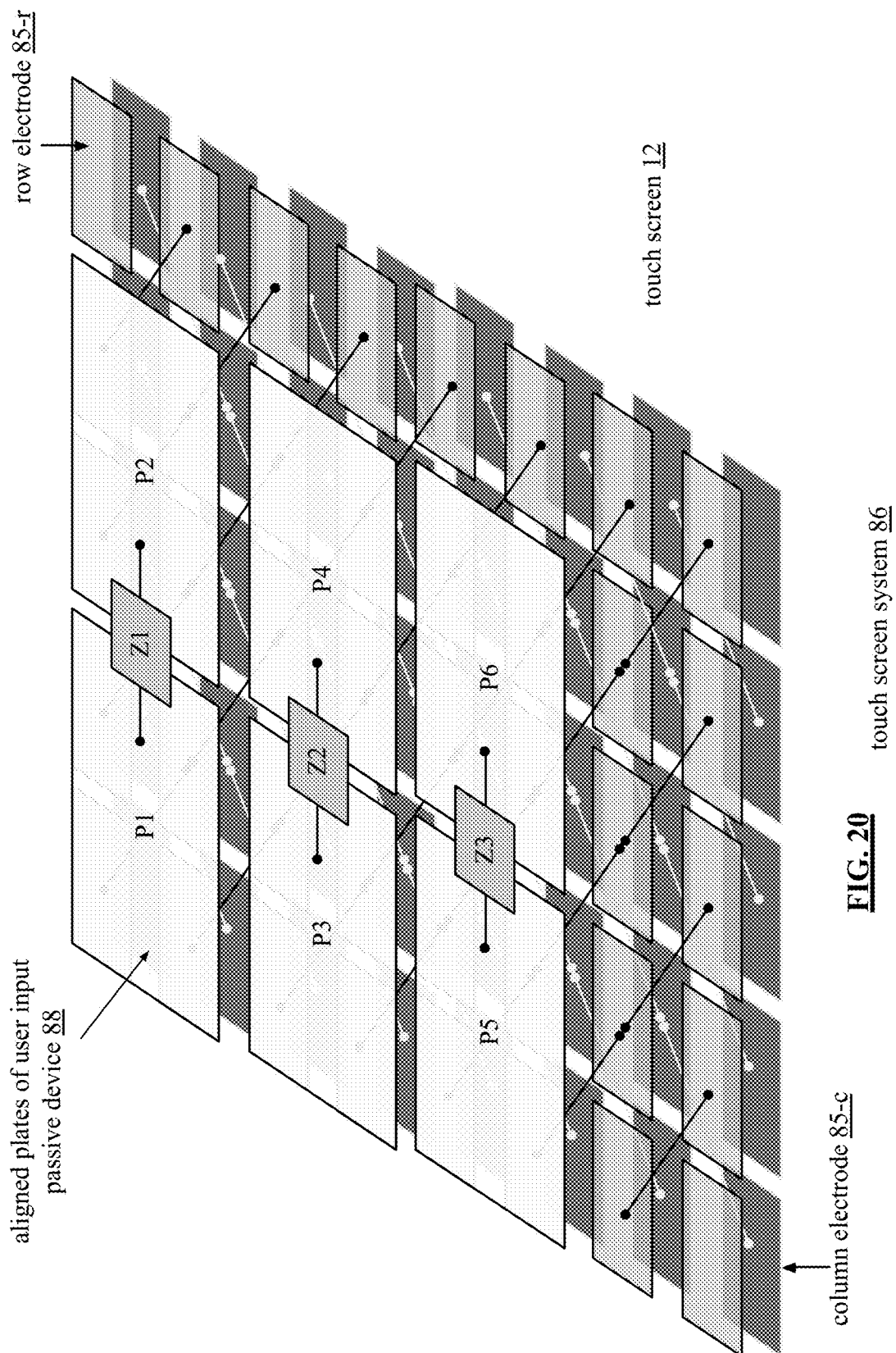
FIG. 20 is a schematic block diagram of another embodiment of the touch screen system in accordance with the present invention.

FIG. 20 is a schematic block diagram of an embodiment of a touch screen system 86 that includes a user input passive device 88 in contact with a touch screen 12. FIG. 20 is similar to the example of FIG. 6A but only the conductive plates (P1-P6) and impedance circuits (Z1-Z3) of the user input passive device 88 are shown. FIG. 20 shows a simplified depiction of the touch screen 12 as a touch screen electrode pattern that includes rows of electrodes 85-r and columns of electrodes 85-c. Here, the conductive cells for the rows (light gray squares) and columns (dark gray squares) are on different layers (e.g., the rows are layered above the columns). Alternatively, the rows and columns may be on the same layer. A mutual capacitance is created between a row electrode and a column electrode. An electrode cell may be 1 millimeter by 1 millimeter to 5 millimeters by 5 millimeters depending on resolution.

The conductive plates P1-P6 are shown as approximately four times the area of an electrode cell in this example (e.g., an electrode cell is 5 millimeters by 5 millimeters and a conductive plate is 10 millimeters by 10 millimeters) to affect multiple electrodes per plate. The size of the conductive plates can vary depending on the size of the electrode cells and the desired impedance change to be detected. For example, the conductive plate may be substantially the same size as an electrode cell.

One or more of the plurality of impedance circuits and plurality of conductive plates cause an impedance and/or frequency effect when in close proximity to an interactive surface of the touch screen 12 (e.g., the passive device 88 is resting on the touch screen 12) that is detectable by the touch screen 12. As shown here, the conductive plates of user input passive device 88 are aligned over the conductive cells of the touch screen 12 such that the mutual capacitances of four row and column electrodes are fully affected per conductive plate.

Figure 21:
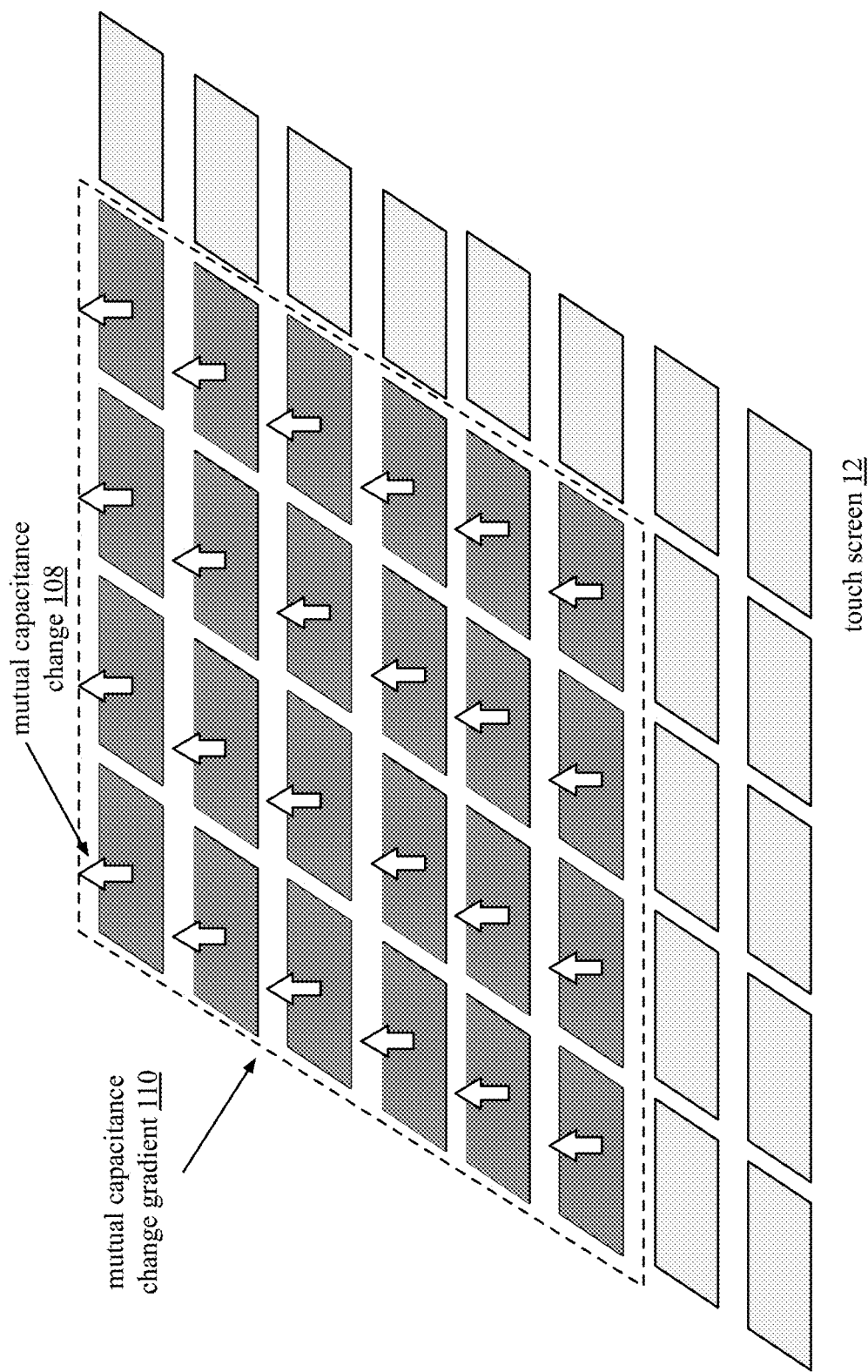
FIG. 21 is a schematic block diagram of an example of a mutual capacitance change gradient in accordance with the present invention.

FIG. 21 is a schematic block diagram of an example of a mutual capacitance change gradient 110 caused by the user input passive device 88 on the touch screen 12 in accordance with the example described with reference to FIG. 20 (e.g., the conductive plates align with conductive cells of the touch screen 12). For simplicity, only the conductive cells for the row electrodes (light gray squares) are shown. The mutual capacitance effect is created between a row electrode and a column electrode.

When the conductive plates of the user input passive device 88 align with conductive cells of the touch screen 12 in the most ideal situation, the mutual capacitance of four row and column electrodes are affected per conductive plate. Each mutual capacitance change 108 in the area of the user input passive device creates a mutual capacitance change gradient 110 that is detectable by the touch screen 12.

Capacitance change detection, whether mutual, self, or both, is dependent on the channel width of the touch screen sensor, the thickness of the cover glass, and other touch screen sensor properties. For example, a higher resolution channel width spacing allows for more sensitive capacitive change detection.

Figure 22:
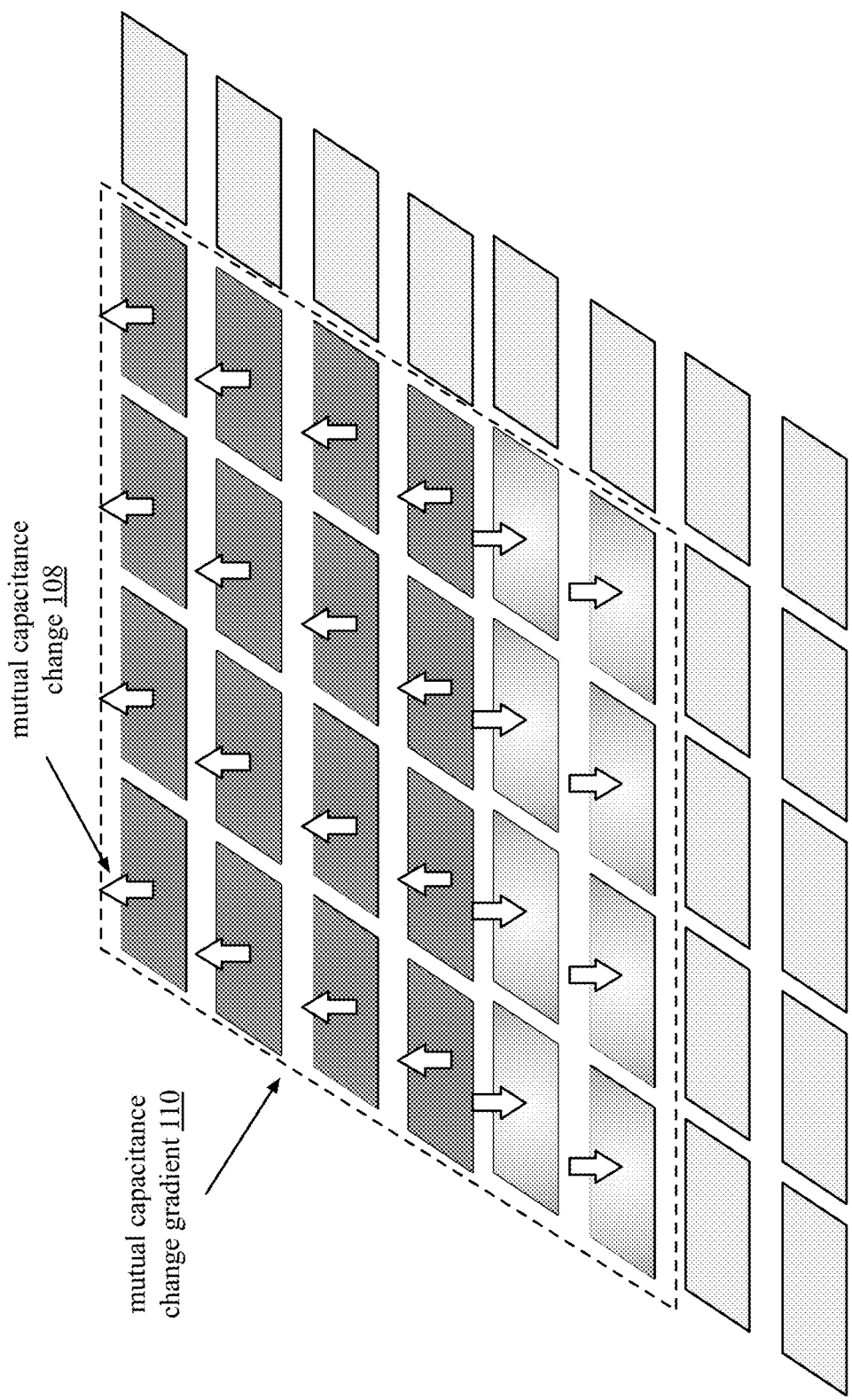
FIG. 22 is a schematic block diagram of another example of a mutual capacitance change gradient in accordance with the present invention.

FIG. 22 is a schematic block diagram of another example of a mutual capacitance change gradient 110 caused by the user input passive device 88 on touch screen 12 in accordance with the example described with reference to FIG. 20 (e.g., the conductive plates align with conductive cells of the touch screen 12). For simplicity, only the conductive cells for the row electrodes (light gray squares) are shown. The mutual capacitance effect is created between a row electrode and a column electrode.

When the conductive plates of the user input passive device 88 align with conductive cells of the touch screen 12 in the most ideal situation, the mutual capacitance between four row column electrodes are affected per conductive plate. Each mutual capacitance change 108 in the area of the user input passive device creates a mutual capacitance change gradient 110 that is detectable across the touch screen 12.

In this example, the two lower plates of the user input passive device create a different mutual capacitance change than the other four conductive plates. For example, impedance circuits Z1 and Z2 (see FIG. 20 for reference) are series tank circuit causing the mutual capacitance of the electrodes to raise during a resonant frequency sweep. The impedance circuit Z3 may be a parallel tank circuit with the same resonant frequency as the series tank circuit such that the mutual capacitance of the electrodes lowers during the resonant frequency sweep. The difference in mutual capacitance changes 108 across the mutual capacitance change gradient 110 can indicate orientation of the user input passive device.

Figure 23:
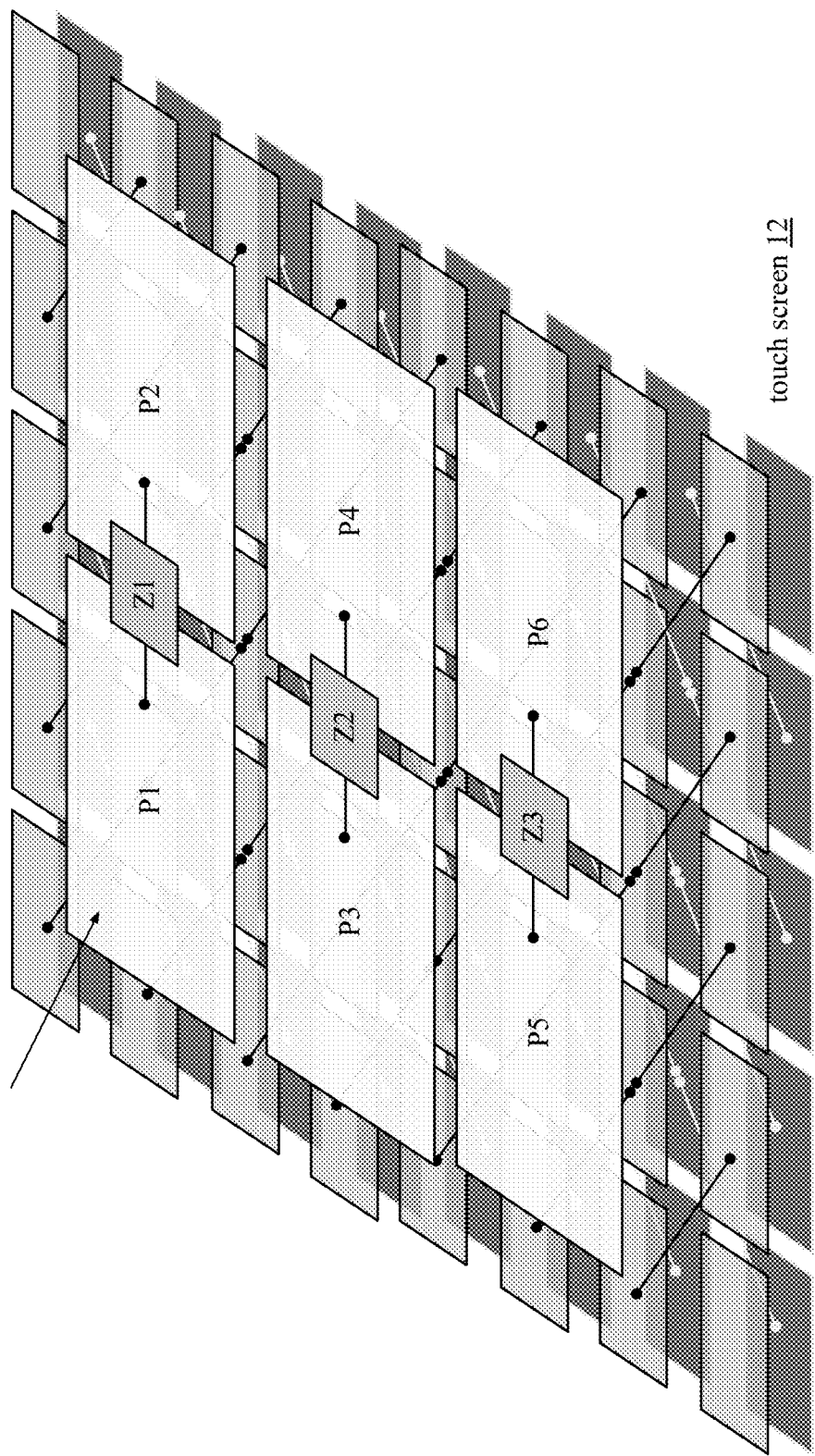
FIG. 23 is a schematic block diagram of another embodiment of the touch screen system in accordance with the present invention.

FIG. 23 is a schematic block diagram of an embodiment of a touch screen system 86 that includes a user input passive device 88 in contact with a touch screen 12. FIG. 23 is similar to FIG. 20 except here the conductive plates of the user input passive device 88 are not aligned over the electrode cells of the touch screen 12. For example, one conductive plate of the passive device 88 fully covers one electrode cell and only portions of the eight surrounding electrode cells.

Figure 24:
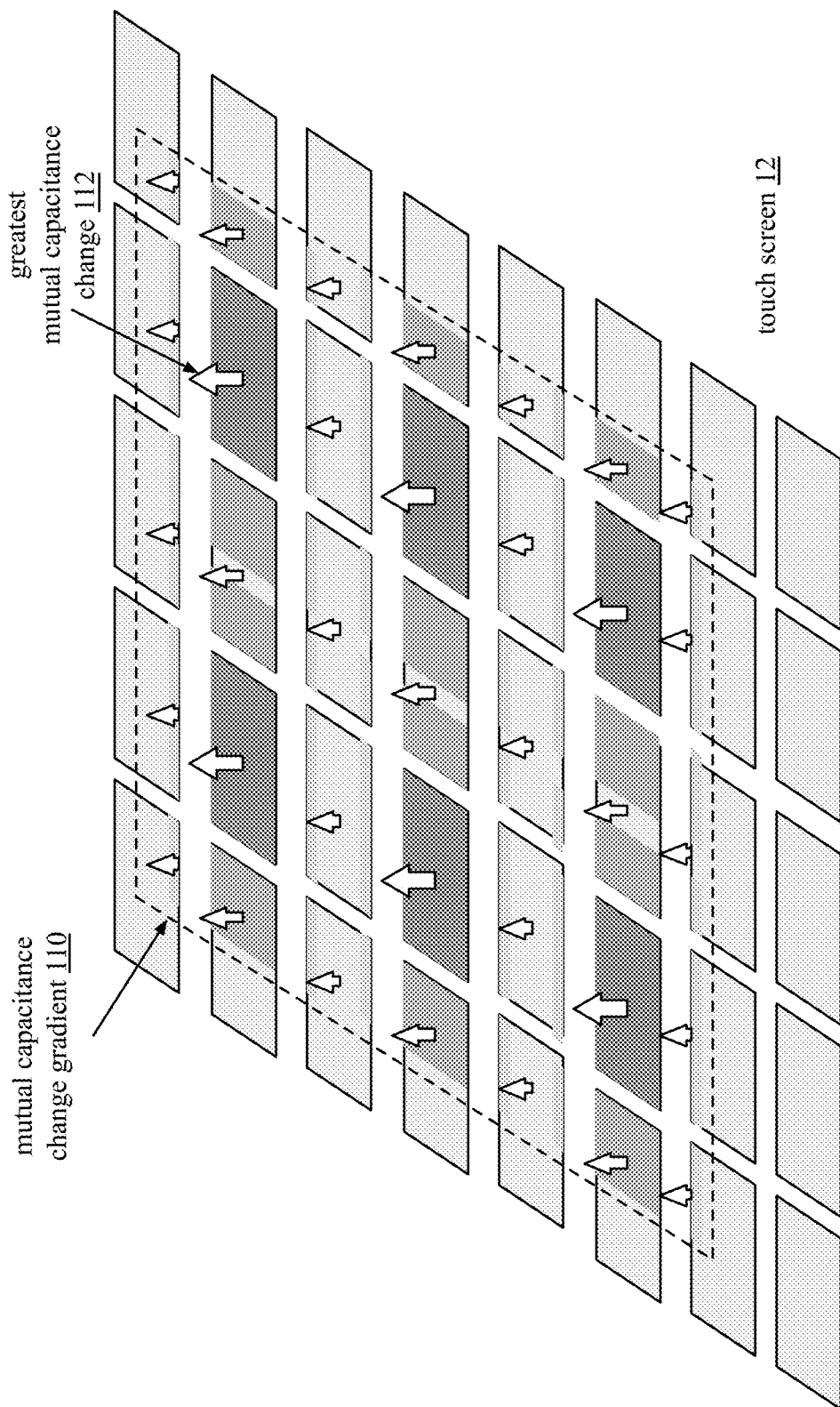
FIG. 24 is a schematic block diagram of another example of a mutual capacitance change gradient in accordance with the present invention.

FIG. 24 is a schematic block diagram of another example of a mutual capacitance change gradient 110 caused by the user input passive device 88 on touch screen 12 in accordance with the example described with reference to FIG. 23 (e.g., the conductive plates do not align with electrode cells of the touch screen 12).

With one conductive plate of the user input passive device 88 fully covering only one conductive cell, the greatest mutual capacitance change 112 is detected from the fully covered electrodes (e.g., shown by the dark gray squares and the largest white arrows). Each conductive plate also covers portions of eight surrounding electrode cells creating areas of lesser mutual capacitance changes (e.g., shown by the lighter shades of grays and the smaller white arrows).

Thus, the touch screen 12 is operable to detect the user input passive device 88 from a range of mutual capacitance change gradients 110 (i.e., mutual capacitance change patterns) from a fully aligned gradient (as illustrated in FIGS. 21 and 22) to a partially aligned gradient.

The touch screen 12 is operable to recognize mutual capacitance change patterns as well as detect an aggregate mutual capacitance change within the mutual capacitance change gradients 110. For example, the touch screen 12 can recognize a range of aggregate mutual capacitance changes within a certain area that identify the user input passive device (e.g., aggregate mutual capacitance changes of 12 pF-24 pF in a 30 millimeter by 30 millimeter area are representative of the user input passive device).

Figure 25:
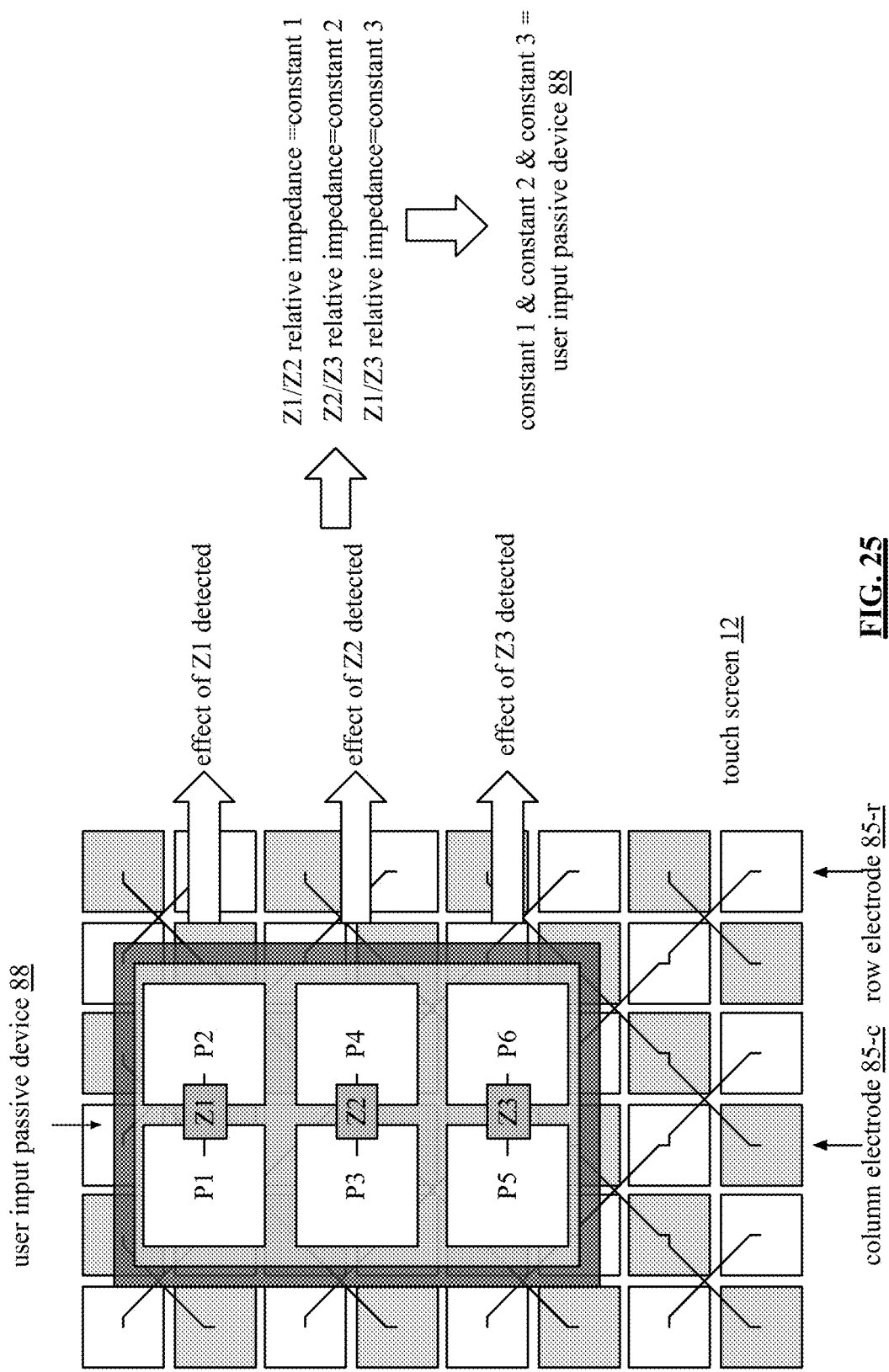
FIG. 25 is a schematic block diagram of an example of determining relative impedance in accordance with the present invention.

FIG. 25 is a schematic block diagram of an example of determining relative impedance that includes user input passive device 88 in contact with touch screen 12. For simplicity, the touch screen 12 is shown as touch screen electrode pattern that includes rows of electrodes 85-r and columns of electrodes 85-c. Here, the conductive cells for the rows (white squares) and columns (dark gray squares) are on same layer but may be on different layers as discussed previously.

As the user input passive device 88 contacts the touch screen 12 surface, impedance circuits Z1-Z3 and corresponding conductive plates P1-P6 cause mutual capacitance changes to the touch screen 12. Detecting exact mutual capacitance changes in order to identify the user input passive device 88 and user input passive device 88 functions can be challenging due to small capacitance changes and other capacitances of the touch screen potentially altering the measurements. Therefore, in this example, a relative impedance effect is detected so that exact impedance measurements are not needed.

For example, the relationship between the impedance effects of Z1, Z2, and Z3 (and corresponding conductive plates) are known and constant. The impedance effects of Z1, Z2, and Z3 are individually determined, and based on the relationship between those effects, the user input passive device 88 can be identified (e.g., as being present and/or to identify user functions). For example, Z1/Z2, Z2/Z3, and Z1/Z3 are calculated to determine a first constant value, a second constant value, and a third constant value respectively. The combination of the first constant value, the second constant value, and the third constant value is recognized as an impedance pattern associated with the user input passive device 88. The methods for detecting the user input passive device and interpreting user input passive device functions described above can be used singularly or in combination.

Figure 26:
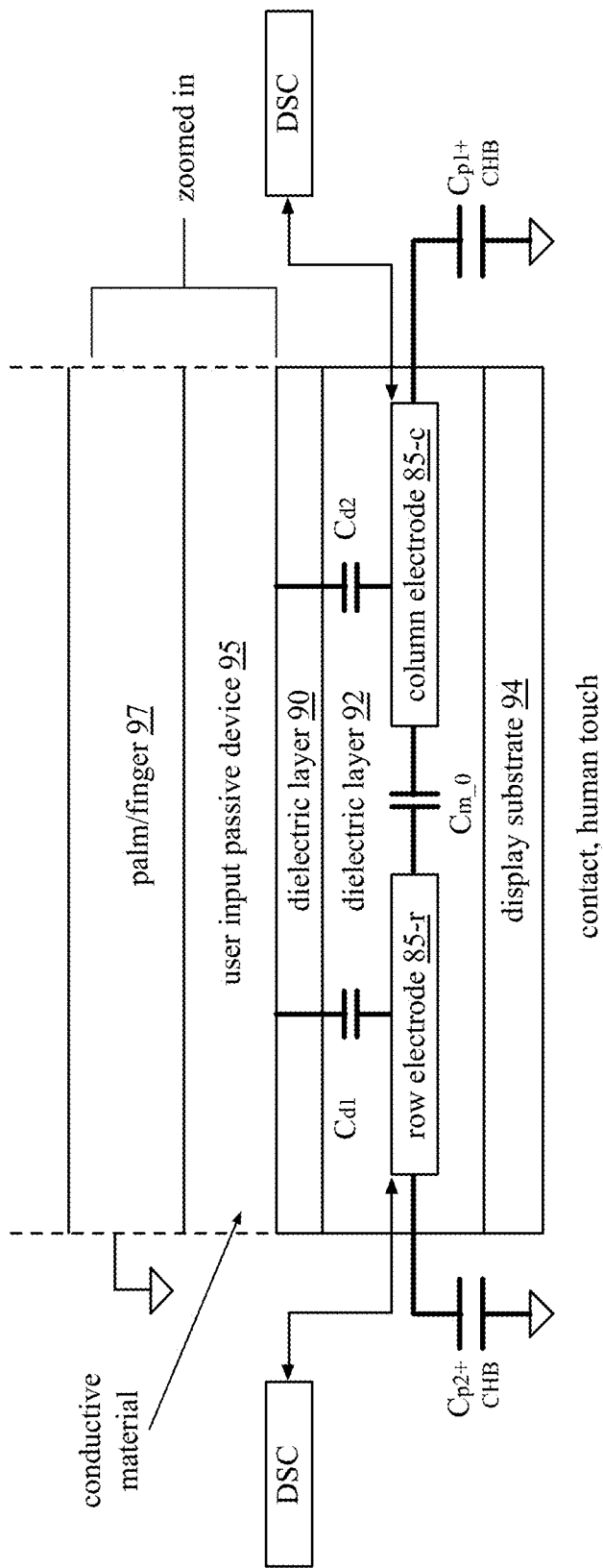
FIG. 26 is a schematic block diagram of an example of capacitance of a touch screen in contact with a user input passive device in accordance with the present invention.

FIG. 26 is a schematic block diagram of an example of capacitance of a touch screen 12 in contact with a user input passive device 95. In this example, the user input passive device 95 includes a conductive material. The user input passive device 95 may include a conductive shell with a hollow center, a solid conductive material, a combination of conductive and non-conductive materials, etc. The user input passive device 95 may include a spherical, half-spherical, and/or other rounded shape for user interaction with the touch screen 12. Examples of the user input passive device 95 will be discussed further with reference to FIGS. 27-31.

The user input passive device 95 is capacitively coupled to one or more rows and/or column electrodes proximal to the contact (e.g., Cd1 and Cd2). A zoomed in view is shown here to illustrate contact between the user input passive device 95 and two electrodes of the touch screen 12, however, many more electrodes are affected when the user input passive device 95 is in contact (or within a close proximity) with the touch screen 12 because the user input passive device 95 is much larger in comparison to an electrode. In this example, there is a human touch (e.g., via a palm and/or finger 97) on the conductive material of the user input passive device 95.

When a person touches the conductive material of the passive device 95, the person provides a path to ground such that the conductive material affects both the mutual capacitance (Cm_0) and the self-capacitance. Here, parasitic capacitances Cp1 and Cp2 are shown as affected by CHB (the self-capacitance change caused by the human body).

Drive-sense circuits (DSC) are operable to detect the changes in self capacitance and/or other changes to the electrodes and interpret their meaning. For example, as a person moves the user input passive device 95, the DSCs of the touch screen 12 interpret changes in electrical characteristics of the affected electrodes as a direction of movement. The direction of movement can then be interpreted as a specific user input function (e.g., select, scroll, gaming movements/functions, etc.).

FIG. 27 is a schematic block diagram of an embodiment of the user input passive device 95 interacting with the touch screen 12. In this example, the user input passive device 95 in a half spherical shape with a flat top surface. The user input passive device 95 is made of a rigid conductive material such that the user input passive device 95 retains its shape when applied pressure. A user may rest a palm and/or a finger on the flat top surface to maneuver the spherical shape in various directions in one location and/or across the touch screen 12 surface.

As shown on the left, the user input passive device 95 is used in an upright position and is affecting a plurality of electrodes on the touch screen 12 surface. On the right, the user input passive device 95 is tilted, thus, shifting the location of the plurality of affected electrodes. The amount of electrodes affected, the location of affected electrodes, the rate of the change in the location of affected electrodes, etc., can be interpreted as various user functions by the touch screen 12. For example, the user input passive device 95 can be utilized as a joystick in a gaming application.

Figure 27A:
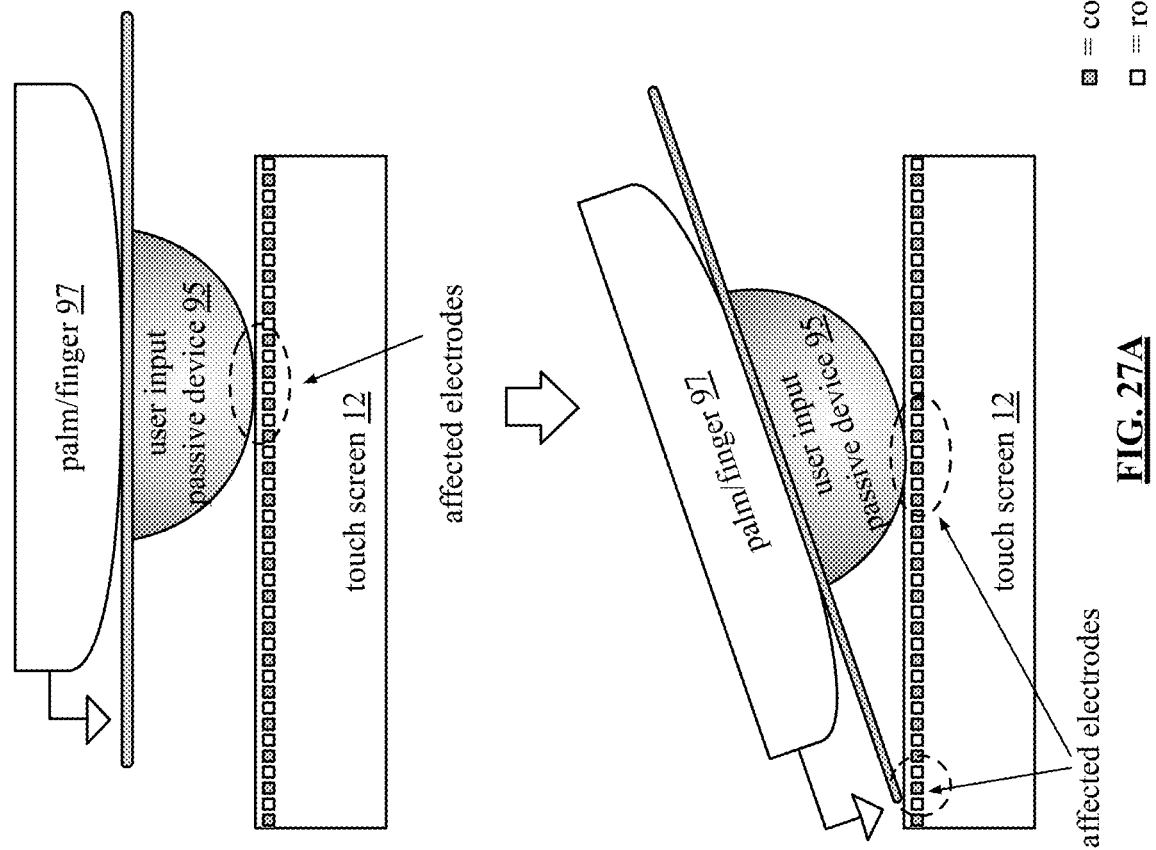
FIG. 27A is a schematic block diagram of another embodiment of the user input passive device interacting with the touch screen in accordance with the present invention.

FIG. 27A is a schematic block diagram of another embodiment of the user input passive device 95 interacting with the touch screen 12. In this example, the user input passive device 95 in a half spherical shape with a flat top surface. In comparison to FIG. 27, the half spherical shape shown here is shorter and smaller such that the flat top surface (e.g., the touch plate) is extends beyond the half spherical shape. The user input passive device 95 is made of a rigid conductive material such that the user input passive device 95 retains its shape when applied pressure. A user may rest a palm and/or a finger on the flat top surface to maneuver the spherical shape in various directions in one location and/or across the touch screen 12 surface.

As shown on the top of FIG. 27A, the user input passive device 95 is used in an upright position and is affecting a plurality of electrodes on the touch screen 12 surface. On the bottom, the user input passive device 95 is tilted, thus, shifting the location of the plurality of affected electrodes and affecting additional electrodes with the flat top surface.

The flat top surface of the user input passive device 95 is a conductive material. As the user input passive device 95 is tilted, the flat top surface affects electrodes of the touch screen 12 with an increasing affect (e.g., a change in capacitance increases as the flat top surface gets closer) as it approaches the surface of the touch screen 12. As such, an angle/tilt of the device can be interpreted by this information. Further, the flat top surface in close proximity to the touch screen 12 (e.g., a touch) can indicate any one of a variety of user functions by the touch screen (e.g., a selection, etc.).

Figure 28:
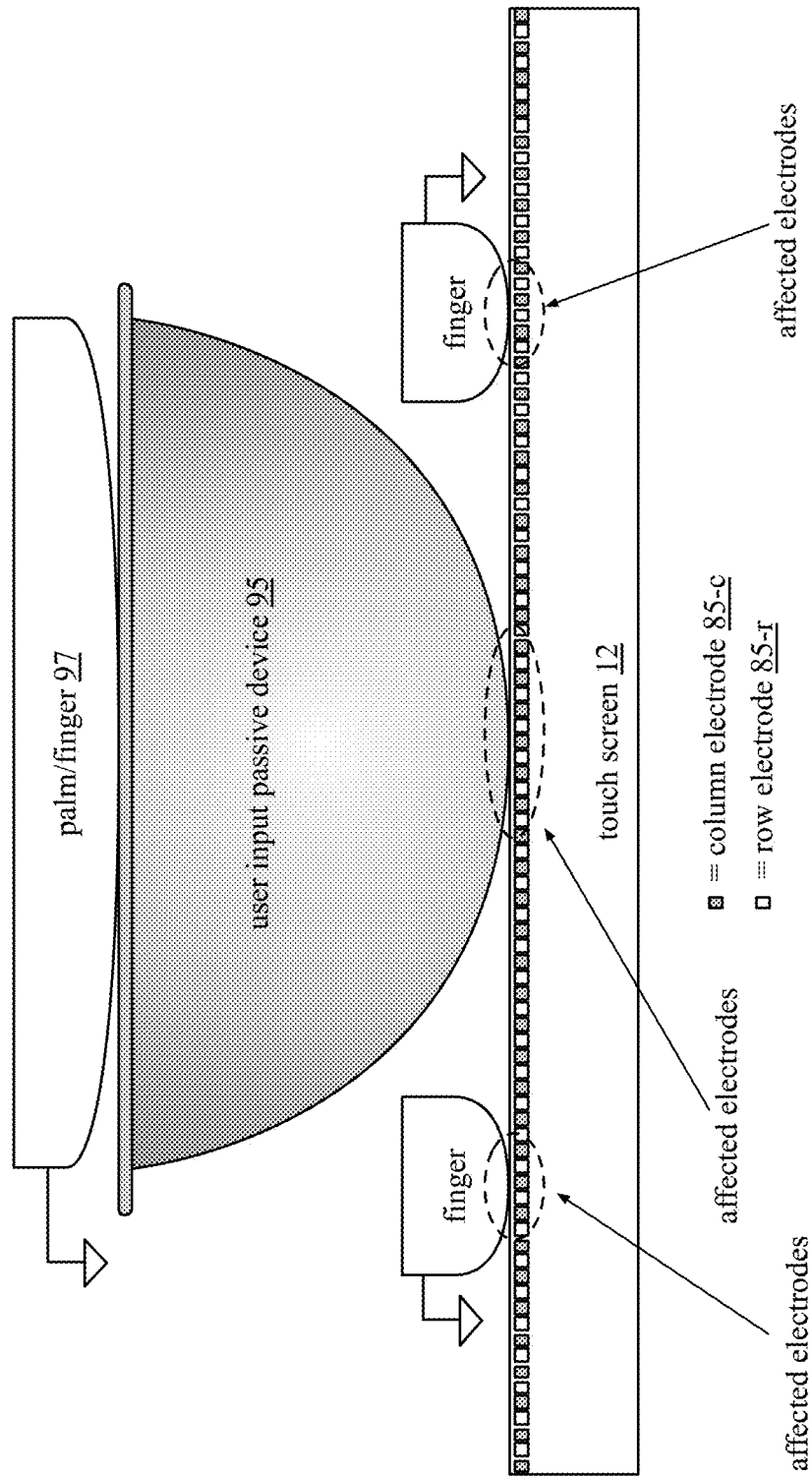
FIG. 28 is a schematic block diagram of another embodiment of the user input passive device interacting with the touch screen in accordance with the present invention.

FIG. 28 is a schematic block diagram of another embodiment of the user input passive device 95 interacting with the touch screen 12. In this example, the user has a palm and/or a finger on the user input passive device 95 but also has two fingers directly on the touch screen 12 surface. For example, the user has a palm and three fingers resting on the top surface of the user input passive device 95 and a thumb and pinky on either side of the user input passive device 95 directly on the touch screen 12. When interaction with the user input passive device 95 is detected (e.g., by detection of a region of affected electrodes, by the type of affected electrodes (e.g., a certain self-capacitance change is detected over a certain area, etc.) etc.), the detection of a finger touch nearby can indicate further user functions.

For example, the user input passive device 95 is directly over a list of files and a finger can be used on the touch screen to initiate a scrolling function. As another example, the user input passive device 95 is directly over an image and placing one or two fingers on the screen initiates a zooming function.

Figure 29:
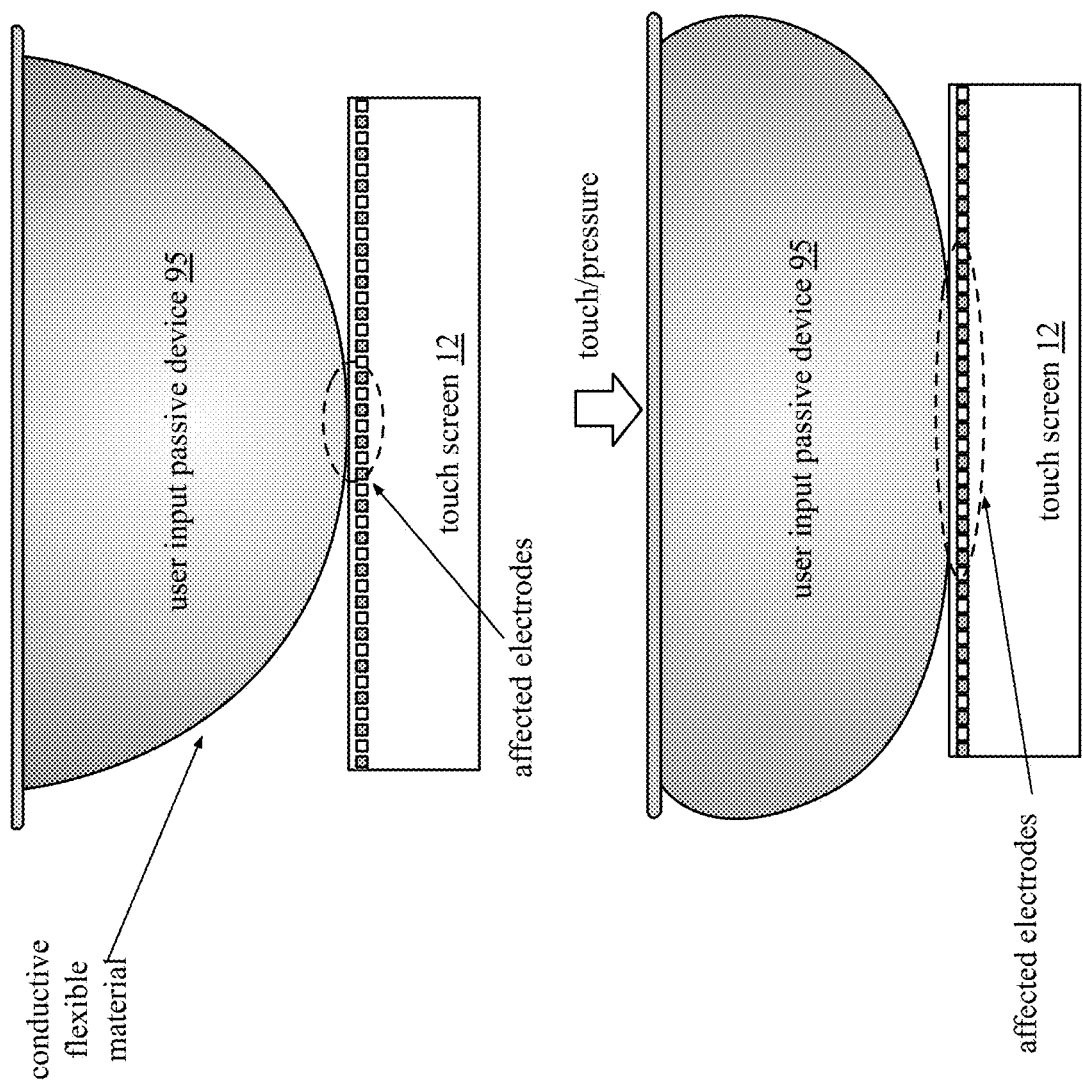
FIG. 29 is a schematic block diagram of another embodiment of the user input passive device interacting with the touch screen in accordance with the present invention.

FIG. 29 is a schematic block diagram of another embodiment of the user input passive device 95 interacting with the touch screen 12. In this example, the user input passive device 95 includes a flexible conductive material such that when a touch and/or pressure is applied, the user input passive device 95 changes shape. For example, when pressure is applied in the center of the top of the user input passive device 95 the area in contact with the touch screen 12 increases thus affecting more electrodes. As such, applying pressure can indicate any number of user input functions (e.g., select, zoom, etc.).

Figure 30:
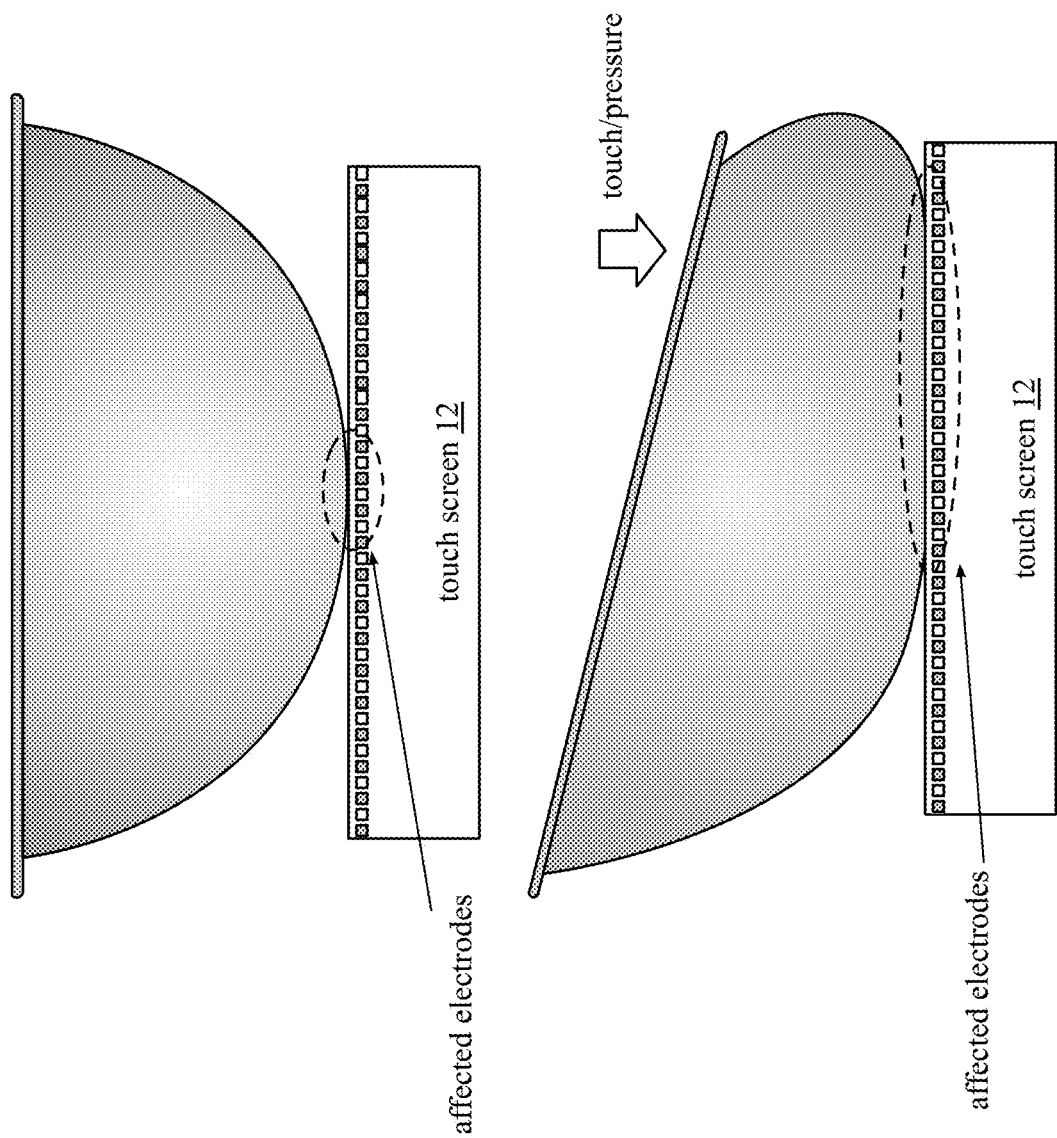
FIG. 30 is a schematic block diagram of another embodiment of the user input passive device interacting with the touch screen in accordance with the present invention.

FIG. 30 is a schematic block diagram of another embodiment of the user input passive device 95 interacting with the touch screen 12. FIG. 30 is similar to the example of FIG. 29 where the user input passive device 95 includes a flexible conductive material such that when a touch and/or pressure is applied, the user input passive device 95 changes shape. In this example, pressure is applied off center on the top of the user input passive device 95. The pressure increases and shifts the area in contact with the touch screen 12 thus affecting more electrodes in a different location. Therefore, the shift in location as well as an increased number of affected electrodes can indicate any number of user input functions. For example, the user input passive device 95 can be tilted forward to indicate a movement and pressure can be applied to indicate a selection.

Figure 31B:
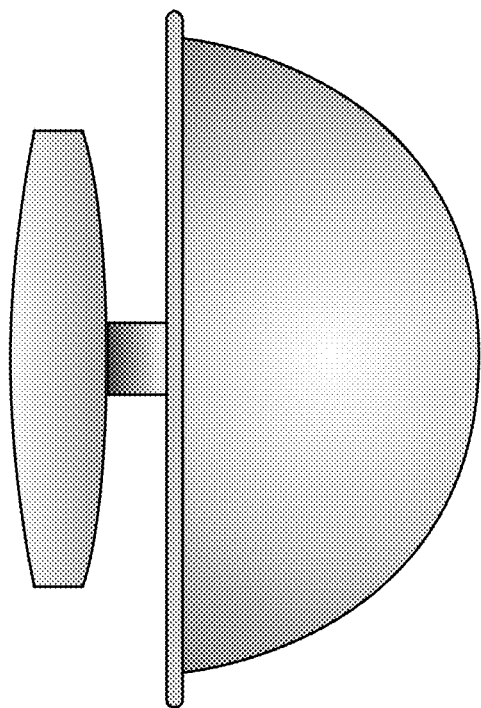
FIGS. 31A-31G are schematic block diagrams of examples of a user input passive device in accordance with the present invention.
Figure 31D:
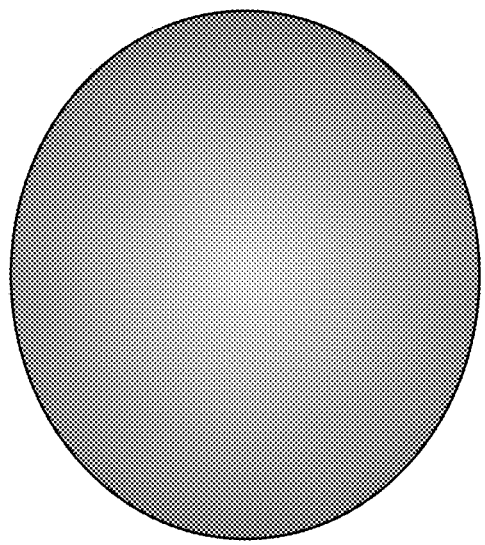
Figure 31A:
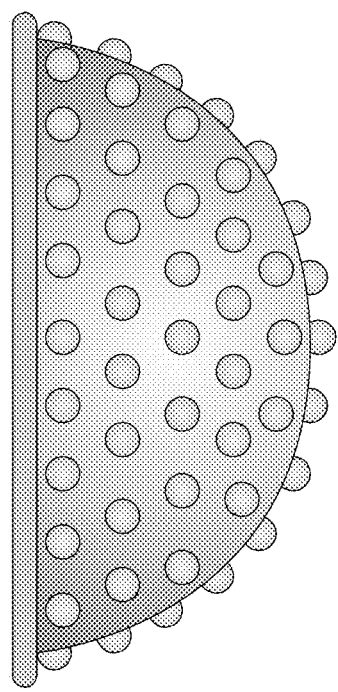

FIGS. 31A-31G are schematic block diagrams of examples of the user input passive device 95. In FIG. 31A, the user input passive device 95 is a half-spherical shape with a flat top surface that includes a plurality of protruding bumps or dimples for interaction with the touch screen. The entire surface may be conductive, the dimples may be conductive, and/or some combination thereof may be conductive. The pattern and size of the dimples can aid the touch screen 12 in detecting the user input passive device 95 and interpreting user input functions.

In FIG. 31B, the user input passive device 95 is a smooth, half-spherical shape with a flat top surface that includes a top handle for ease of use by the user. The top shape of the user input passive device 95 can correspond to a game piece (e.g., an air hockey striker) or resemble a gaming joy stick to allow for intuitive and easy use for a variety of applications and functions.

Figure 31C:
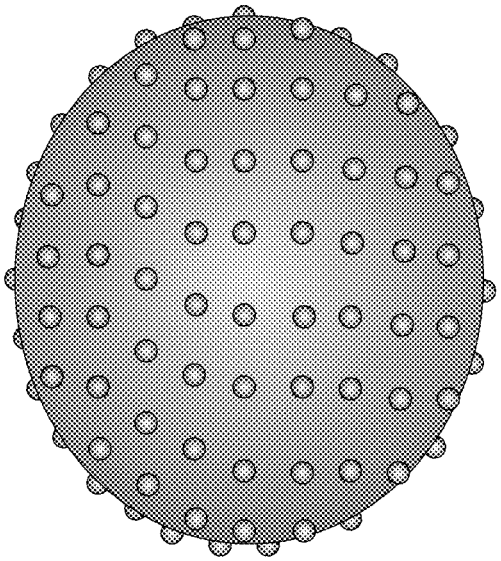

In FIG. 31C, the user input passive device 95 is a spherical shape that includes a plurality of protruding bumps or dimples for interaction with the touch screen. The entire surface may be conductive, the dimples may be conductive, and/or some combination thereof may be conductive. The pattern and size of the dimples can add the touch screen 12 in detecting the user input passive device 95 and interpreting user input functions. With a full sphere, the user can roll the user input passive device 95 across the touch screen with a palm.

Figure 31E:
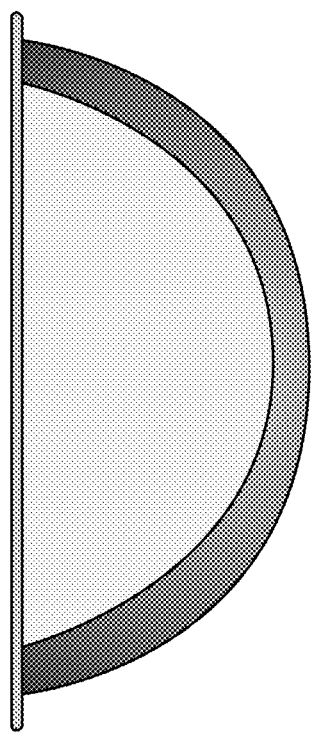

In FIG. 31D, the user input passive device 95 is a smooth spherical shape. In FIG. 31E, the user input passive device 95 a smooth, half-spherical shape with a flat top surface that has a conductive outer shell and a hollow center.

Figure 31G:
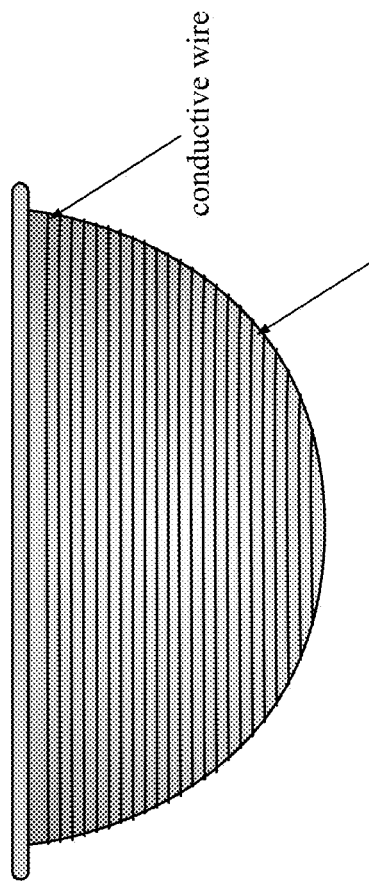
Figure 31F:
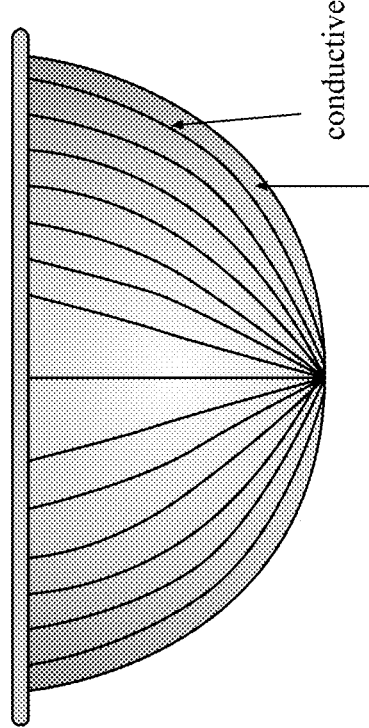

In FIG. 31F, the user input passive device 95 is a smooth, half-spherical shape with a flat top surface that includes non-conductive material and conductive wires in a radial pattern. In FIG. 31G, the user input passive device 95 is a smooth, half-spherical shape with a flat top surface that includes non-conductive material and conductive wires in a circular pattern. The examples, of FIGS. 31F and 31G are similar to FIGS. 31A and 31C in that the conductive wires interact with the touch screen 12 in a unique way and/or pattern. The unique pattern enhances user input passive device 95 detection and user function recognition.

Any of the examples described in FIGS. 31A-31G may include rigid or flexible conductive material as discussed previously.

Figure 32:
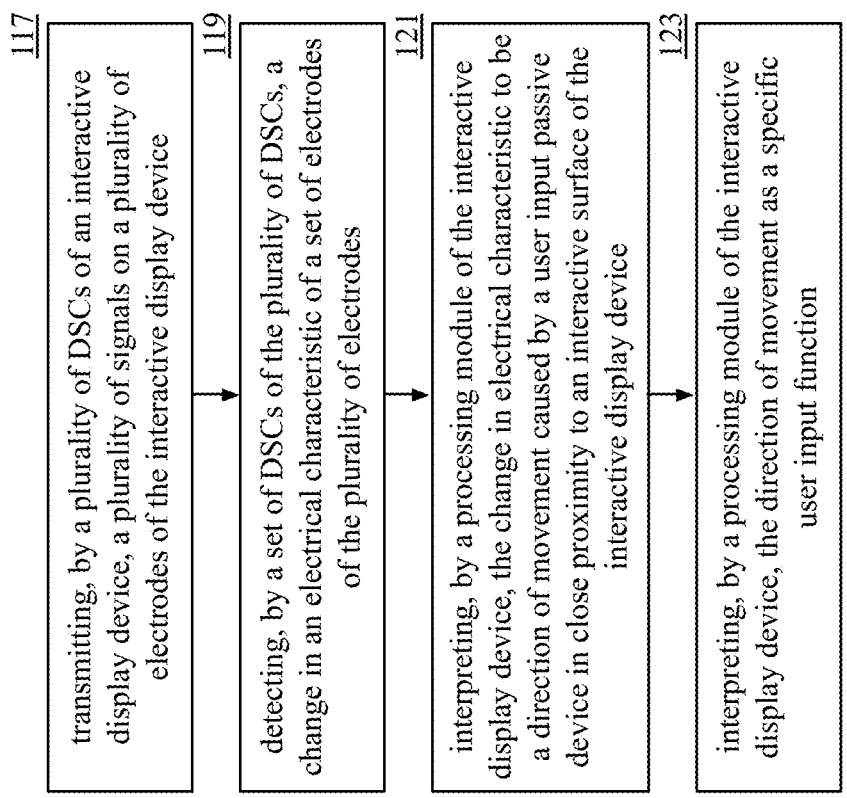
FIG. 32 is a logic diagram of an example of a method for interpreting user input from the user input passive device in accordance with the present invention.

FIG. 32 is a logic diagram of an example of a method for interpreting user input from the user input passive device. The user input passive device may include a conductive shell with a hollow center, a solid conductive material, a combination of conductive and non-conductive materials, etc. The user input passive device may include a spherical, half-spherical, and/or other rounded shape for user interaction with the touch screen. Examples of the user input passive device 95 will be discussed further with reference to FIGS. 27-31.

The method begins with step 117 where a plurality of drive sense circuits (DSCs) of an interactive display device transmit a plurality of signals on a plurality of electrodes of the interactive display device. The interactive display device includes the touch screen, which may further include a personalized display area to form an interactive touch screen.

The method continues with step 119 where a set of DSCs of the plurality of DSCs detect a change in an electrical characteristic of a set of electrodes of the plurality of electrodes. For example, the self and mutual capacitance of an electrode is affected when a user input passive device is capacitively coupled to the interactive display device.

The method continues with step 121 where a processing module of the interactive display device interprets the change in electrical characteristic to be a direction of movement caused by a user input passive device in close proximity to an interactive surface of the interactive display device. For example, the change in electrical characteristic is an increase or decrease in self and/or mutual capacitance by a certain amount to a certain number of electrodes that is indicative of movement by the user input passive device.

The method continues with step 123 where the processing module of the interactive display device interprets the direction of movement as a specific user input function. For example, a direction of movement may indicate a movement (e.g., in a game, with a cursor, etc.), a selection, a scroll, etc.

Figure 33:
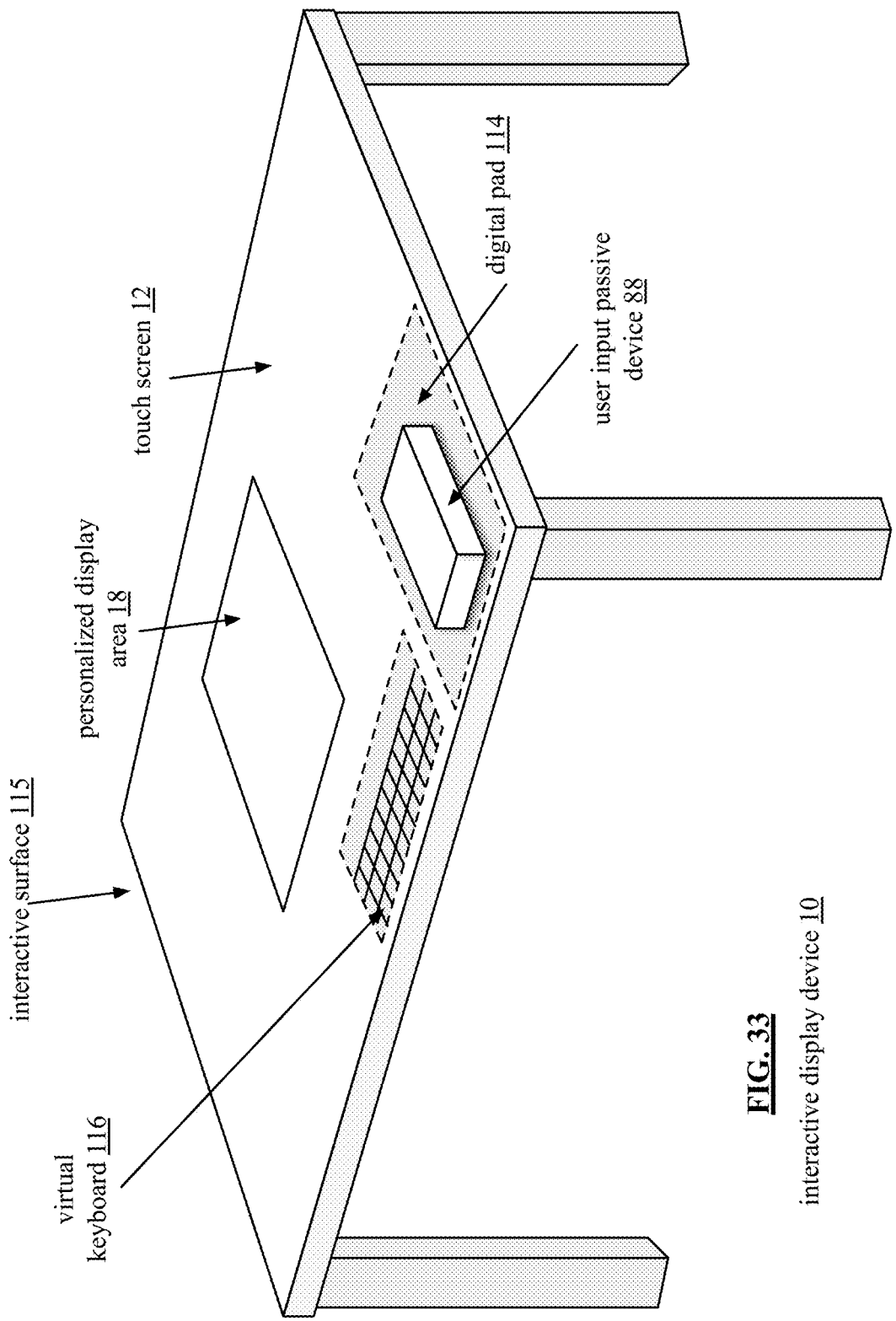
FIG. 33 is a schematic block diagram of another embodiment of the interactive display device in accordance with the present invention.

FIG. 33 is a schematic block diagram of another embodiment of the interactive display device 10 (e.g., shown here as an interactive table top) that includes the touch screen 12, which may further include a personalized display area 18 to form an interactive touch screen display (also referred to herein as interactive surface 115). The personalized display area 18 may extend to all of the touch screen 12 or a portion as shown. When the user input passive device 88 is in contact with the interactive surface, a digital pad 114 is generated for use with the user input passive device 88.

The interactive display device 10 is operable to interpret user inputs received from the user input passive device 88 within the digital pad 114 area as functions to manipulate data on the personalized display area 18 of the interactive display device 10. For example, moving the user input passive device 88 within the digital pad 114 maps to movements on the personalized display area 18 so that the user can execute various functions within the personalized display area 18 without having to move the user input passive device 88 onto the personalized display area 18. This is particularly useful when the personalized display area 18 is large, and the user cannot easily access the entire personalized display area.

The digital pad 114 is operable to move with the user input passive device 88 and is of a predetermined size and shape, a user defined size and shape, and/or a size and shape based on the size and shape of the user input passive device 88. Further, the size of the digital pad 114 may be determined and dynamically adjusted based on available space of the interactive display device 10 (e.g., where available space is determined based on one or more personalized display areas, detected objects, etc.). Moving the digital pad 114 onto the personalized display area 18 can cause the personalized display area 18 to adjust so that the digital pad 114 is not obstructing the personalized display area 18. Alternatively, moving the digital pad 114 onto the personalized display area 18 may disable the digital pad 114 when the user intends to use the user input passive device 88 directly on the personalized display area 18. A more detailed discussion of adjusting a personalized display area based on an obstructing object is discussed with reference to one or more of FIGS. 36-44.

When the user input passive device 88 is in contact with the interactive surface, a virtual keyboard 116 may also be generated for use by the user. The virtual keyboard 116 is displayed in an area of the touchscreen in accordance with the user input passive device 88's position. For example, the virtual keyboard 116 is displayed within a few inches of where the user input passive device 88 is located. User information (e.g., location at the table, right handed or left, etc.) available from the user input passive device and/or user input aids in the display of the virtual keyboard 116. For example, a user identifier (ID) (e.g., based on a particular impedance pattern) associated with the user input passive device 88 indicates that the user is right-handed. Therefore, the virtual keyboard 116 is displayed to the left of the user input passive device 88.

As such, use of the user input passive device 88 triggers the generation of one or more of the digital pad 114 and the virtual keyboard 116. Alternatively, a user input triggers the generation of one or more of the digital pad 114 and the virtual keyboard 116. For example, the user hand draws an area (e.g., or inputs a command or selection to indicate generation of the digital pad 114 and/or the virtual keyboard 116 is desired) on the touchscreen to be used as one or more of the digital pad 114 and the virtual keyboard 116. When the digital pad 114 area is triggered without the user input passive device, the user can optionally use a finger and/or other capacitive device for inputting commands within the digital pad 114. As with the user input passive device 88, the interactive display device 10 is operable to interpret user inputs received within the digital pad 114 area as functions to manipulate data on the personalized display area 18 of the interactive display device 10.

As another example, a keyboard has a physical structure (e.g., a molded silicon membrane, a transparent board, etc.). The interactive display device can recognize the physical structure as a keyboard using a variety of techniques (e.g., a frequency sweep, capacitance changes, a tag, etc.) and also know its orientation (e.g., via passive device recognition techniques discussed previously). When the physical keyboard is recognized, the touch screen may display the virtual keyboard underneath the transparent structure for use by the user.

The physical keyboard includes conductive elements (e.g., conductive paint, a full conductive mechanical key structure, etc.) such that interaction with the conductive element by the user is interpreted as a keyboard function. For example, the keyboard is a molded silicon membrane with conductive paint on each key. The user physically presses down on a key such that the conductive paint contacts the touch screen. Each key may have a different conductive paint pattern such that the touch screen interprets each pattern as a different function (i.e., key selection, device ID, etc.).

The touch screen of the interactive display device 10 may further include a high resolution section for biometric input (e.g., a finger print) from a user. The biometric input can unlock one or more functions of the interactive display device 10. For example, inputting a finger print to the high resolution section may automatically display one or more of a digital pad 114, virtual keyboard 116, and the personalized display area in accordance with that user's preferences.

Figure 34:
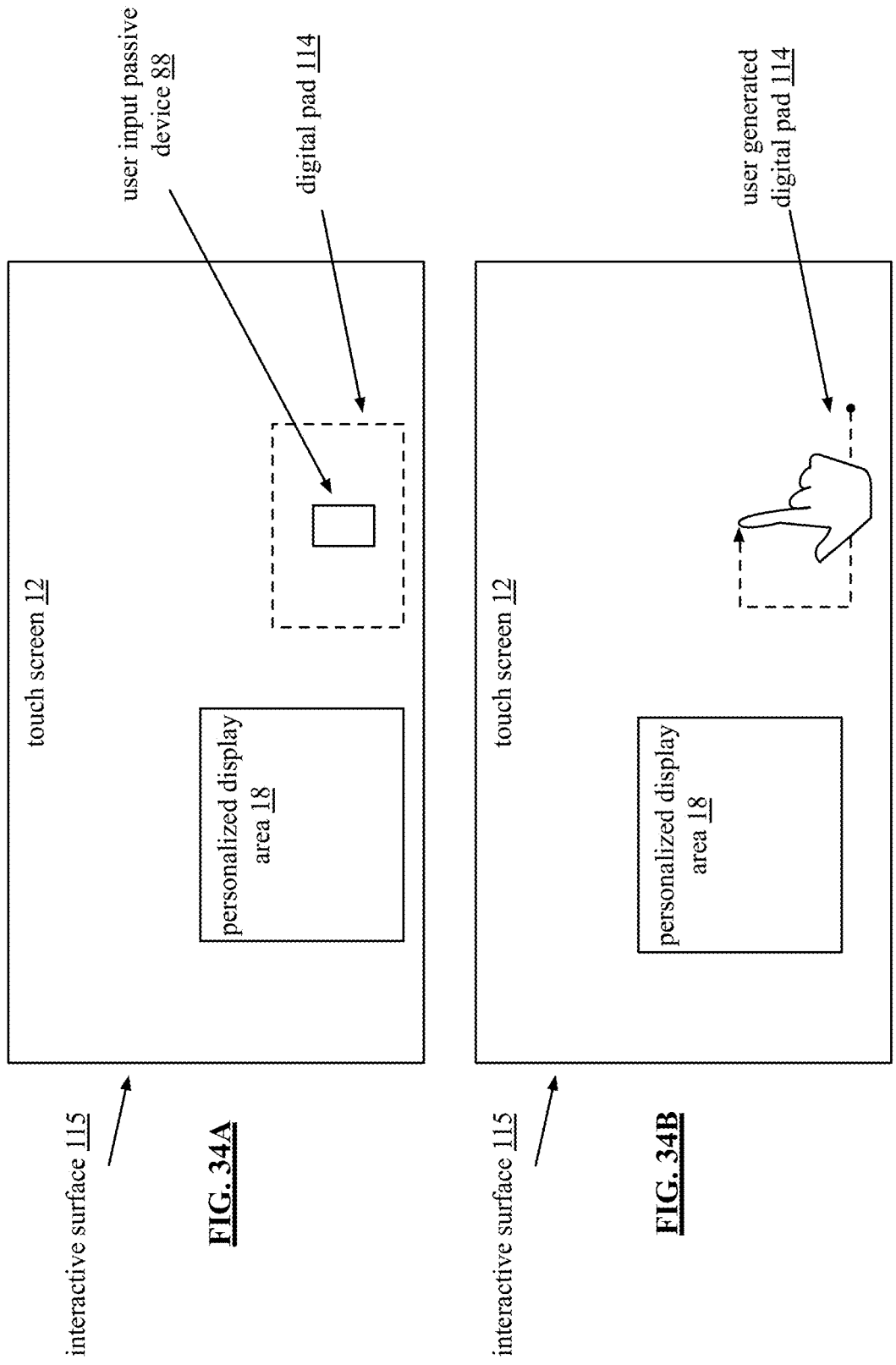
FIGS. 34A-34B are schematic block diagrams of examples of digital pad generation on a touch screen in accordance with the present invention.

FIGS. 34A-34B are schematic block diagrams of examples of digital pad 114 generation on an interactive surface 115 of the interactive display device. Interactive surface 115 includes touch screen 12 and personalized display area 18. FIG. 34A depicts an example where using the user input passive device 88 on the interactive surface 115 triggers generation of a digital pad 114 for use with the user input passive device 88 on the interactive surface 115. For example, setting the user input passive device 88 on the interactive surface 115 generates the digital pad 114. Alternatively, a user requests generation of the digital pad 114 via an input interpreted via the user input passive device 88 or other user input.

The interactive display device 10 is operable to interpret user inputs received from the user input passive device 88 within the digital pad 114 area as functions to manipulate data on the personalized display area 18 of the interactive display device 10. For example, moving the user input passive device 88 around the digital pad 114 maps to movements around the personalized display area 18 so that the user can execute various functions within the personalized display area 18 without having to move the user input passive device 88 onto the personalized display area 18. The digital pad 114 is operable to move with the user input passive device 88 and is of a predetermined shape and size, a user defined size and shape, and/or a size and shape based on the size and shape of the user input passive device 88.

FIG. 34B depicts an example where a user input triggers the generation of the digital pad 114 for use with or without the user input passive device 88. For example, the user hand draws an area and/or inputs a command or selection to indicate generation of the digital pad 114 is desired on the interactive surface 115. When the digital pad 114 area is triggered without the user input passive device, the user can optionally use a finger or other capacitive device for inputting commands within the digital pad 114. As with the user input passive device 88, the interactive display device 10 is operable to interpret user inputs received within the digital pad 114 area as functions to manipulate data on the personalized display area 18 of the interactive display device 10.

Figure 35:
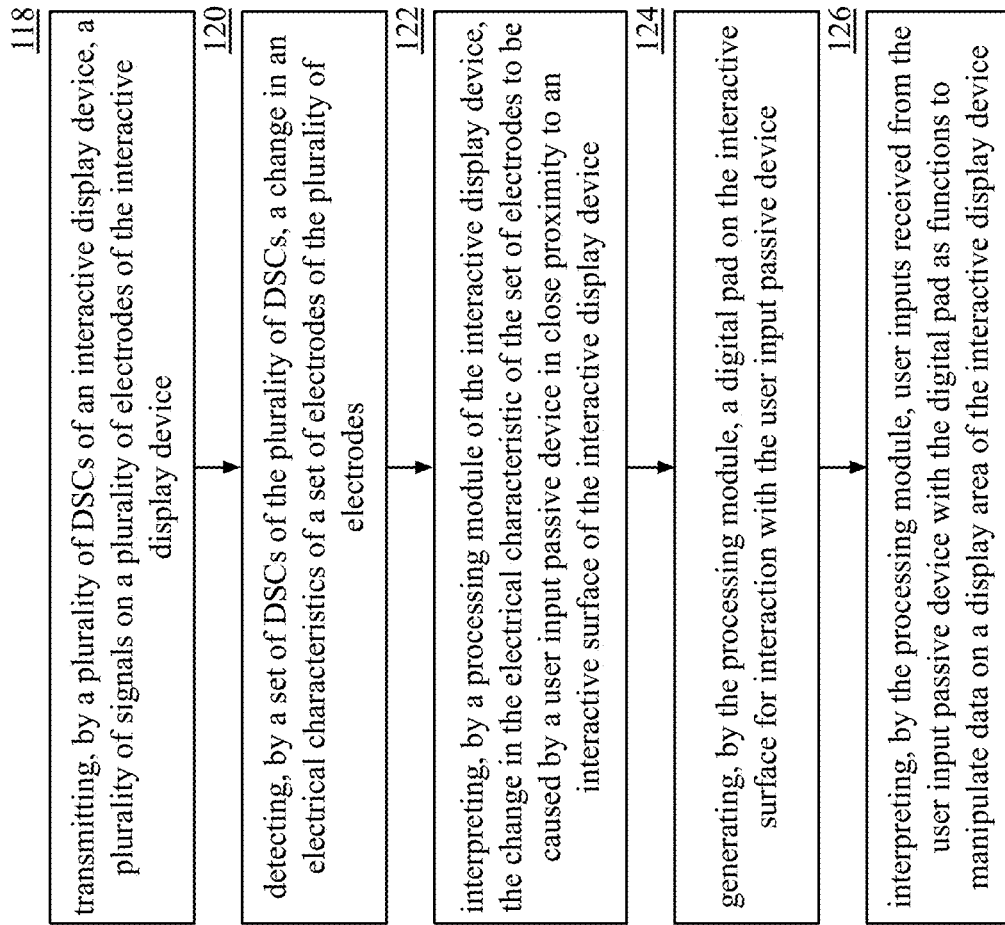
FIG. 35 is a logic diagram of an example of a method for generating a digital pad on an interactive surface of an interactive display device for interaction with a user input passive device in accordance with the present invention.

FIG. 35 is a logic diagram of an example of a method for generating a digital pad on an interactive surface of an interactive display device for interaction with a user input passive device. The method begins with step 118 where a plurality of drive sense circuits (DSCs) of the interactive display device transmit a plurality of signals on a plurality of electrodes of the interactive display device.

The method continues with step 120 where the plurality of DSCs detect a change in electrical characteristics of a set of electrodes of the plurality of electrodes. For example, the plurality of DSCs detect a change to mutual capacitance of the set of electrodes. The method continues with step 122 where a processing module of the interactive display device interprets the change in the electrical characteristics of the set of electrodes to be caused by a user input passive device in close proximity to an interactive surface of the interactive display device. For example, the mutual capacitance change detected on the set of electrodes is an impedance pattern corresponding to a particular user input passive device. User input passive device detection is discussed in more detail with reference to one or more of FIGS. 5-32.

The method continues with step 124 where the processing module generates a digital pad on the interactive surface for interaction with the user input passive device. The digital pad may or may not be visually displayed to the user (e.g., a visual display may include an illuminated area designating the digital pad's area, an outline of the digital pad, a full rendering of the digital pad, etc.). The digital pad moves with the user input passive device as the user input passive device moves on the interactive surface of the interactive display device. The digital pad may be of a predetermined size and shape, a size and shape based on the size and shape of the user input passive device, a size and shape based on a user selection, and/or a size and shape based on an available area of the interactive display device.

For example, available area of the interactive display device may be limited due to the size of the interactive display device, the number and size of personalized display areas, and various objects that may be resting on and/or interacting with the interactive display device. The interactive display device detects an amount of available space and scales the digital pad to fit while maintaining a size that is functional for the user input passive device. The size of the digital pad is dynamically adjustable based on the availability of usable display area on the interactive display device.

Moving the digital pad onto a personalized display area can cause the personalized display area to adjust so that the digital pad is not obstructing the view of the personalized display area. A more detailed discussion of adjusting display areas based on obstructing objects is disclosed with reference to one or more of FIGS. 36-44. Alternatively, moving the digital pad onto the personalized display area disables the digital pad so that the user input passive device can be used directly on the personalized display area.

The method continues with step 126 where the processing module interprets user inputs received from the user input passive device within the digital pad as functions to manipulate data on a display area of the interactive display device. For example, moving the user input passive device around the digital pad maps to movements around a personalized display area of the interactive display device so that the user can execute various functions within the personalized display area without having to move the user input passive device directly onto the personalized display area.

The digital pad may also have additional functionality for user interaction. For example, the digital pad may consist of different zones where use of the user input passive device in one zone achieves one function (e.g., scrolling) and use of the user input passive device in another zone achieves another function (e.g., selecting). The digital pad is also operable to accept multiple inputs. For instance, the user input passive device as well as the user's finger can be used directly onto the digital pad for additional functionality.

In an alternative example, instead of use of the user input passive device triggering generation of the digital pad, a user input can trigger the generation of the digital pad. For example, a user can hand draw an area and/or input a command or selection to indicate generation of the digital pad on the interactive surface of the interactive display device. When the digital pad is triggered without the user input passive device, the user can optionally use a finger or other capacitive device for inputting commands within the digital pad. As with the user input passive device, the interactive display device is operable to interpret user inputs received within the digital pad area as functions to manipulate data on the personalized display area of the interactive display device.

Generation of the digital pad can additionally trigger the generation of a virtual keyboard. When the user input passive device triggers the digital pad, the virtual keyboard is displayed in an area of the interactive surface in accordance with the user input passive device's position. For example, the virtual keyboard is displayed within a few inches of where the user input passive device is located. User information (e.g., user location at a table, right handed or left handed, etc.) available from the user input passive device or other user input aids in the display of the virtual keyboard. For example, a user identifier (ID) (e.g., based on a particular impedance pattern) associated with the user input passive device indicates that the user is right handed. Therefore, the virtual keyboard is displayed to the left of the user input passive device.

Alternatively, a user input triggers the generation of the virtual keyboard. For example, the user hand draws the digital pad and the digital pad triggers generation of the virtual keyboard or the user hand draws and/or inputs a command or selection to indicate generation of the virtual keyboard on the interactive surface.

Figure 36:
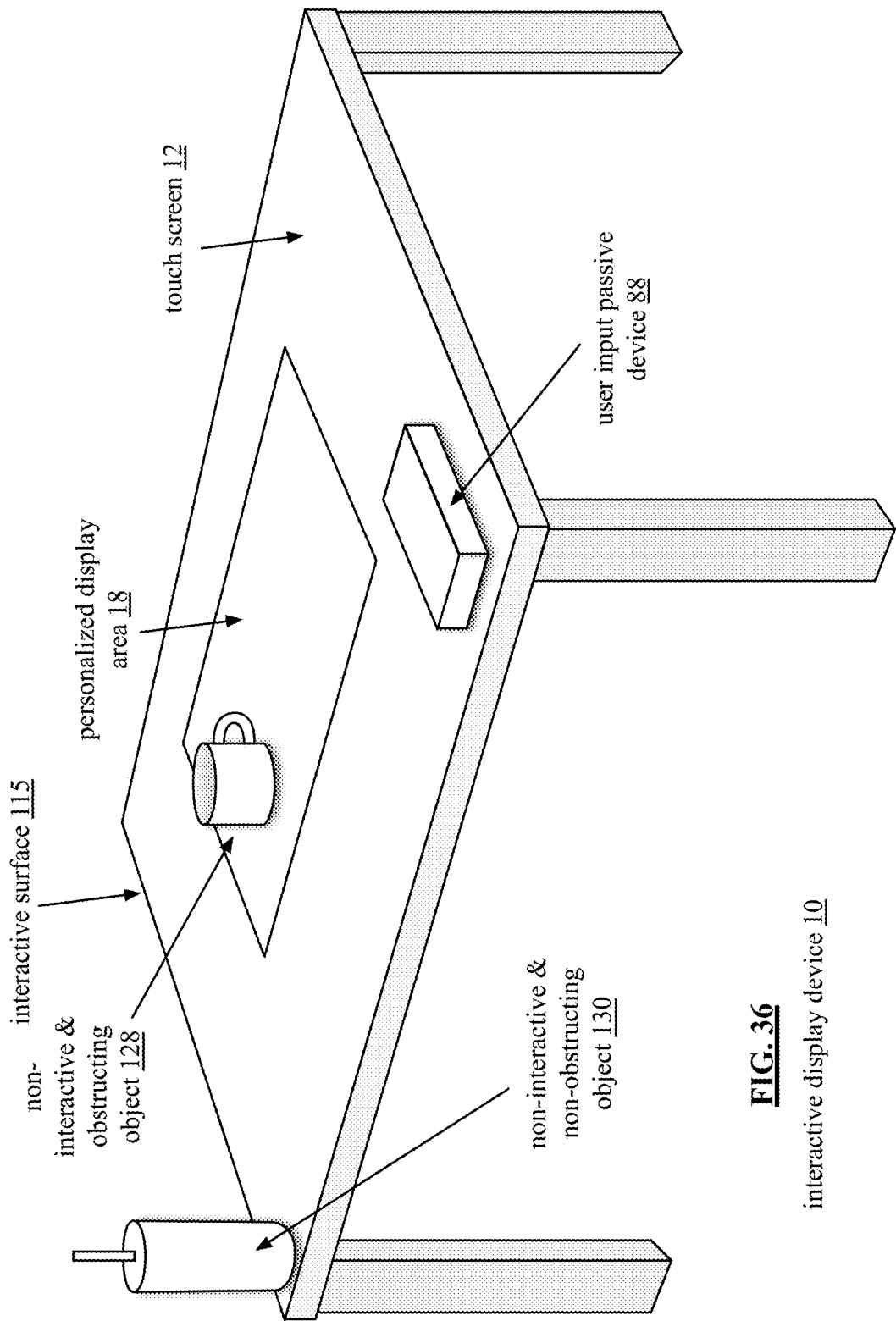
FIG. 36 is a schematic block diagram of another embodiment of the interactive display device in accordance with the present invention.

FIG. 36 is a schematic block diagram of another embodiment of the interactive display device 10 that includes the touch screen 12, which may further include a personalized display area 18 to form interactive surface 115. The personalized display area 18 may extend to all of the touch screen 12 or a portion as shown. The interactive display device 10 is shown here as an interactive table top that has interactive functionality (i.e., a user is able to interact with the table top via the interactive surface 115) and non-interactive functionality (i.e., the interactive table top serves as a standard table top surface for supporting various objects).

In this example, the interactive display device 10 has three objects on its surface: a non-interactive and obstructing object 128 (e.g., a coffee mug), a non-interactive and non-obstructing object 130 (e.g., a water bottle), and a user input passive device 88. In contrast to the user input passive device 88 which the interactive display device 10 recognizes as an interactive object (e.g., via a detected impedance pattern, etc.) as discussed previously, the non-interactive objects 128 and 130 are not recognized as items that the interactive display device 10 should interact with. The non-interactive and obstructing object 128 is an obstructing object because it is obstructing at least a portion of the personalized display area 18. The non-interactive and non-obstructing object 130 is a non-obstructing obstructing object because it is not obstructing at least a portion of the personalized display area 18.

The interactive display device 10 detects non-interactive objects via a variety of methods. For example, the interactive display device 10 detects a two-dimensional (2D) shape of an object based on capacitive imaging (e.g., the object causes changes to mutual capacitance of the electrodes in the interactive surface 115 with no change to self-capacitance as there is no path to ground). For example, a processing module of the interactive display device 10 recognizes mutual capacitance change to a set of electrodes in the interactive surface 115 and a positioning of the set of electrodes (e.g., a cluster of electrodes are affected in a circular area) that indicates an object is present.

As another example, the interactive display device 10 implements a frequency scanning technique to recognize a specific frequency of an object and/or a material of an object and further sense a three-dimensional (3D) shape of an object. The interactive display device 10 may implement deep learning and classification techniques to identify objects based on known shapes, frequencies, and/or capacitive imaging properties.

As another example, the interactive display device 10 detects a tagged object. For example, a radio frequency identification (RFID) tag can be used to transmit information about an object to the interactive display device 10. For example, the object is a product for sale and the interactive display device 10 is a product display table at a retail store. A retailer tags the product such that placing the product on the table causes the table to recognize the object and further display information pertaining to the product. One or more sensors may be incorporated into an RFID tag to convey various information to the interactive display device 10 (e.g., temperature, weight, moisture, etc.). For example, the interactive display device 10 is a dining table at a restaurant and temperature and/or weight sensor RFID tags are used on plates, coffee mugs, etc. to alert staff to cold and/or finished food and drink, etc.

As another example, an impedance pattern tag can be used to identify an object and/or convey information about an object to the interactive display device 10. For example, an impedance pattern tag has a pattern of conductive pads that when placed on the bottom of objects is detectable by the interactive display device 10 (e.g., the conductive pads affect mutual capacitance of electrodes of the interactive display device 10 in a recognizable pattern). The impedance pattern can alert the interactive display device 10 that an object is present and/or convey other information pertaining to the object (e.g., physical characteristics of the object, an object identification (ID), etc.). As such, tagging (e.g., via RFID, impedance pattern, etc.) can change a non-interactive object into an interactive object.

As another example of an interactive object, a light pipe is a passive device that implements optical and capacitive coupling in order to extend the touch and display properties of the interactive display device beyond its surface. For example, a light pipe is a cylindrical glass that is recognizable to the interactive display device (e.g., via a tag, capacitive imaging, dielectric sensing, etc.) and may further include conductive and/or dielectric properties such that a user can touch the surface of the light pipe and convey functions to the touch screen. When placed on the interactive display device over an image intended for display, the light pipe is operable to display the image with a projected image/3-dimensional effect. The user can then interact with the projected image using the touch sense properties of touch screen via the light pipe.

When a non-interactive object and obstructing object 128 is detected by the interactive display device 10, the interactive display device 10 is operable to adjust the personalized display area 18 based on a position of a user such that the object is no longer obstructing the personalized display area 18. Examples of adjusting the personalized display area 18 such that an obstructing object is no longer obstructing the personalized display area 18 are discussed with reference to FIGS. 37A-37D.

FIGS. 37A-37D are schematic block diagrams of examples of adjusting a personalized display area 18 such that an obstructing object 128 is no longer obstructing the personalized display area 18. The interactive surface 115 of the interactive display device 10 (e.g., of FIG. 36) detects a two-dimensional shape of an object via one of the methods discussed with reference to FIG. 36. For example, an object changes mutual capacitance in electrodes of the interactive surface 115 such that the interactive surface 115 develops a capacitive image of the object. Because the personalized display area 18 is oriented toward a particular user, this known orientation is used to adjust the personalized display area with respect to the user's view. In the examples of FIGS. 37A-37D, the adjusting is done assuming a user is looking straight across from or straight down at the personalized display area 18. Generating personalized display areas according to user orientations are discussed with more detail in reference to FIGS. 45-48.

Figure 37A:
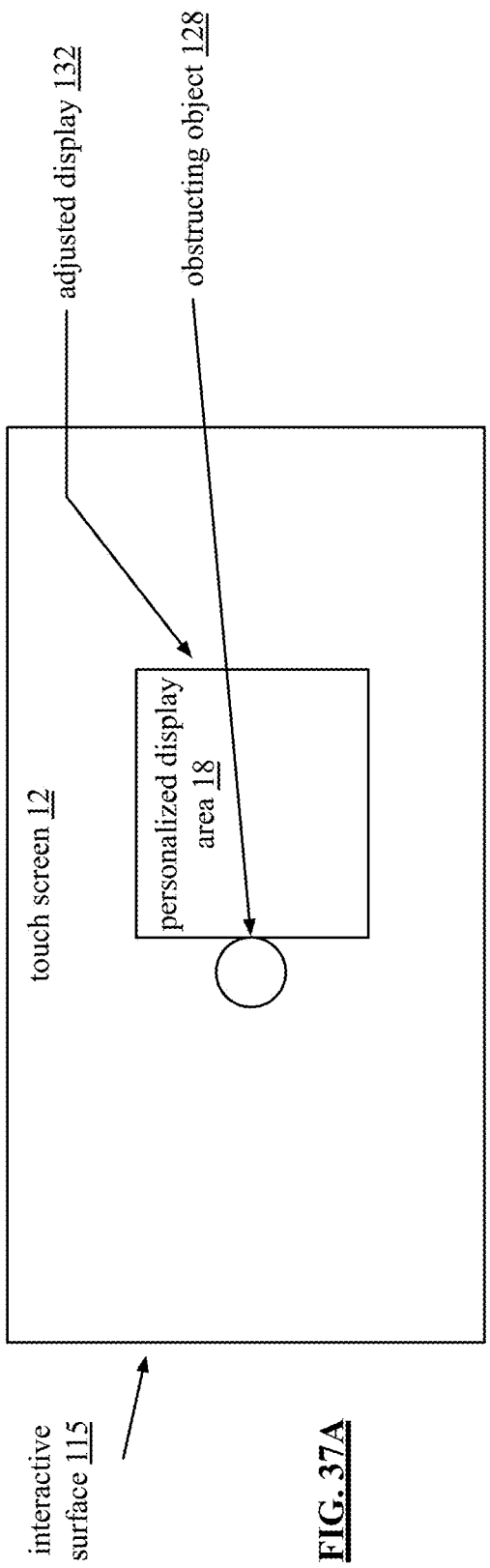

In FIG. 37A, an obstructing object 128 (e.g., the coffee mug of FIG. 36) is detected and the personalized display area 18 is shifted over to create an adjusted display 132 such that the obstructing object 128 is no longer obstructing the personalized display area 18. Adjusting the personalized display area 18 also includes determining available display space of the interactive display device 10. For example, when there is limited available space (e.g., other objects and personalized display areas are detected) the personalized display area 18 may be adjusted such that the adjusted personalized display area 18 takes up less space.

Figure 37B:
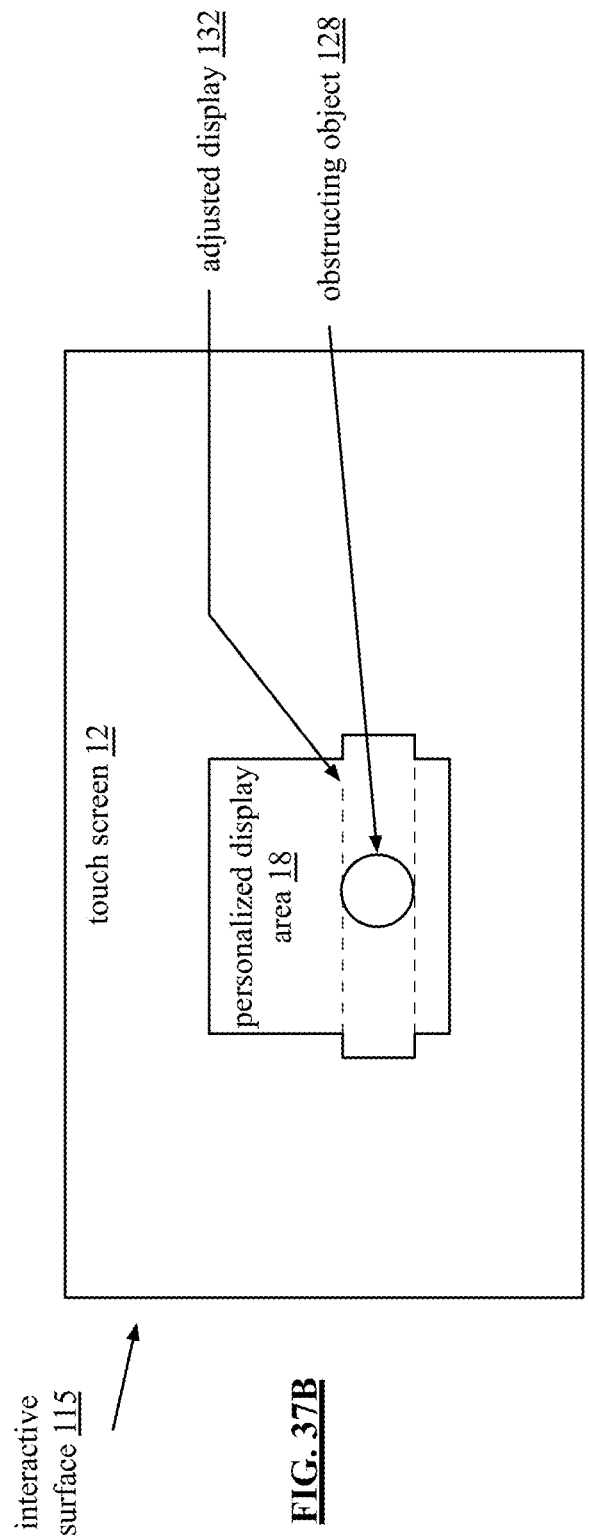

For example, in FIG. 37B, the obstructing object 128 is detected and the personalized display area 18 wraps around the obstructing object 128 to create the adjusted display 132. The type of adjustment may also depend on the type of data that is displayed in the personalized display area 18. For example, if the personalized display area 18 displays a word document consisting of text, the best adjustment may be the example of FIG. 37A so that the text displays correctly.

In FIG. 37C, the obstructing object 128 is detected and the personalized display area 18 is broken into three display windows where display window 2 is shifted over such that the obstructing object 128 is no longer obstructing the personalized display area 18. In FIG. 37D, the obstructing object 128 is detected and the personalized display area 18 is broken into three display windows to create adjusted display 132 where display windows 2 and 3 are shifted over such that the obstructing object 128 is no longer obstructing the personalized display area 18.

Figure 38:
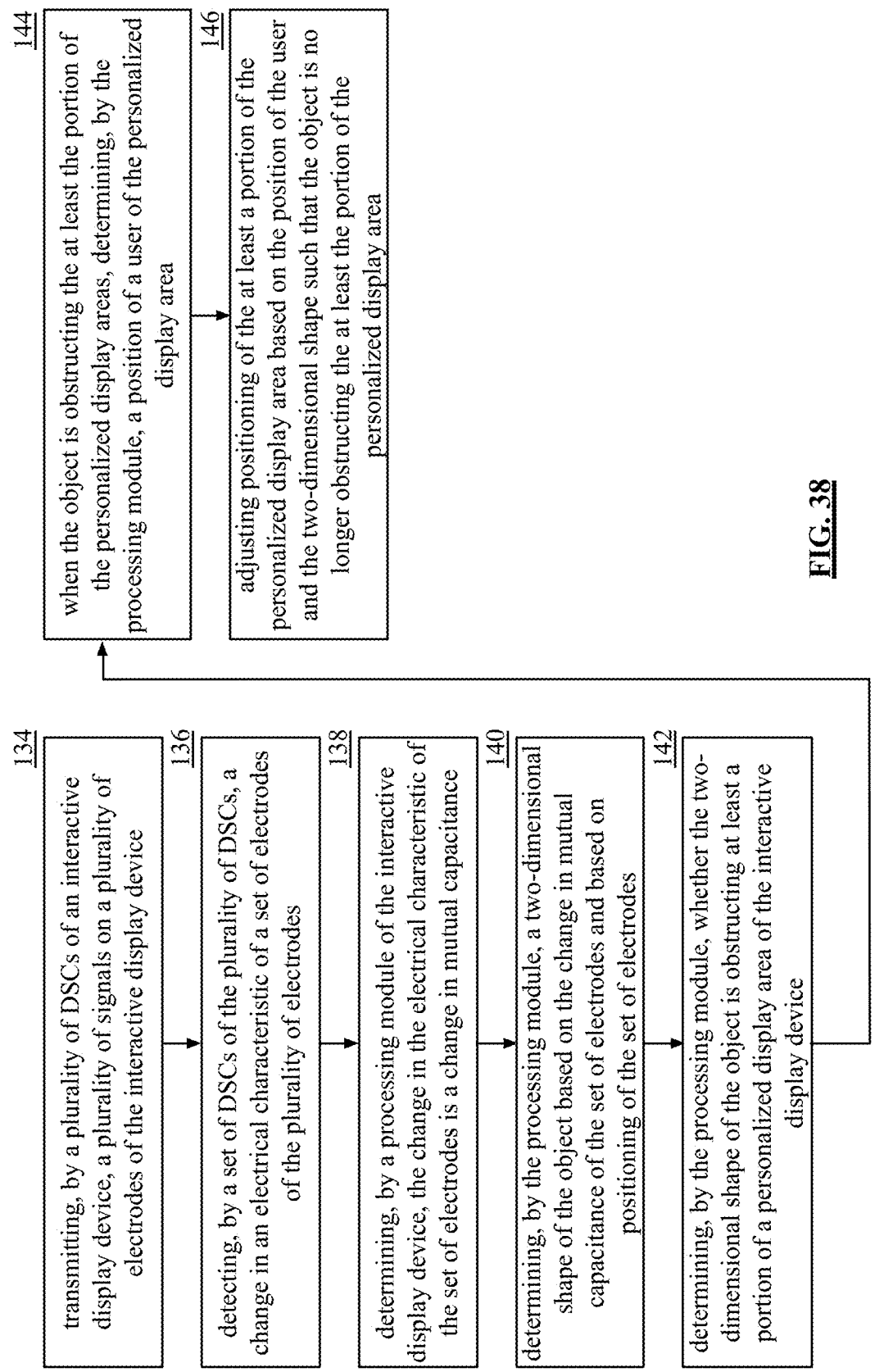
FIG. 38 is a logic diagram of an example of a method of adjusting a personalized display area based on detected obstructing objects in accordance with the present invention.

FIG. 38 is a logic diagram of an example of a method of adjusting a personalized display area based on detected obstructing objects. The method begins with step 134 where a plurality of drive sense circuits (DSCs) of an interactive display device (e.g., an interactive table top such as a dining table, coffee table, end table, etc.) transmit a plurality of signals on a plurality of electrodes of the interactive display device (e.g., where the electrodes include one or more of wire trace, diamond pattern, capacitive sense plates, etc.).

The method continues with step 136 where a set of DSCs of the plurality of DSCs detect a change in an electrical characteristic of a set of electrodes of the plurality of electrodes. The method continues with step 138 where a processing module of the interactive display device determines that the change in the electrical characteristic of the set of electrodes is a change in mutual capacitance. The method continues with step 140 where the processing module determines a two-dimensional shape of an object based on the change in mutual capacitance of the set of electrodes and based on positioning of the set of electrodes (e.g., a cluster of electrodes are affected in a circular area).

The method continues with step 142 where the processing module determines whether the two dimensional shape of the object is obstructing at least a portion of a personalized display area of the interactive display device. When the object is obstructing the at least the portion of the personalized display area of the interactive display device, the method continues with step 144 where the processing module determines a position of a user of the personalized display area. For example, the personalized display area is oriented toward a particular user. Therefore, the processing module assumes a user is looking straight across from or straight down at the personalized display area from that known orientation.

The method continues with step 146 where the processing module adjusts positioning of at least a portion of the personalized display area based on the position of the user and the two-dimensional shape, such that the object is no longer obstructing the at least the portion of the personalized display area. For example, the personalized display area is adjusted to create an adjusted display as in one or more of the examples described in FIGS. 37A-37D.

As another example, if the detected obstructing object is larger than or smaller than a certain size, the processing module can choose to ignore the item (e.g., for a certain period) and not adjust the personalized display area. For example, a briefcase is placed on the interactive display device entirely obstructing the personalized display area 18. Instead of adjusting the personalized display area 18 when the object is detected, the user is given a certain amount of time to move the item.

Figure 39:
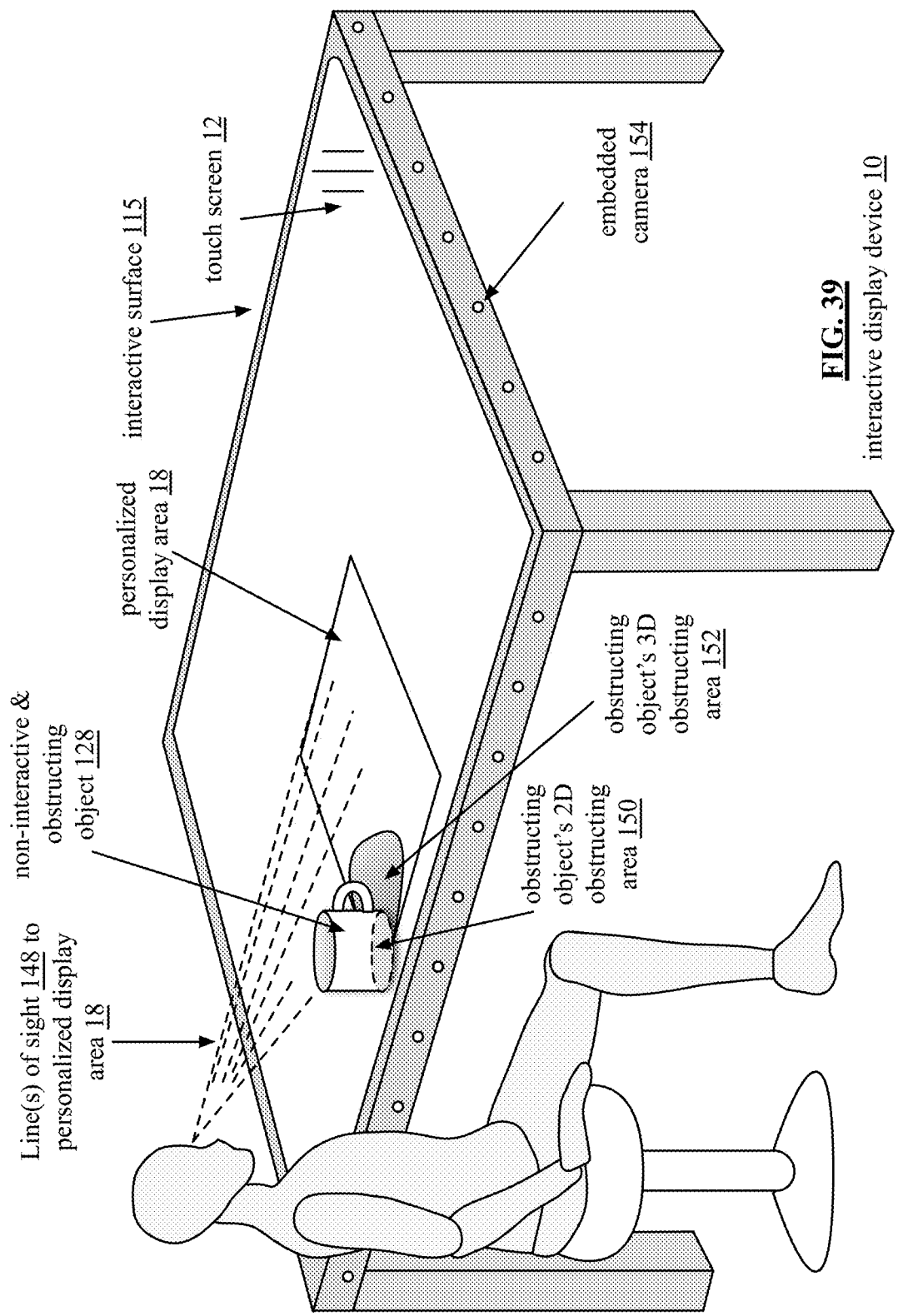
FIG. 39 is a schematic block diagram of another embodiment of the interactive display device in accordance with the present invention.

FIG. 39 is a schematic block diagram of another embodiment of the interactive display device 10 that includes the touch screen 12, which may further include a personalized display area 18 to form an interactive surface 115. The personalized display area 18 may extend to all of the touch screen 12 or a portion as shown. The interactive display device 10 is shown here as an interactive table top that has interactive functionality (i.e., a user is able to interact with the table top via the interactive surface 115) and non-interactive functionality (i.e., the interactive table top serves as a standard table top surface for supporting various objects). The interactive display device 10 further includes an array of embedded cameras 154 facing outward from a border of the interactive display device 10 separate from the interactive surface 115 (e.g., not incorporated into a top or bottom surface of the interactive display device 10).

In this example, a user is seated at the interactive display device 10 such that the user has line(s) of sight 148 to a personalized display area 18 on the interactive surface 115. The interactive display device 10 detects a non-interactive and obstructing object 128 (e.g., a coffee mug) in any method described with reference to FIG. 36 (e.g., capacitive imaging). The detection provides the obstructing object's two-dimensional (2D) obstructing area 150. The methods discussed with reference to FIG. 36 can determine three-dimensional (3D) characteristics of an object (e.g., via frequency scanning, classification, deep learning, and/or tagging, etc.). However, the obstructing object's 3D obstructing area 152 changes based on the user's lines of sight 148 to the personalized display area 18. The user's line of sight 148 changes based on the height of the user, whether the user is sitting or standing, a position of the user (e.g., whether the user is leaning onto the table top or sitting back in a chair), etc.

Here, the user is shown sitting straight up in a chair and looking directly down at the personalized display area 18 such that the obstructing object 128 is between the lines of sight 148 and the personalized display area 18. Thus, the obstructing object's 3D obstructing area 152 is a small shadow behind the obstructing object 128. In order to gain information regarding a user's line(s) of sight, the interactive display device 10 includes an array of embedded cameras 154. Image data from the embedded cameras 154 is analyzed to determine a position of the user with respect to the personalized display area 18, an estimated height of the user, whether the user is sitting or standing, etc. The image data is then used to determine the obstructing object's 3D obstructing area 152 in order to adjust the personalized display area 18 accordingly.

Figure 40:
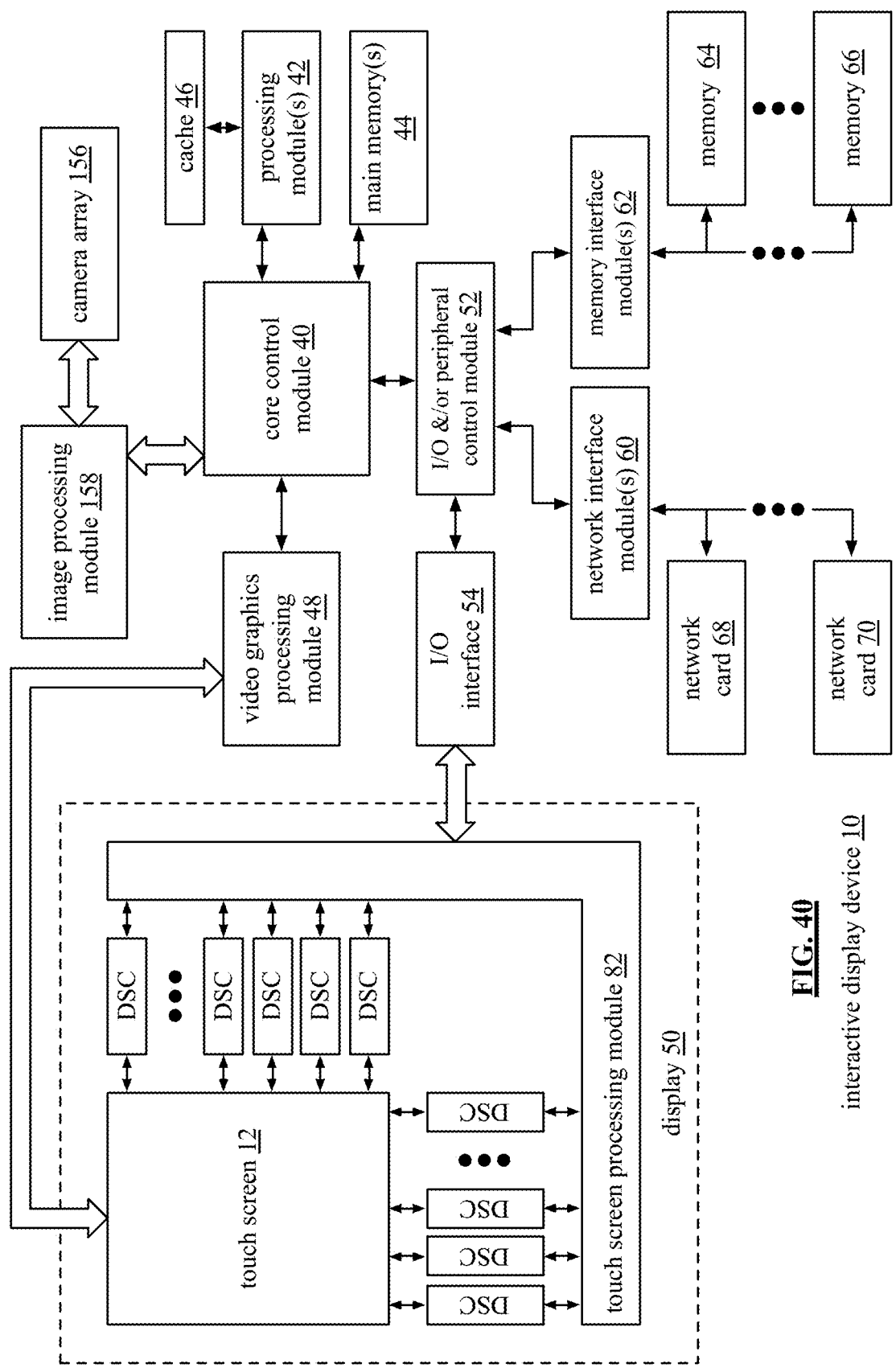
FIG. 40 is a schematic block diagram of another embodiment of the interactive display device in accordance with the present invention.

FIG. 40 is a schematic block diagram of another embodiment of the interactive display device 10 that includes a core control module 40, one or more processing modules 42, one or more main memories 44, cache memory 46, a video graphics processing module 48, a display 50, an Input-Output (I/O) peripheral control module 52, one or more input interface modules, one or more output interface modules, one or more network interface modules 60, one or more memory interface modules 62, an image processing module 158, and a camera array 156.

The interactive display device 10 operates similarly to the example of FIG. 2 except the interactive display device 10 of FIG. 40 includes the image processing module 158 and the camera array 156. The camera array 156 includes a plurality of embedded cameras. The cameras are embedded in a portion of the interactive display device 10 to capture images surrounding the interactive display device 10. For example, the interactive display device 10 is an interactive table top (e.g., a coffee table, a dining table, etc.) and the cameras are embedded into a structural side perimeter/border of the table (e.g., not embedded into the interactive surface of the interactive display device 10).

The cameras of the camera array 156 are small and may be motion activated such that when a user approaches the interactive display device 10, the cameras activated by the motion capture a series of images of the user. Alternatively, the cameras of the camera array 156 may capture images at predetermined intervals and/or in response to a command. The camera array 156 is coupled to the image processing module 158 and communicates captured images to the image processing module 158. The image processing module 158 processes the captured images to determine user characteristics (e.g., height, etc.) and positional information (e.g., seated, standing, distance, etc.) at the interactive display device 10 and sends the information to the core module 40 for further processing.

The image processing module 158 is coupled to the core module 40 where the core module 40 processes data communications between the image processing module 158, processing modules 42, and video graphics processing module 48. For example, the processing modules 42 detects a two dimensional object is obstructing a personalized display area 18 of the interactive display device 10. The user characteristics and/or positional information from image processing module 158 are used to further determine a three-dimensional obstructed area of the personalized display area 18 where the processing modules 42 and video graphics processing module 48 can produce an adjusted personalized display area based on the three-dimensional obstructed area for display to the user accordingly.

Figure 41:
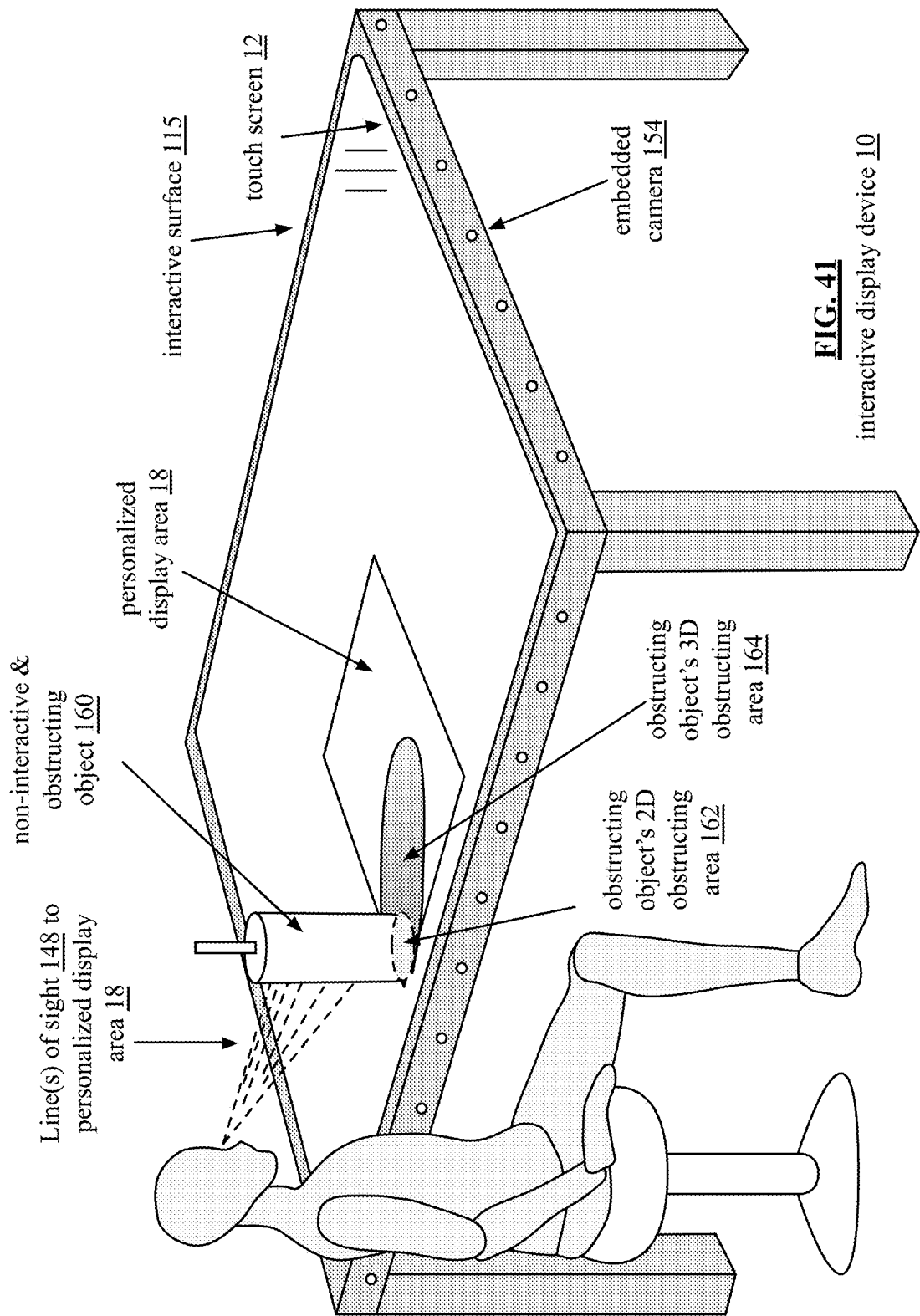
FIG. 41 is a schematic block diagram of another embodiment of the interactive display device in accordance with the present invention.

FIG. 41 is a schematic block diagram of another embodiment of the interactive display device 10 that includes the touch screen 12, which may further include a personalized display area 18 to form an interactive surface 115. FIG. 41 is similar to the example of FIG. 39 except that a taller non-interactive and obstructing object 160 is depicted (e.g., a water bottle) on the interactive surface 115. In comparison to FIG. 39, the obstructing object's two dimensional (2D) obstructing area 162 is approximately the same however the obstructing object's three dimensional (3D) obstructing area 164 is much larger due to the height of the obstructing object 160.

The object detection methods discussed with reference to FIG. 36 can determine 3D characteristics of an object 160 (e.g., via frequency scanning, classification, deep learning, and/or tagging, etc.). Once 3D characteristics are determined, an estimation of the obstructing object's 3D obstructing area 164 can be determined based on a predicted user orientation to the personalized display area 18. However, a more accurate obstructing object 3D obstructing area 164 can be determined by determining the user's line of sight 148 to the personalized display area 18 based on image data captured by the embedded cameras 154. For example, the image data can show that the user is sitting off to the side of the personalized display area 18 looking down such that the obstructing object 160 is directly between the user's line of sight 148 and the personalized display area 18.

FIG. 42 is a schematic block diagram of another embodiment of the interactive display device 10 that includes the touch screen 12, which may further include a personalized display area 18 to form an interactive surface 115. FIG. 42 is similar to FIG. 41 except that the user is now standing at the interactive display device 10 instead of sitting. In comparison to FIG. 41, the obstructing object's two dimensional (2D) obstructing area 162 is approximately the same however the obstructing object's three dimensional (3D) obstructing area 164 is now much smaller due to the user's improved line of sight 148 to the personalized display area 18.

Therefore, FIG. 42 illustrates that to determine an accurate obstructing object 3D obstructing area 164, a user's line of sight 148 to the personalized display area 18 needs to be determined (e.g., by capturing image data by the embedded cameras 154 for analysis).

FIGS. 43A-43E are schematic block diagrams of examples of adjusting a personalized display area 18 such that an obstructing object's two-dimensional (2D) obstructing area and three-dimensional (3D) obstructing area (e.g., obstructing object's 2D obstructing area 162 and obstructing object's 3D obstructing area 164 of FIG. 42) are no longer obstructing the personalized display area 18.

Figure 43A:
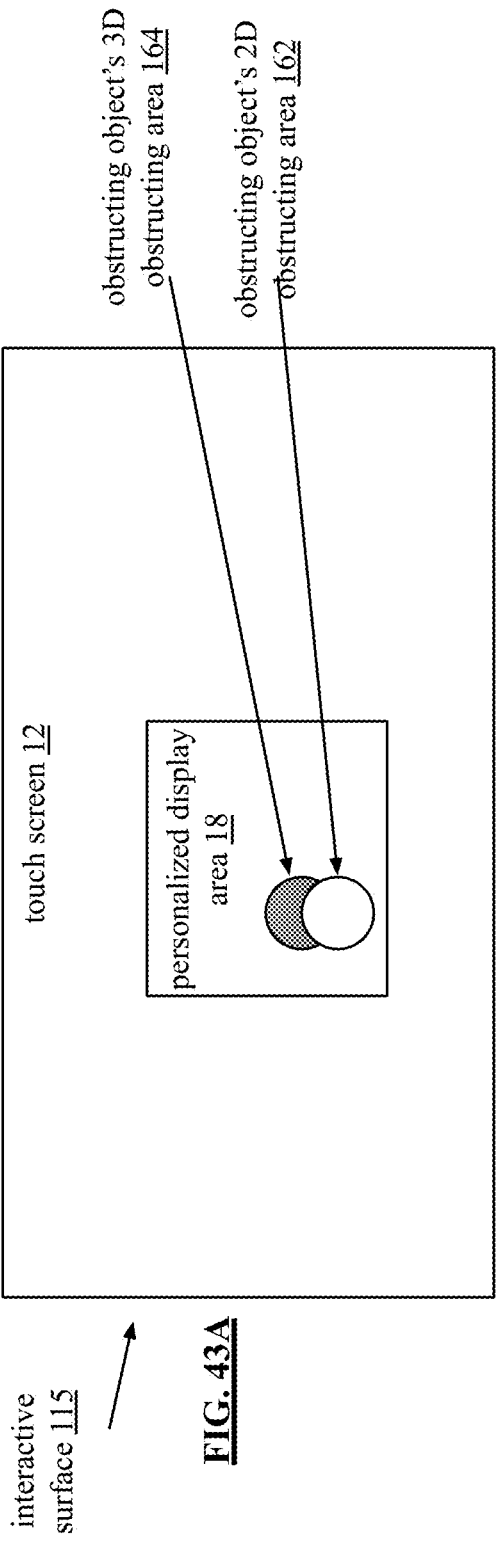

In FIG. 43A, the interactive surface 115 detects a 2D and/or 3D shape of an object via one of the methods discussed previously. For example, an object changes mutual capacitance in electrodes of the interactive surface 115 such that the interactive surface 115 develops a 2D capacitive image of the object. The interactive surface 115 also processes image data captured by a camera array to determine an accurate 3D obstructing area based on a user's line of sight, user characteristics, and/or other user positional information. The personalized display area 18 is then adjusted accordingly.

Figure 43B:
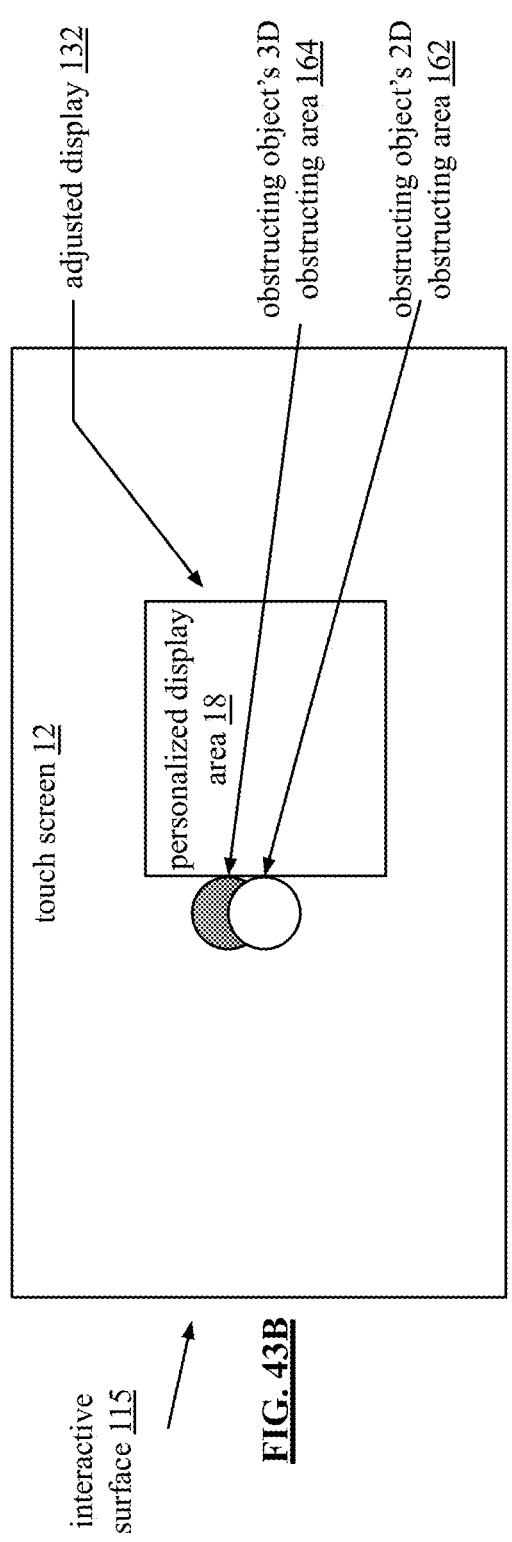

In FIG. 43B, the obstructing object's 2D obstructing area 162 and the obstructing object's 3D obstructing area 164 are detected and the personalized display area 18 is shifted over to create an adjusted display 132 such that the obstructing object's 2D obstructing area 162 and the obstructing object's 3D obstructing area 164 are no longer obstructing the personalized display area 18. Adjusting the personalized display area 18 also includes determining available display space of the interactive display device 10. For example, when there is limited available space (e.g., other objects and personalized display areas are detected) the personalized display area 18 may be adjusted in a way that takes up less space on the interactive surface 115.

For example, in FIG. 43C, the obstructing object's 2D obstructing area 162 and the obstructing object's 3D obstructing area 164 are detected and the personalized display area 18 wraps around the obstructing object's 2D obstructing area 162 and the obstructing object's 3D obstructing area 164 to create an adjusted display 132. The type of adjustment may also depend on the type of data that is displayed in the personalized display area 18. For example, if the personalized display area 18 displays a word document consisting of text, the best adjustment may be the example of FIG. 43B so that the text displays correctly.

In FIG. 43D, the obstructing object's 2D obstructing area 162 and the obstructing object's 3D obstructing area 164 are detected and the personalized display area 18 is broken into three display windows where display window 2 is shifted over such that the obstructing object's 2D obstructing area 162 and the obstructing object's 3D obstructing area 164 are no longer obstructing the personalized display area 18.

Figure 43E:
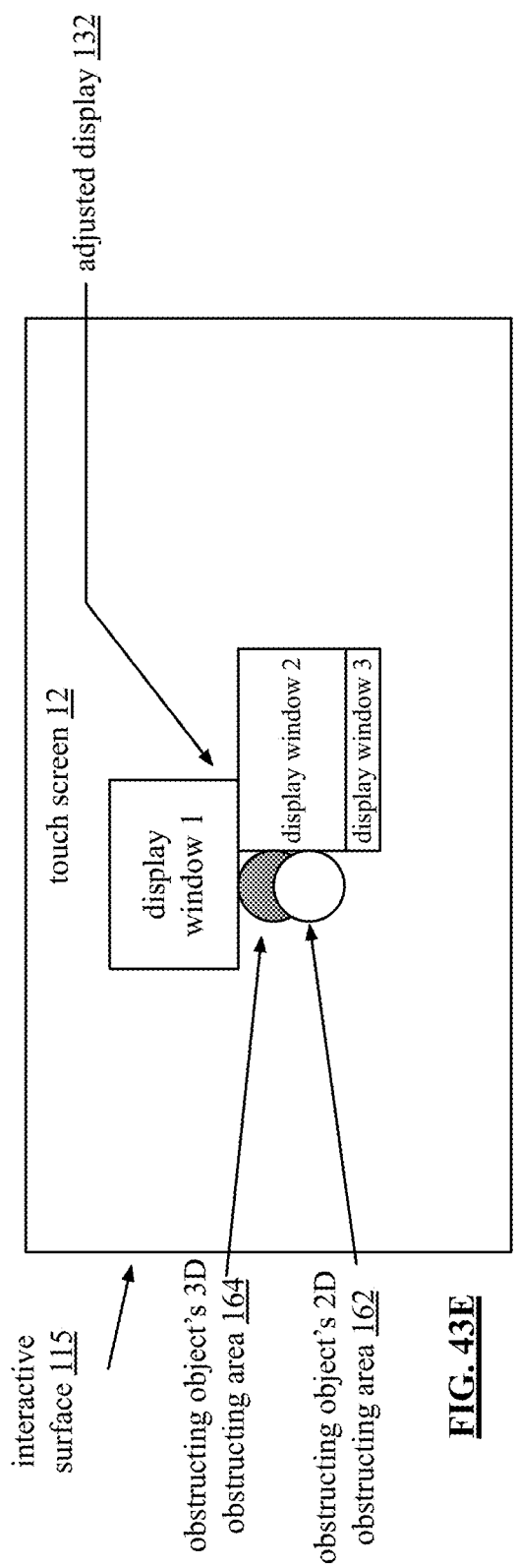

In FIG. 43E, the obstructing object's 2D obstructing area 162 and the obstructing object's 3D obstructing area 164 are detected and the personalized display area 18 is broken into three display windows to create an adjusted display 132 where display windows 2 and 3 are shifted over such that the obstructing object's 2D obstructing area 162 and the obstructing object's 3D obstructing area 164 are no longer obstructing the personalized display area 18.

Figure 44:
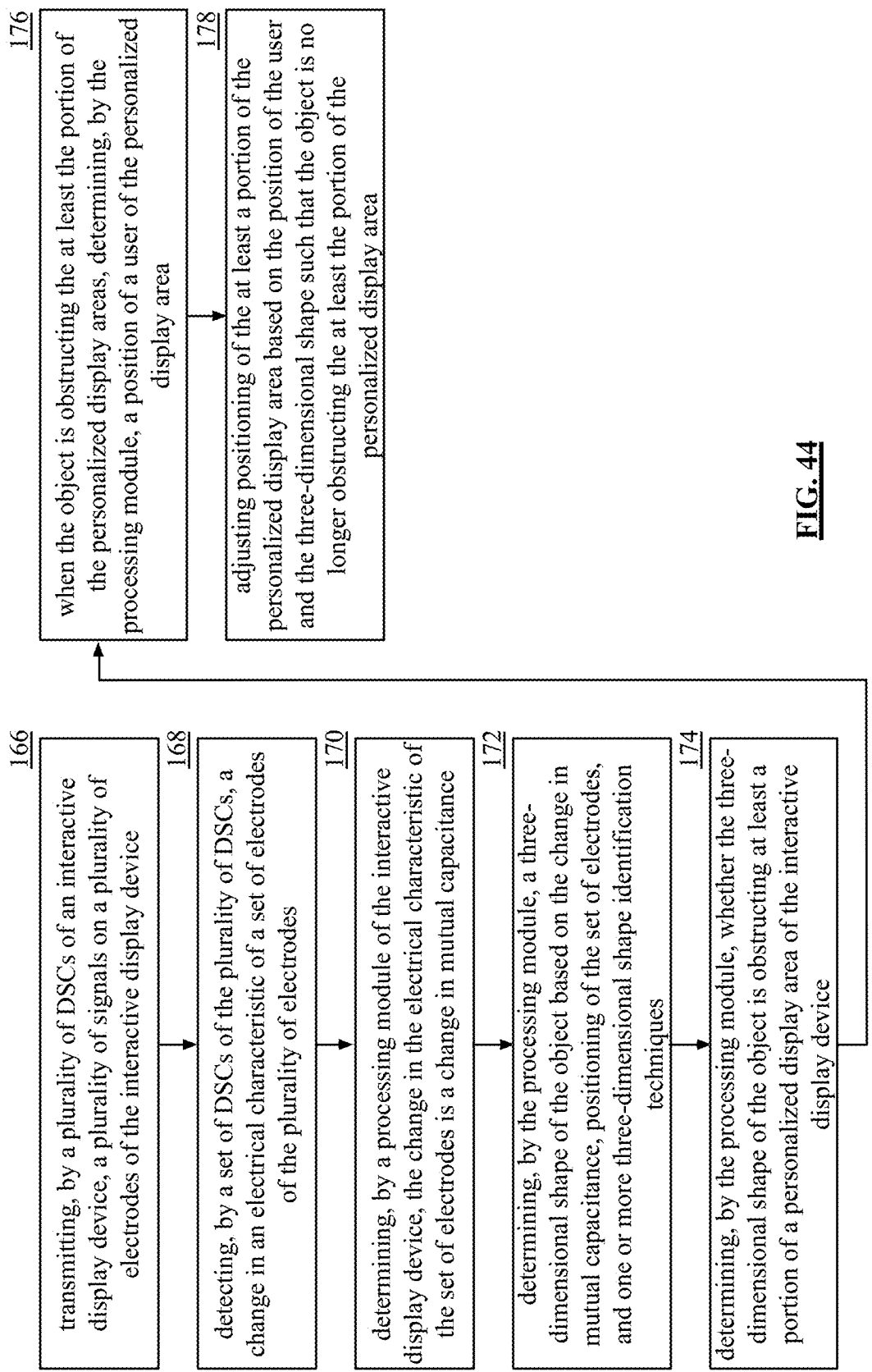
FIG. 44 is a logic diagram of an example of a method of adjusting a personalized display area based on a three-dimensional shape of an object in accordance with the present invention.

FIG. 44 is a logic diagram of an example of a method of adjusting a personalized display area based on a three-dimensional shape of an object. The method begins with step 166 where a plurality of drive sense circuits (DSCs) of an interactive display device (e.g., an interactive table top such as a dining table, coffee table, end table, etc.) transmit a plurality of signals on a plurality of electrodes of the interactive display device (e.g., where the electrodes may be wire trace, diamond pattern, capacitive sense plates, etc.).

The method continues with step 168 where a set of DSCs of the plurality of DSCs detect a change in an electrical characteristic of a set of electrodes of the plurality of electrodes. The method continues with step 170 where a processing module of the interactive display device determines that the change in the electrical characteristic of the set of electrodes is a change in mutual capacitance.

The method continues with step 172 where the processing module determines a three-dimensional shape of an object based on the change in mutual capacitance of the set of electrodes (e.g., 2D capacitive imaging), based on positioning of the set of electrodes (e.g., a cluster of electrodes are affected in a circular area), and one or more three-dimensional shape identification techniques.

The one or more three-dimensional shape identification techniques include one or more of: frequency scanning, classification and deep learning, image data collected from a camera array of the interactive display device indicating line of sight of a user to the personalized display area (e.g., based on position, distance, height of user, etc.), and an identifying tag (e.g., an RFID tag, an impedance pattern tag, etc.).

The method continues with step 174 where the processing module determines whether the three-dimensional shape of the object is obstructing at least a portion of a personalized display area of the interactive display device. When the three-dimensional shape of the object is obstructing the at least the portion of the personalized display area of the interactive display device, the method continues with step 176 where the processing module determines a position of a user of the personalized display area. For example, the personalized display area is oriented toward a particular user with a known orientation. Therefore, the processing module assumes a user is looking straight across from or straight down at the personalized display area. As another example, image data collected from a camera array of the interactive display device indicates a more accurate position of a user including a line of sight of a user to the personalized display area (e.g., based on user position, distance, height, etc.).

The method continues with step 178 where the processing module adjusts positioning of at least a portion of the personalized display area based on the position of the user and the three-dimensional shape, such that the object is no longer obstructing the at least the portion of the personalized display area. For example, the personalized display area is adjusted to create an adjusted display as in one or more of the examples described in FIGS. 43A-43E.

As another example, if the detected obstructing three-dimensional object is larger than or smaller than a certain size, the processing module can choose to ignore the item (e.g., for a certain period) and not adjust the personalized display area. For example, a briefcase is placed on the interactive display device entirely obstructing the personalized display area 18. Instead of adjusting the personalized display area 18 when the object is detected, the user is given a certain amount of time to move the item.

Figure 45:
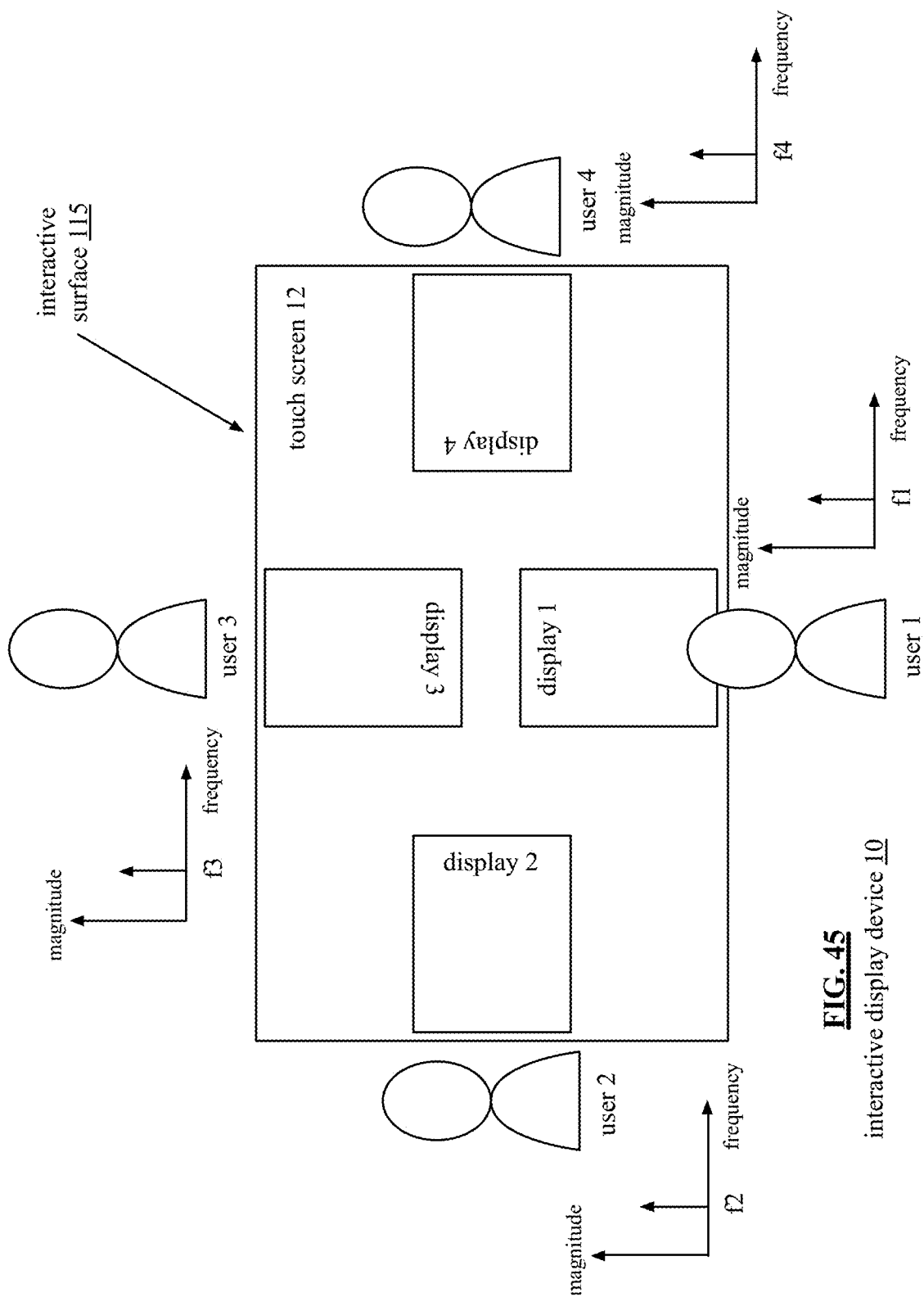
FIG. 45 is a schematic block diagram of another embodiment of the interactive display device in accordance with the present invention.

FIG. 45 is a schematic block diagram of another embodiment of the interactive display device 10 that includes the touch screen 12, which further includes multiple personalized display areas 18 (e.g., displays 1-4) corresponding to multiple users (e.g., users 1-4) to form as interactive surface 115. In this example, interactive display device 10 is an interactive table top (e.g., a dining table, coffee table, large gaming table, etc.).

Users 1-4 are each associated with a particular frequency (e.g., f1-f4). For example, users 1-4 are sitting in chairs around the interactive display device 10 where each chair includes a pressure sensor to sense when the chair is occupied. When occupancy is detected, a sinusoidal signal with a frequency (e.g., f1-f4) is sent to the interactive display device 10. The chair may be in a fixed position (e.g., a booth seat at a restaurant) such that the signal corresponds to a particular position on the interactive display device 10 having a particular orientation with respect to the user. When f1-f4 are detected, the interactive display device 10 is operable to automatically generate personalized display areas (e.g., displays 1-4) of an appropriate size and in accordance with user 1-4's detected positions and orientations. Alternatively, when f1-f4 are detected, the interactive display device 10 is operable to provide users 1-4 various personalized display area options (e.g., each user is able to select his or her own desired orientation, size, etc., of the display).

As another example, one or more of users 1-4 may be associated with a user device (e.g., a user input passive device, an active device, a game piece, a wristband, a card, a device that can be attached to an article of clothing/accessory, etc.) that transmits a frequency or is otherwise associated with a frequency (e.g., a resonant frequency of a user input passive device is detectable) when used on and/or near the interactive display device 10. When the particular frequency is detected, the interactive display device 10 is operable to automatically generate a personalized display area in accordance with a corresponding user's detected position and orientation. For example, a user's position and orientation are assumed from a detected location of the user device.

As another example, interactive display device 10 includes one or more cameras, antennas, and/or other sensors (e.g., infrared, ultrasound, etc.) for sensing a user's presence at the interactive display device. Based on user image data and/or assumptions from sensed data (e.g., via one or more antennas), the interactive display device 10 assigns a frequency to a user and automatically generates personalized display areas of an appropriate size, positions, and orientation for each user.

As another example, the interactive display device 10 generates personalized display areas of an appropriate size, positions, and orientation based on a user input (e.g., a particular gesture, command, a hand drawn area, etc.) that indicates generation of a personalized display area is desired. Alternatively, or in addition to, the interactive display device 10 is operable to track the range of a user's touches to estimate and display an appropriate personalized display area and/or make other assumptions about the user (e.g., size, position, location, dominant hand usage, etc.). The personalized display area can be automatically adjusted based on continual user touch tracking.

In all of the examples above, the interactive display device 10 is operable to determine the overall available display area of the interactive display device 10 and generate and/or adjust personalized display areas accordingly. As a specific example, if another user (e.g., user 5) were to join the interactive display device 10 in a chair to the right of user 1, user 2 and 4's personalized display areas may reduce in height due to display 1 moving towards display 2 and the addition of display 5 moving toward display 4. Alternatively, user 2 and 4's personalized display areas may shift over to accommodate the additional display without reducing in height.

Figure 46:
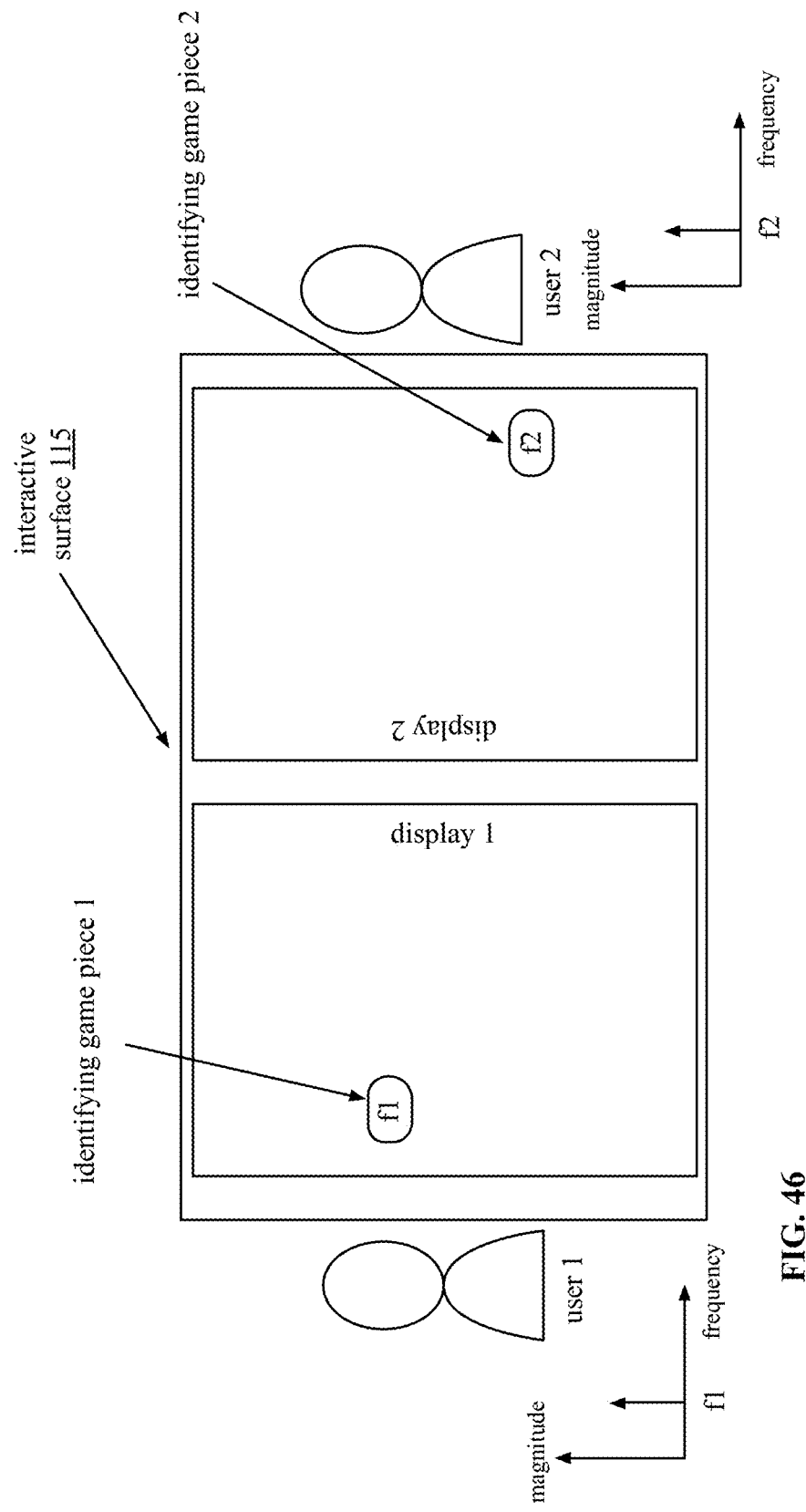
FIG. 46 is a schematic block diagram of another embodiment of the interactive display device in accordance with the present invention.

FIG. 46 is a schematic block diagram of another embodiment of the interactive display device 10 that includes the touch screen 12, which further includes multiple personalized display areas 18 (e.g., displays 1 and 2) corresponding to multiple users (e.g., users 1 and 2) to form an interactive surface 115. In this example, interactive display device 10 is an interactive table top (e.g., a dining table, coffee table, large gaming table, etc.).

In this example, user 1 is associated with an identifying user device (e.g., identifying game piece 1) that transmits a frequency f1 or is otherwise associated with a frequency f1 (e.g., a resonant frequency of a user input passive device is detectable) that is detectable by the interactive display device 10 when used on and/or near the interactive display device 10. User 2 is associated with an identifying user device (e.g., identifying game piece 2) that transmits a frequency f2 or is otherwise associated with a frequency f2 (e.g., a resonant frequency of a user input passive device is detectable) that is detectable by interactive display device 10 when used on and/or near the interactive display device 10.

When frequencies f1 and f2 are detected, the interactive display device 10 automatically generates a personalized display area (display 1) in accordance with user 1's detected position and orientation and a personalized display area (display 2) in accordance with user 2's detected position and orientation. For example, a user 1 and 2's positions and orientations are assumed from the detected location of each user device. In addition to generating personalized display areas of appropriate size and orientation based on sensing frequencies f1 and f2, the interactive display device 10 is further operable to generate personalized display areas in accordance with a game or other application triggered by frequencies f1 and f2. For example, identifying game pieces 1 and 2 are air hockey strikers that, when used on the interactive display device 10, generate an air hockey table for use by the two players (users 1 and 2).

Figure 47:
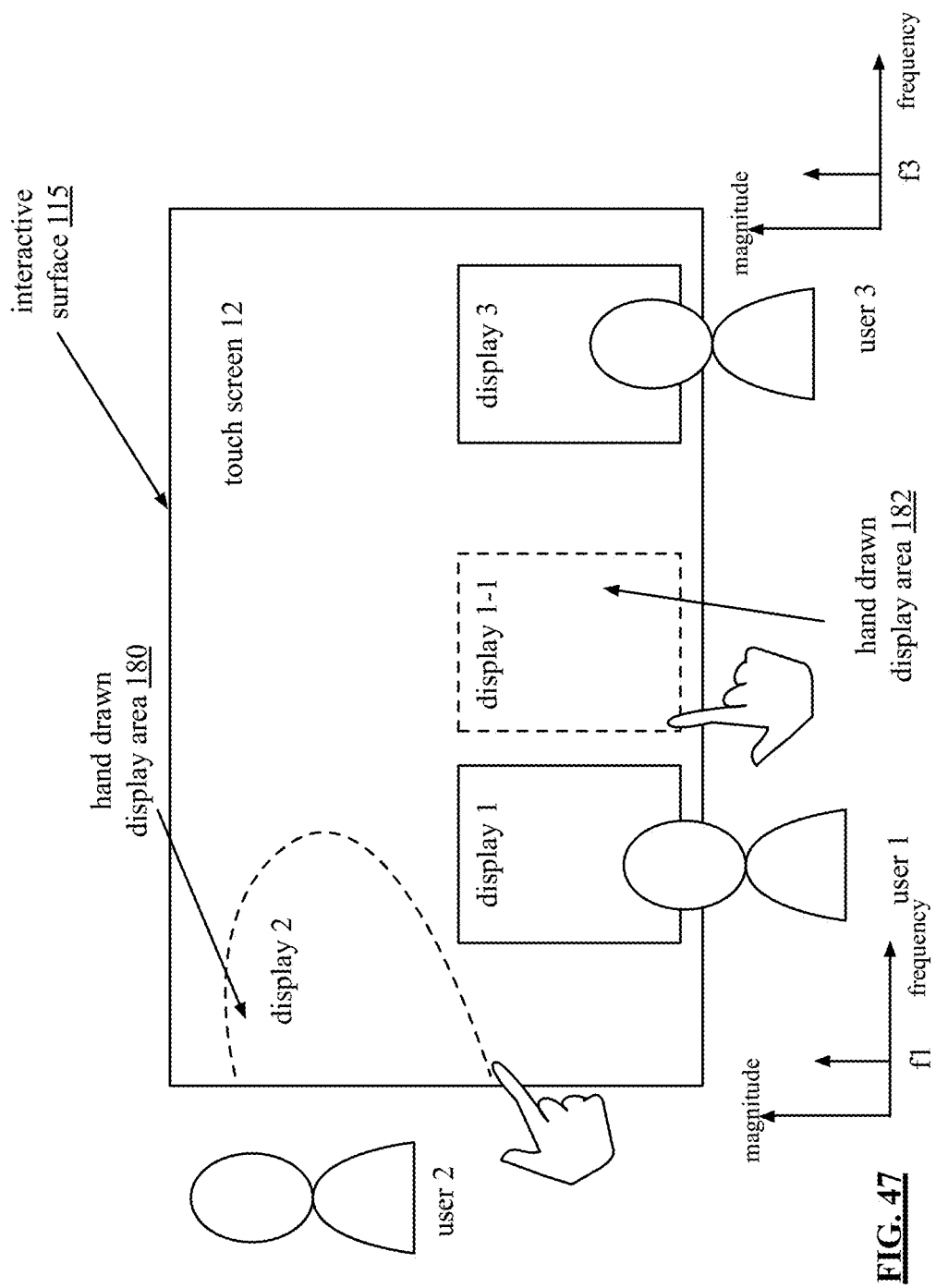
FIG. 47 is a schematic block diagram of another embodiment of the interactive display device in accordance with the present invention.

FIG. 47 is a schematic block diagram of another embodiment of the interactive display device 10 that includes the touch screen 12, which further includes multiple personalized display areas 18 (e.g., displays 1, 1-1, 2 and 3) corresponding to multiple users (e.g., users 1-3) to form interactive surface 115. In this example, interactive display device 10 is an interactive table top (e.g., a dining table, coffee table, large gaming table, etc.).

Users 1 and 3 are located on the same side of the interactive display device 10. Personalized display areas display 1 and display 3 are generated based on detecting a particular frequency associated with users 1 and 3 (e.g., generated by sitting in a chair, associated with a particular user device, etc.) and/or sensing user 1 and/or user 2's presence at the table via cameras, antennas, and/or sensors in the interactive display device 10. The interactive display device 10 scales and positions display 1 and display 2 in accordance with available space detected on the interactive display device 10.

User 2 hand draws a hand drawn display area 180 (display 2) on a portion of available space of the interactive display device and user 1 hand draws a hand drawn display area 182 (display 1-1) on a portion of the interactive display device near display 1. User 1 has one personalized display area (display 1) that was automatically generated and one personalized display area (display 1-1) that was user input generated. User 2's hand drawn display area 180 depicts an example where the display is a unique shape created by the user. Based on how the display area is hand drawn, an orientation is determined. For example, a right handed user may initiate drawing from a lower left corner. Alternatively, the user selects a correct orientation for the hand drawn display area. As another example, a user orientation is determined based on imaging or sensed data from one or more cameras, antenna, and/or sensors of the interactive display device 10.

If a user generated display area overlaps with unavailable space of the interactive display device, the display area can be rejected, auto-scaled to an available area, and/or display areas on the unavailable space can scale to accommodate the new display area.

FIG. 48 is a logic diagram of an example of a method of generating a personalized display area on an interactive display device. The method begins with step 184 where a plurality of drive sense circuits (DSCs) of an interactive display device (e.g., an interactive table top such as a dining table, coffee table, end table, gaming table, etc.) transmit a plurality of signals on a plurality of electrodes (e.g., wire trace, diamond pattern, capacitive sense plates, etc.) of the interactive display device.

The method continues with step 186 where a set of DSCs of the plurality of DSCs detect a change in an electrical characteristic of a set of electrodes of the plurality of electrodes. The method continues with step 188 where a processing module of the interactive display device determines that the change in the electrical characteristic of the set of electrodes to be caused by a user of the interactive display device in close proximity (i.e., in contact with or near contact) to an interactive surface of the interactive display device.

For example, a user is sitting in a chair at the interactive display device where the chair includes a pressure sensor to sense when the chair is occupied. When occupied, the chair to conveys a sinusoidal signal including a frequency to the interactive display device alerting the interactive display device to a user's presence, location, and likely orientation. The chair may be in a fixed position (e.g., a booth seat at a restaurant) such that the signal corresponds to a particular position on the interactive display device having a particular orientation with respect to the user.

As another example, a user may be associated with a user device (e.g., user input passive device, an active device, a game piece, a wristband, etc.) that transmits a frequency or is otherwise associated with a frequency (e.g., a resonant frequency of a user input passive device is detectable) that is detectable by the interactive display device when used on and/or near the interactive display device.

As another example, the interactive display device includes one or more cameras and/or antennas for sensing a user's presence at the interactive display device. As yet another example, a user inputs a command to the interactive display device to alert the interactive display device to the user's presence, position, etc.

The method continues with step 190 where the processing module determines a position of the user based on the change in the electrical characteristics of the set of electrodes. For example, the chair sending the frequency is in a fixed position (e.g., a booth seat at a restaurant) that corresponds to a particular position on the interactive display device having a particular orientation with respect to the user. As another example, the user's position and orientation are assumed from a detected location of a user device. As another example, the user's position and orientation are detected from imaging and/or sensed data from the one or more cameras, antennas and/or sensors of the interactive display device. As a further example, a user input indicates a position and/or orientation of a personalized display area (e.g., a direct command, information obtained from the way a display area is hand drawn, location of the user input, etc.).

The method continues with step 192 where the processing module determines an available display area of the interactive display device. For example, the processing module detects whether there are objects and/or personalized display areas taking up space on the interactive surface of the interactive display device.

The method continues with step 194 where the processing module generates a personalized display area within the available display area based on the position of the user. For example, the interactive display device automatically generates a personalized display area of an appropriate size, position, and orientation based on the position of the user (e.g., determined by a particular frequency, device, user input, sensed data, image data, etc.) and the available space. Alternatively, when a user is detected, the processing module is operable to provide the user with various personalized display area options (e.g., a user is able to select his or her own desired orientation, size, etc., of the personalized display area).

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touchscreen system comprises:
a user input passive device including:
a housing including:
a shell; and
a non-conductive supporting surface coupled to the shell;
an impedance circuit having a desired impedance at a desired frequency;
a first conductive plate mounted on the non-conductive supporting surface and electrically isolated from the shell; and
a second conductive plate mounted on the non-conductive supporting surface and electrically isolated from the shell and from the first conductive plate, wherein a first terminal of the impedance circuit is coupled to the first conductive plate and a second terminal of the impedance circuit is coupled to the second conductive plate; and
an interactive display device including:
a touchscreen including an interactive surface;
a plurality of electrodes integrated into the interactive surface, wherein, when the user input passive device is used in close proximity with the touchscreen:
a perimeter of the shell is in close proximity to the interactive surface;
the first and second conductive plates are in close proximity to the interactive surface; and
one or more of the shell and the first and second conductive plates cause changes in electrical characteristics of a set of electrodes of the plurality of electrodes; and
a plurality of drive-sense circuits coupled to the plurality of electrodes, wherein a set of drive sense circuits is coupled to the set of electrodes, and wherein the set of drive sense circuits is operable to generate a set of signals representative of the changes in electrical characteristics.

2. The touchscreen system of claim 1, wherein the interactive display device further includes:
a processing module operable to:
receive, from the set of drive-sense circuits, a plurality of signals representative of the changes in the electrical characteristics of the set of electrodes;
interpret the plurality of signals as a plurality of impedance values representative of the electrical characteristics; and
interpret the plurality of impedance values as one or more user input passive device inputs.

3. The touchscreen system of claim 2, wherein the one or more user input passive device inputs include one or more of:
user input passive device identification;
orientation;
user function; and
user instruction.

4. The touchscreen system of claim 2, wherein the processing module is operable to interpret the plurality of impedance values as one or more of:
a plurality of direct impedance values; and
a plurality of relative impedance values.

5. The touchscreen system of claim 2, wherein the processing module is operable to interpret the plurality of impedance values as one or more user input passive device inputs by:
    interpreting the plurality of impedance values as a pattern, wherein the pattern corresponds to one or more user input passive device inputs.

6. The touchscreen system of claim 2, wherein the processing module is operable to interpret the plurality of impedance values as one or more user input passive device inputs by:
    determining a location of the plurality of impedance values, wherein the location corresponds to one or more user input passive device inputs.

7. The touchscreen system of claim 2, wherein the processing module is operable to interpret the plurality of impedance values as one or more user input passive device inputs by:
    determining a location and a pattern of the plurality of impedance values, wherein the location and the pattern correspond to one or more user input passive device inputs.

8. The touchscreen system of claim 1, wherein the shell includes one or more of:
    a conductive material;
    a non-conductive material; and
    a dielectric material.

9. The touchscreen system of claim 1, wherein the user input passive device further includes:
    a switch mechanism mounted on the housing, wherein the impedance circuit has a first desired impedance at the desired frequency when the switch mechanism is in a first state and has a second desired impedance at the desired frequency when the switch mechanism is in a second state.

10. The touchscreen system of claim 1, wherein the impedance circuit comprises:
    an inductor; and
    a capacitor coupled to the inductor in series, wherein the series coupling of the inductor and the capacitor resonant at the desired frequency.

11. The touchscreen system of claim 1, wherein the impedance circuit comprises:
    an inductor; and
    a capacitor coupled to the inductor in parallel, wherein the parallel coupling of the inductor and the capacitor resonant at the desired frequency.

12. The touchscreen system of claim 1, wherein the impedance circuit comprises one or more resistors.

13. The touchscreen system of claim 1, wherein the impedance circuit comprises one or more capacitors.

14. The touchscreen system of claim 1, wherein the impedance circuit comprises one or more inductors.

15. The touchscreen system of claim 1, wherein the user input passive device further comprises:
    a second impedance circuit having the desired impedance at a second desired frequency;
    a third conductive plate mounted on the non-conductive supporting surface and electrically isolated from the shell, from the first conductive plate, and the second conductive plate; and
    a fourth conductive plate mounted on the non-conductive supporting surface and electrically isolated from the shell, from the first conductive plate, from the second conductive plate, and from the third conductive plate, wherein a first terminal of the second impedance circuit is coupled to the third conductive plate and a second terminal of the second impedance circuit is coupled to the fourth conductive plate, wherein, when the user input passive device is used with the touchscreen, the third and fourth conductive plates are in close proximity to the interactive surface of the touchscreen.

16. The touchscreen system of claim 15, wherein the user input passive device further comprises:
    the first and second conductive plates being positioned within a first area of the non-conductive supporting surface; and
    the third and fourth conductive plates being positioned within a second area of the non-conductive supporting surface, wherein the first and second areas provide orientation information regarding positioning of the user input passive device on the interactive surface of the touchscreen.

17. The user input passive device of claim 15 further comprises:
    a third impedance circuit having the desired impedance at a third desired frequency;
    a fifth conductive plate mounted on the non-conductive supporting surface and electrically isolated from the shell, from the first conductive plate, and the second conductive plate; and
    a sixth conductive plate mounted on the non-conductive supporting surface and electrically isolated from the shell, from the first conductive plate, from the second conductive plate, from the third conductive plate, from the fourth conductive plate, and from the fifth conductive plate, wherein a first terminal of the third impedance circuit is coupled to the fifth conductive plate and a second terminal of the third impedance circuit is coupled to the sixth conductive plate, wherein, when the user input passive device is used with the touchscreen, the fifth and sixth conductive plates are in in close proximity to the interactive surface of the touchscreen.

18. The user input passive device of claim 1, wherein the changes in electrical characteristics includes one or more of:
    a change in self capacitance;
    a change in mutual capacitance; and
    a change in frequency.

19. A touchscreen system comprises:
    a user input passive device including:
        a housing including:
            a shell; and
            a non-conductive supporting surface coupled to the shell;
        an impedance circuit having a desired impedance at a desired frequency;
        a first conductive plate mounted on the non-conductive supporting surface and electrically isolated from the shell; and
        a second conductive plate mounted on the non-conductive supporting surface and electrically isolated from the shell and from the first conductive plate, wherein a first terminal of the impedance circuit is coupled to the first conductive plate and a second terminal of the impedance circuit is coupled to the second conductive plate;
    an interactive display device including:
        a touchscreen including an interactive surface;
        a plurality of electrodes integrated into the interactive surface, wherein, when the user input passive device is used in close proximity with the touchscreen:
            a perimeter of the shell is in close proximity to the interactive surface;

the first and second conductive plates are in close proximity to the interactive surface; and one or more of the shell and the first and second conductive plates cause changes in electrical characteristics of a set of electrodes of the plurality of electrodes; and a plurality of drive-sense circuits coupled to the plurality of electrodes, wherein a set of drive sense circuits is coupled to the set of electrodes, and wherein the set of drive sense circuits is operable to generate a set of signals representative of the changes in electrical characteristics; and a processing module operable to:
receive, from the set of drive-sense circuits, a plurality of signals representative of the changes in the electrical characteristics of the set of electrodes;
interpret the plurality of signals as a plurality of impedance values representative of the electrical characteristics; and
interpret the plurality of impedance values as one or more user input passive device inputs.

\* \* \* \* \*